US005793564A

United States Patent [19]

Nakase et al.

[11] Patent Number: 5,793,564

[45] Date of Patent: Aug. 11, 1998

[54] AUTO-LOADING SYSTEM FOR INTERFACING A MAGAZINE OF RECORDING MEDIUM CARTRIDGES WITH A RECORDING/REPRODUCING APPARATUS

[75] Inventors: Hideo Nakase; Jo Nakagawa; Hirohiko Shimizu; Tsuyoshi Umemura; Akira Saito, all of Kanagawa, Japan

[73] Assignee: Sony Corporation, Japan

[21] Appl. No.: 595,484

[22] Filed: Feb. 1, 1996

[30] Foreign Application Priority Data

Feb. 3, 1995 [JP] Japan .................................... 7-037749

[51] Int. Cl.$^{6}$ .................................................... G11B 15/68

[52] U.S. Cl. ................................................ 360/92; 369/36

[58] Field of Search ................................ 360/92, 36, 38, 360/178, 192, 193; 242/337; 414/932

[56] References Cited

U.S. PATENT DOCUMENTS

| | | | |
|---|---|---|---|
| 3,620,385 | 11/1971 | Vermeijlen . | |
| 3,774,916 | 11/1973 | Nanba . | |
| 4,984,106 | 1/1991 | Herger et al. | 360/92 |
| 5,004,393 | 4/1991 | Lunka et al. | 414/331 |
| 5,041,929 | 8/1991 | Fryberger et al. | 360/92 |
| 5,050,020 | 9/1991 | Campbell et al. | 360/92 |
| 5,089,920 | 2/1992 | Bryer et al. | 360/92 |
| 5,157,564 | 10/1992 | Theobald et al. | 360/92 |
| 5,182,687 | 1/1993 | Campbell et al. | 360/92 |
| 5,184,260 | 2/1993 | Pierrat | 360/92 |
| 5,237,467 | 8/1993 | Marlowe | 360/92 |
| 5,469,310 | 11/1995 | Slocum et al. | 360/92 |
| 5,508,859 | 4/1996 | Hu et al. | 360/92 |

FOREIGN PATENT DOCUMENTS 0569636 11/1993 European Pat. Off. .

*Primary Examiner*—Stuart S. Levy
*Assistant Examiner*—Brian E. Miller
*Attorney, Agent, or Firm*—Ronald P. Kananen

[57] ABSTRACT

An auto-loading system for recording medium cartridges is provided which permits the simple and reliable operation of rotating the recording medium cartridges between a magazine and a drive. The auto-loading system has a cartridge tray of an elevator which is moved upward and downward between a cartridge port of the drive and a cartridge insertion port and a cartridge ejection port of the magazine within an autoloader body so that a plurality of recording medium cartridges are rotated between the magazine and the drive by the operation of ejecting the recording medium cartridges into the cartridge tray from the cartridge ejection port of the magazine by a first cartridge ejecting mechanism and the operation of ejecting the recording medium cartridges into the cartridge port of the drive or the cartridge insertion port of the magazine from the cartridge tray by a second cartridge ejecting mechanism.

24 Claims, 74 Drawing Sheets

AUTO-LOADING SYSTEM FOR INTERFACING A MAGAZINE OF RECORDING MEDIUM CARTRIDGES WITH A RECORDING/REPRODUCING APPARATUS

BACKGROUND OF THE INVENTION

1. Field of the Invention

The present invention relates to an auto-loading system for recording medium cartridges which is optimum for application to a tape streamer serving as a backup magnetic recording/reproducing device for storing data, for example, data of a computer (CPU), and particularly to an auto-loading system for recording medium cartridges which comprises a magazine capable of containing a plurality of recording medium cartridges so that the recording medium cartridges can continuously be rotated, i.e., automatically be changed, between the magazine and a drive, thereby increasing the storage capacity.

2. Description of the Related Art

An example of such auto-loading systems for recording medium cartridges (referred to as "tape cartridges" hereinafter) is the auto-loader disclosed in U.S. Pat. No. 5,184,260.

This known example comprises a magazine which contains tape cartridges including two upper tape cartridges and two lower tape cartridges, i.e., a total of four tape cartridges, along the lengthwise direction, and which is horizontally set below a drive in a body of the auto-loader so that the four tape cartridges are rotated in the magazine by a combination of horizontal reciprocating motion and vertical reciprocating motion to be successively transferred to a cartridge port formed in an upper portion at an end of the magazine in the lengthwise direction thereof.

The tape cartridges are successively automatically changed one by one between the cartridge port of the magazine and the cartridge port of the drive by using a pickup which is moved in two directions, i.e., vertical and horizontal directions, so that recording and reproduction can continuously be carried out on the four tape cartridges.

However, this known example has a low storage capacity because only four tape cartridges can be contained in the magazine. The magazine is expensive because of the complicated structure for rotating the four tape cartridges in the magazine by a combination of horizontal reciprocating motion and vertical reciprocating motion. The pickup moved in the two directions, including the vertical and horizontal directions, has a complicated structure and is thus expensive and operated with low reliability.

The pickup has the structure in which it is moved in the two directions, i.e., the vertical and horizontal directions, between the cartridge port of the magazine and the cartridge port of the drive while vertically holding an end of a tape cartridge so as to automatically change the tape cartridges. In automatic exchange of the tape cartridges by the pickup, the tape cartridge easily slips from the pickup, and there is thus the problem that the operation of automatically changing the tape cartridges has low reliability.

The system in which a tape cartridge is ejected from the cartridge port of the drive by vertically holding an end of the tape cartridge and drawing out the tape cartridge using the pickup cannot cope with variations in the size of the tape cartridge and the amount of ejection of the tape cartridge from the drive. The system easily experiences problems in drawing out the tape cartridge, thereby causing the low reliability of operation.

SUMMARY OF THE INVENTION

The present invention has been achieved for solving the above problems. An object of the present invention is to provide an auto-loading system for tape cartridges which permits the very simple and secure operation of rotating tape cartridges within the magazine and of transferring the tape cartridges between the magazine and the drive.

Another object of the present invention is to provide an auto-loading system for tape cartridges which permits the simple operation of rotating the tape cartridges within the magazine, an increase in the number of the tape cartridges contained in the magazine, and the rapid selection of a specified tape cartridge in rotation of a plurality of tape cartridges between the magazine and the drive.

Still another object of the present invention is to provide an auto-loading system for tape cartridges which is capable of continuously securely ejecting the tape cartridges to a cartridge rotation mechanism between a magazine and a drive from a cartridge loading mechanism in the drive.

A further object of the present invention is to provide an auto-loading system for tape cartridges which permits the simple operation of rotating the tape cartridges within the magazine, and an increase in the number of the tape cartridges which can be contained in the magazine, and which can prevent interference between respective tape cartridges during the operation of rotating a plurality of tape cartridges between the magazine and the drive, thereby permitting smooth rotation.

A still further object of the present invention is to provide an auto-loading system for tape cartridges which permits the very simple and secure operations of rotating tape cartridges within a magazine and of transferring tape cartridges between the magazine and a drive. The magazine is automatically loaded in a body of the auto-loader at the same time as the automatic setting of a cartridge ejecting means for ejecting tape cartridges into an elevator from a cartridge ejection port of the magazine.

A further object of the present invention is to provide an auto-loading system for tape cartridges which permits the tape cartridge in a magazine automatically loaded in a body of an auto-loader, which projects from a cartridge insertion port or a cartridge ejection port in error, to be automatically returned into the magazine.

A further object of the present invention is to provide a magazine for tape cartridges which can contain at least eight tape cartridges, and which permits the simple operation of rotating the tape cartridges within the magazine and the simple operation of inserting and containing the tape cartridges in the magazine.

In order to achieve the objects, in accordance with an aspect of the present invention, an auto-loading system for tape cartridges comprises a cartridge containing unit comprising a first space which is connected to a cartridge insertion port, a second space which is horizontally connected to the first space, a third space which is formed below the second space perpendicular to the second space and which is connected to the second space, and a fourth space which is horizontally connected to the third space, which is parted from the first space by a partition, and which is connected to a cartridge ejection port formed at a position corresponding to the cartridge insertion port, so that at least one tape cartridge is contained in each of the first to fourth spaces; driving means having a cartridge port for accessing a tape contained in the tape cartridge which is loaded through the cartridge port; transfer means for transferring the tape cartridge between the cartridge insertion port, the cartridge ejection port and the cartridge port; and first cartridge ejecting means for moving the tape cartridges positioned in the third and fourth spaces toward the cartridge ejection port by pushing the end surface of a tape cartridge positioned in the third space on the side opposite to the fourth space, to load the tape cartridge positioned in the fourth space in the transfer means through the cartridge ejection port.

In accordance with another aspect of the present invention, the auto-loading system further comprises second cartridge ejecting means for inserting the tape cartridge loaded in the transfer means into the drive means from the cartridge port or to the cartridge containment port from the cartridge insertion port by pushing the side surface of the tape cartridge loaded in the transfer means on the side opposite to the driving means and the cartridge containment port.

In accordance with still another aspect of the present invention, the cartridge containment port has a fifth space which permits only one tape cartridge to be horizontally contained between the first space and the fourth space.

In accordance with a further aspect of the present invention, the auto-loading system further comprises third cartridge ejecting means for pushing only the tape cartridge contained in the fifth space toward the transfer means to load the tape cartridge in the transfer means.

In accordance with a still further aspect of the present invention, the auto-loading system further comprises cartridge containing unit loading means for automatically drawing the cartridge containing unit in the auto-loading system so that the cartridge containment port and the cartridge ejection port of the cartridge containing unit are set at positions corresponding to the cartridge port of the driving means.

In accordance with a further aspect of the present invention, the cartridge containing unit loading means comprises latch means for latching the cartridge containing unit; and a slide driving member for linearly moving the latch means in the directions of drawing and ejection of the cartridge containing unit.

In accordance with a further aspect of the present invention, the auto-loading system further comprises a cartridge insertion port for inserting the cartridge containing unit therein; a cover for opening and closing the cartridge insertion port; cover opening/closing means for closing the cover before the completion of the operation of loading the cartridge containing unit by the cartridge containing unit loading means, and opening in correspondence with the start of the ejection of the cartridge containing unit by the cartridge containing unit loading means; and control means for, when the tape cartridge in the cartridge containing unit projects from the cartridge insertion port or the cartridge ejection port, closing the cover by the cover opening/closing means and ejecting the cartridge containing unit by the cartridge containing unit loading means to push back the tape cartridge, which projects from the cartridge containing unit, into the cartridge containing unit when the tape cartridge contacts the inner side of the cover.

DESCRIPTION OF THE PREFERRED EMBODIMENTS

An auto-loading system for tape cartridges in accordance with an embodiment of the present invention will be described below with reference to the drawings. This embodiment uses a tape cartridge standardized as DDS2 cartridge in R-DAT cartridges for data recorders.

A magazine and an auto-loader are outlined with reference to FIGS. 1A through 9B.

Figure 1A:
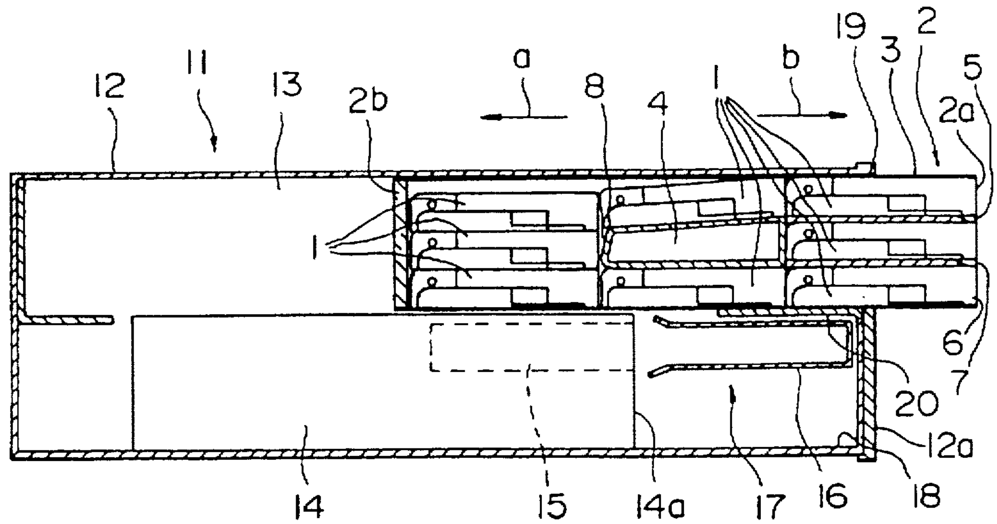
FIGS. 1A and 1B are schematic sectional side views illustrating the operation of loading a magazine in an auto-loader for tape cartridges in accordance with an embodiment to which the present invention is applied.
Figure 1B:
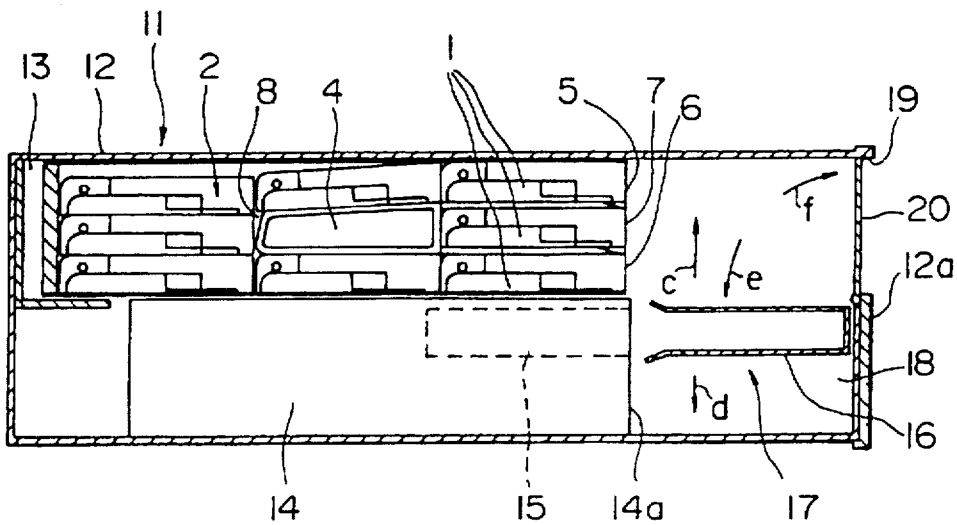

As shown in FIGS. 1A and 1B, a magazine 2 can contain a total of eight tape cartridges 1 in three stages and in the lengthwise direction thereof. The magazine 2 has a magazine body 3 formed in a substantially rectangular parallelepipedic box, and a hollow portion 4 formed in the box at substantially the center thereof. Three of the eight tape cartridges 1 are horizontally arranged in a line in a lower stage below the hollow portion 4, and two tape cartridges are horizontally spaced in an intermediate stage on both sides of the hollow portion 4, the remaining three tape cartridges being horizontally arranged in a line in an upper stage above the hollow portion 4. These eight tape cartridges 1 are contained around the hollow portion 4.

In this embodiment, a cartridge insertion port 5 is formed in an upper stage of a side (the side of the point of arrow b) in the directions shown by arrows a and b along the lengthwise direction of the magazine 2, a cartridge ejection port 6 is formed in a lower stage of the side, and a cartridge containment port 7 is formed in a middle stage of the side.

A substantially U-shaped path extending from the cartridge insertion port 5 to the cartridge ejection port 6 with a circuit path around the hollow portion 4 forms a cartridge rotation path 8 so that the seven tape cartridges 1, which are successively inserted through the cartridge insertion port 5 in the direction shown by arrow a, can successively be contained in the rotation path 8 by a rotation system (one-way system), and successively be ejected toward the cartridge ejection port 6 in the direction shown by arrow b.

Only one tape cartridge 1 can be contained in the cartridge containment port 7 and freely moved in and out of the cartridge containment port 7 in the directions shown by arrows a and b.

As shown in FIG. 1A through 9B, an auto-loader 11 has an auto-loader body 12 formed in a substantially rectangular parallelepipedic box. The auto-loader body 12 has a long horizontal magazine insertion space 13 which is formed in the upper portion of the body along the center thereof, and a drive 14 which serves as a helical scanning type magnetic recording/reproducing device and which is disposed below the magazine insertion space 13. A tray elevating space 18 containing an elevator 17 for vertically moving a cartridge tray 16 in the directions shown by arrows c and d, is formed between the front side 14*a* of the drive 14 where a cartridge port 15 is formed, and a front panel 12*a* of the auto-loader body 12.

A magazine insertion port 19 is formed at the center of the upper portion of the front panel 12*a* of the autoloader body 12 opposite to the front side (on the side of the point of arrow 12) of the magazine insertion space 13, an inward movable cover 20 being provided for opening and closing the magazine insertion port 19 so as to be rotatable inwardly of the front panel 12*a* in the directions shown by arrow e and f.

[Operation of Loading the Magazine]

When loading the magazine 2 in the auto-loader 11, the cartridge tray 16 of the elevator 17 is moved downward to a drive position in the direction shown by arrow d, as shown in FIG. 1(A). A lengthwise side 2*b* of the magazine 2, which is opposite to the other side 2*a* thereof, is then inserted into the magazine insertion port 19 in the direction shown by arrow a. At this time, the magazine 2 is horizontally inserted into the magazine insertion space 13 in the direction shown by arrow a so as to push the movable cover 20 open by the side 2*b* of the magazine 2 in the direction shown by arrow e.

When the magazine 2 is inserted by a predetermined length in the auto-loader 11, an auto-loading operation is carried out, i.e., the magazine 2 is automatically drawn into the magazine insertion space 13 in the direction shown by arrow a by the magazine loading mechanism which will be described below, so that the cartridge insertion port 5, the cartridge ejection port, and the cartridge containment port of the magazine 2 are set in substantially the same plane with the cartridge port 15 of the drive 14, as shown in FIG. 1(B).

At the same time that the operation of automatically loading the magazine 2 is completed, the movable cover 20 is automatically closed by a movable cover opening/closing mechanism, which will be described below, in the direction shown by arrow f.

[Operation of Ejecting the Magazine]

Figure 5A:
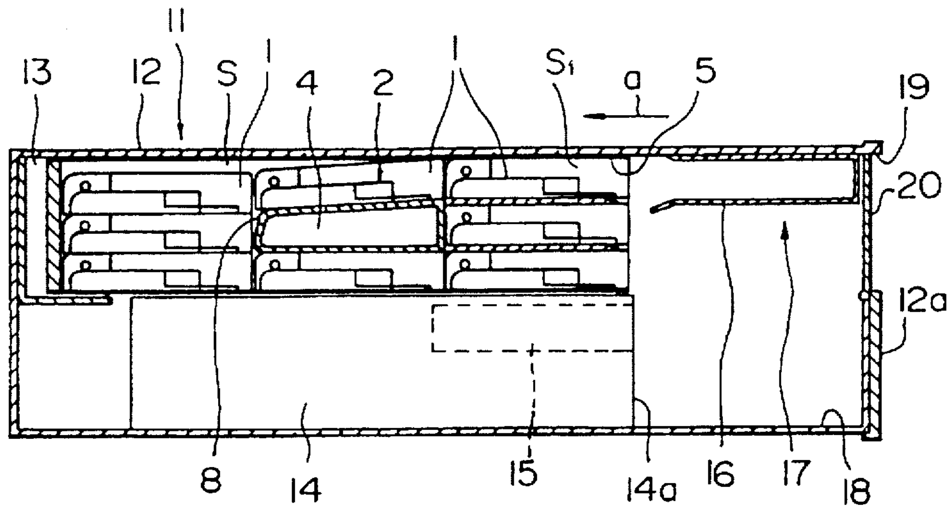
FIGS. 5A and 5B are schematic sectional side views illustrating the operation of returning a tape cartridge into a cartridge insertion port of a magazine from a cartridge tray of an elevator, and then ejecting the magazine from an auto-loader.
Figure 5B:
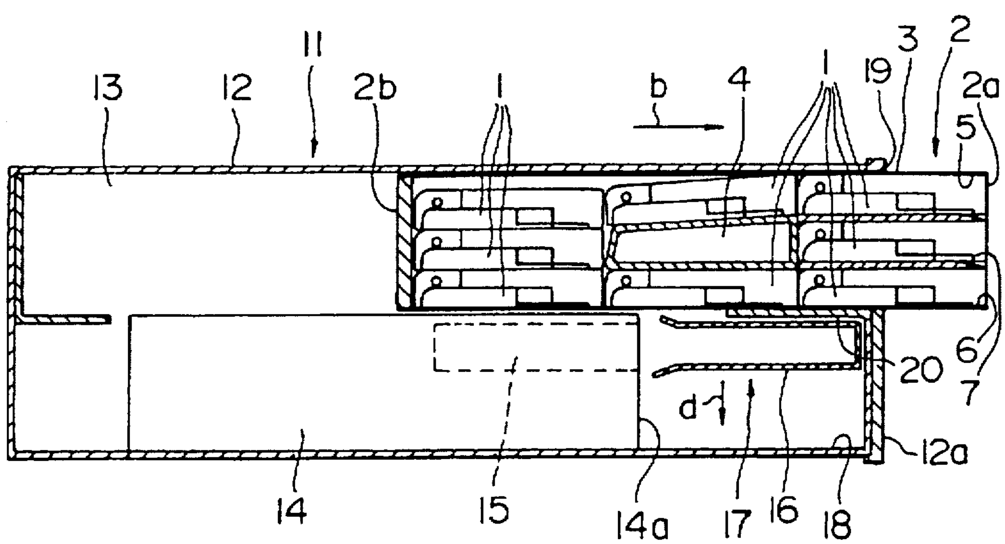

In ejection of the magazine 2 from the auto-loader 11, as shown in FIG. 5(B), when an eject button which will be described below, is pushed, or when an eject command is output from a host computer, it is first confirmed that the cartridge tray 6 of the elevator 17 is downwardly moved to the drive position in the direction shown by arrow d. After this confirmation, the movable cover 20 is automatically opened in the direction shown by arrow e. Thereafter, an auto-ejection operation is performed, i.e., the magazine 2 is automatically pushed out by a predetermined length from the magazine insertion port 19 in the direction shown by arrow b.

When the magazine 2 is manually drawn from the magazine insertion port 19 in the direction shown by arrow b, the movable cover 20 is automatically closed in the direction shown by arrow f.

[First Operation of Rotating Tape Cartridges in the Auto-Loader]

Figure 2A:
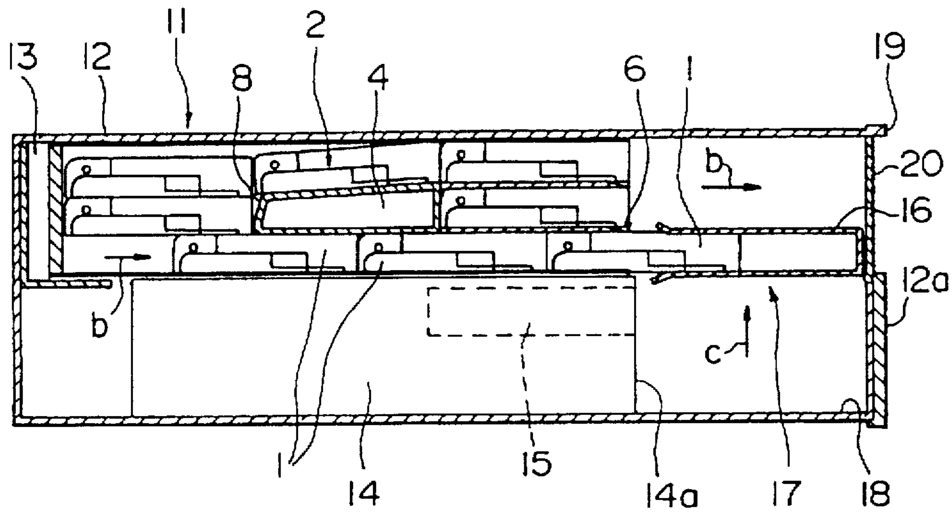
FIGS. 2A and 2B are schematic sectional side views illustrating the operation of ejecting a tape cartridge to a cartridge tray of an elevator from a cartridge ejection port of a magazine which is loaded in an auto-loader.

The cartridge tray 16 is first moved upward to the magazine lower stage position opposite to the cartridge ejection port 6 of the magazine 2, as shown in FIG. 2(A), from the drive position opposite to the cartridge port 15 of the drive 14, as shown in FIG. 1(B).

Figure 2B:
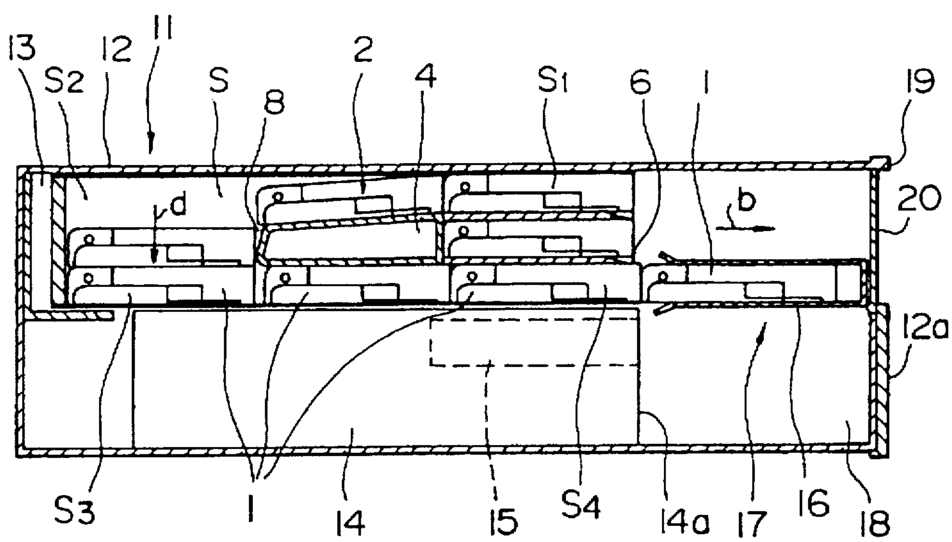

As shown in FIG. 2(B), when the tape cartridge 1 in third space $S_3$ in the magazine 2 is pushed by a first cartridge ejecting mechanism, which will be described below, the three tape cartridges in the lower stage in the cartridge rotation path 8 of the magazine 2 are automatically pushed by a stroke corresponding to the length of one cartridge in the direction of arrow b, and the tape cartridge 1 contained in fourth space $S_4$ is horizontally pushed into the cartridge tray 16 from the cartridge ejection port 6.

The two tape cartridges 1 behind the hollow portion 4 (on the side of the point of arrow a) within the cartridge rotation path 8 of the magazine 2 are then simultaneously dropped down by a height corresponding to a difference in height between the stages, to produce second space $S_2$ for one tape cartridge 1 in the upper portion.

Figure 3A:
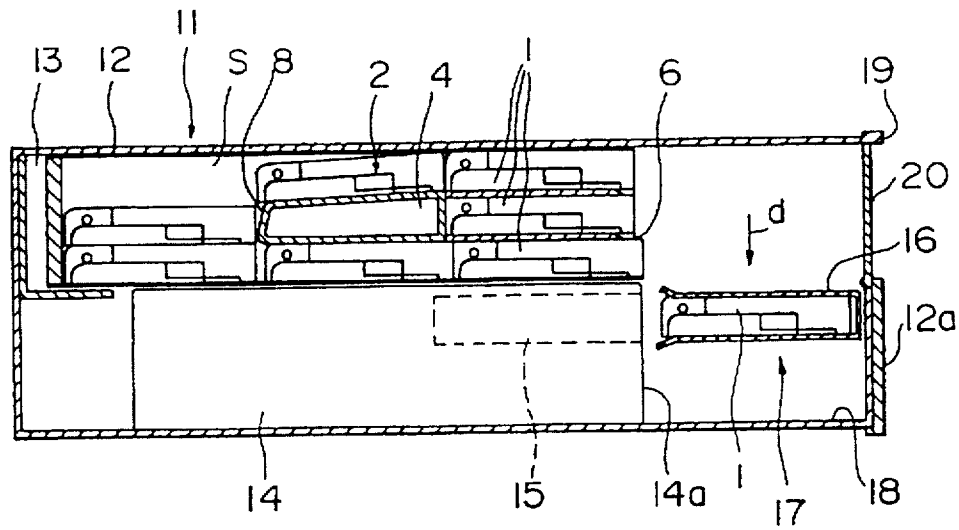
FIGS. 3A and 3B are schematic sectional side views illustrating the operation of transferring a tape cartridge, which is ejected into a cartridge tray of an elevator from a cartridge ejection port of a magazine, to a drive and supplying the tape cartridge into a cartridge port thereof.
Figure 3B:
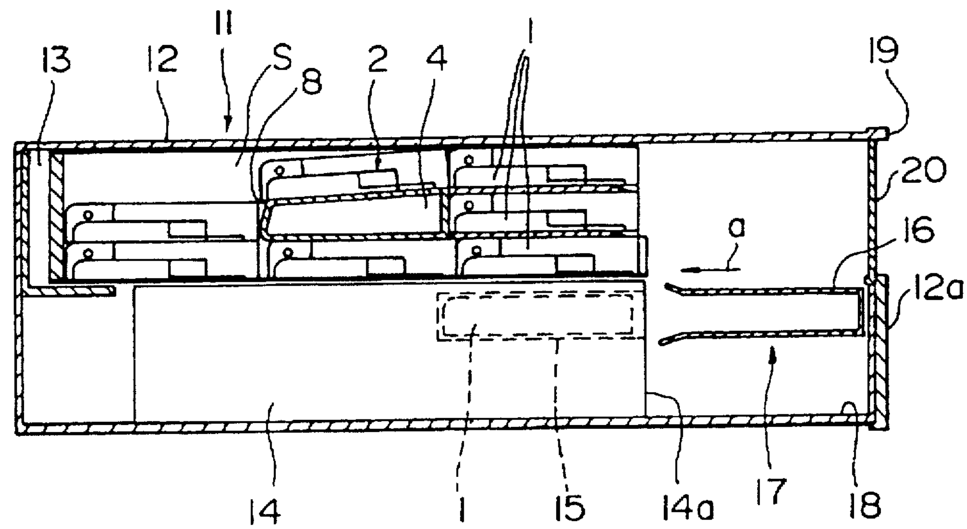

The tape cartridge 1 is then moved downward to the drive position in the direction of arrow by the cartridge tray 16, as shown in FIG. 3(A), and the tape cartridge contained in the cartridge tray 16 is then horizontally pushed into the cartridge port 15 of the drive 14 in the direction of arrow a by a second cartridge ejecting mechanism which will be described below, as shown in FIG. 3(B).

The tape cartridge 1 pushed into the drive 14 is automatically loaded in the drive 14 by a cartridge loading mechanism, which will be described below, so that desired recording or reproduction is performed, while the cartridge tray 16 is on standby at the drive position.

Figure 4A:
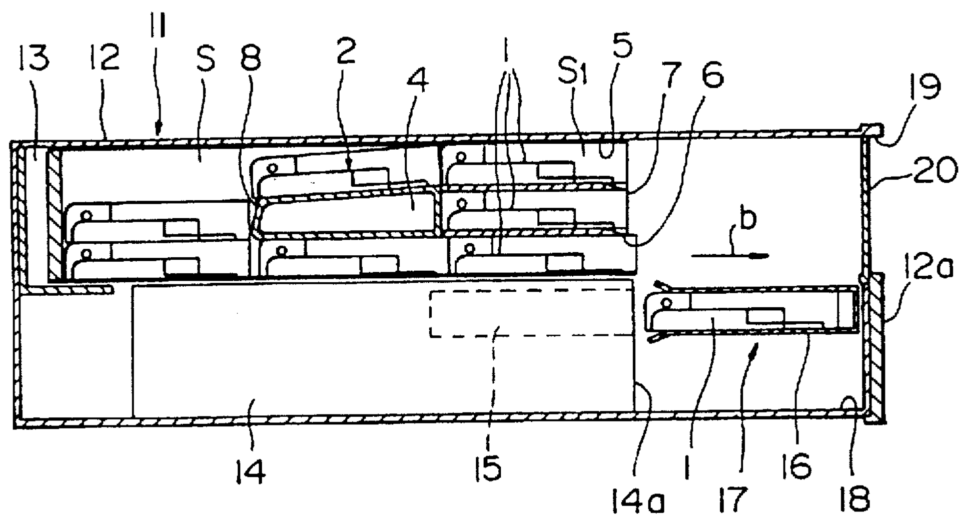
FIGS. 4A and 4B are schematic sectional side views illustrating the operation of transferring a tape cartridge, which is ejected into a cartridge tray of an elevator from a cartridge port of a drive, to a magazine, and returning the tape cartridge into a cartridge insertion port thereof.

When recording or reproduction is completed, the tape cartridge 1 loaded in the drive 14 is horizontally pushed into the cartridge tray 16 from the cartridge port 15 by a cartridge ejecting mechanism in the drive 14, which will be described below, in the direction shown by arrow b, as shown in FIG. 4(A).

Figure 4B:
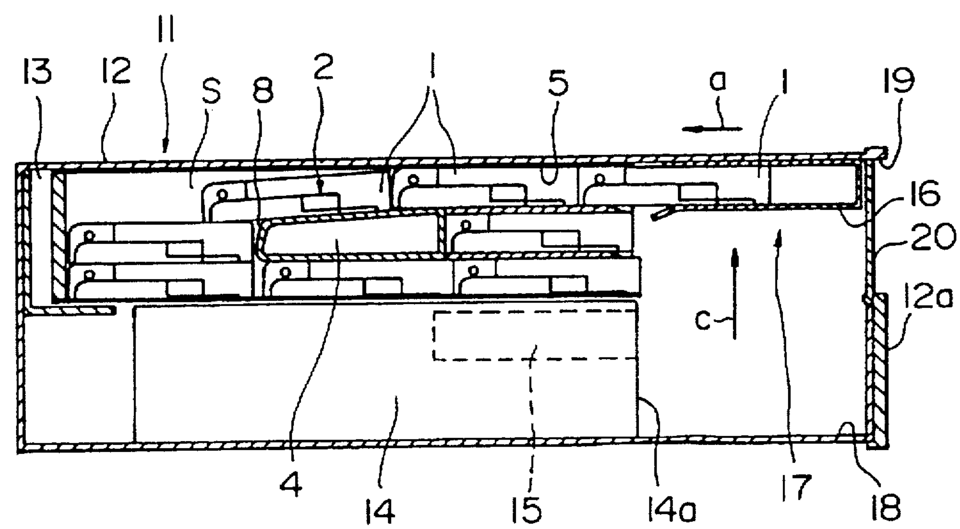

The tape cartridge 1, in which recording or reproduction is completed, is moved upward, by the cartridge tray 16, to the magazine upper stage position opposite to the cartridge insertion port 5 of the magazine 2 in the direction of arrow c, and then pushed into the cartridge insertion port 5 from the cartridge tray 16 by the second cartridge ejecting mechanism which will be described below, in the direction of arrow a, as shown in FIG. 4(B).

The two tape cartridges 1 in the upper stage in the cartridge rotation path 8 are automatically pushed by the stroke corresponding to one tape cartridge, in the direction of arrow a, by the tape cartridge 1 which is pushed into first space $S_1$ from the cartridge insertion port 5 in the direction of arrow a, so that one tape cartridge 1 is contained in the space S shown in FIG. 2(B), as shown in FIG. 5(A).

Repetitions of the first rotation operation therefore permit the seven tape cartridges 1 to be successively continuously rotated (automatically changed) one by one between the magazine 2 and the drive 14 while being successively rotated by the stroke corresponding to one tape cartridge in the directions of arrows a and b within the cartridge rotation path 8 of the magazine 2, thereby permitting continuous recording and reproduction on and from the seven tape cartridges 1.

When seven tape cartridges 1 for recording computer data or the like are contained in the cartridge rotation path 8 of the magazine 2, therefore, the storage capacity of the auto-loader 11 can significantly be increased.

[Second Operation of Rotating Tape Cartridges Within the Auto-Loader]

Figure 6A:
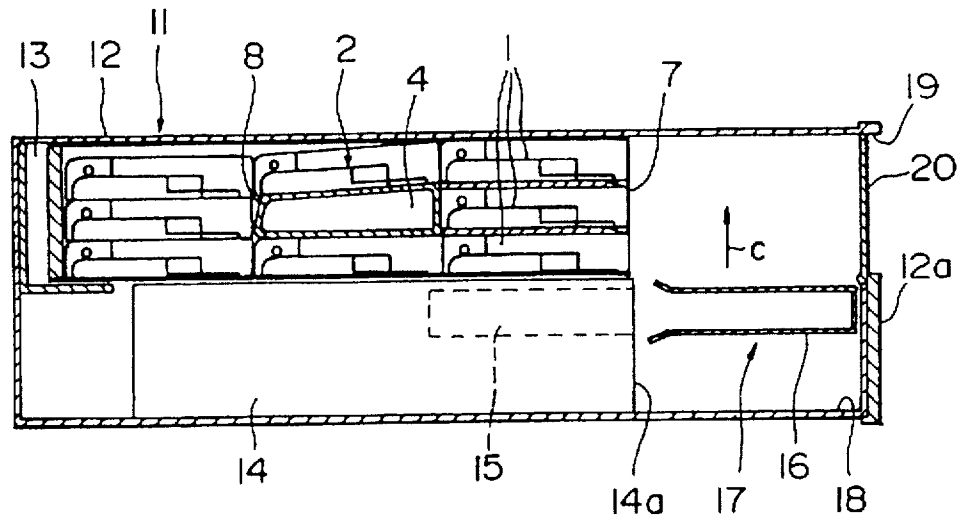
FIGS. 6A and 6B are schematic sectional side views illustrating the operation of ejecting a tape cartridge into a cartridge tray of an elevator from a cartridge containment port of a magazine.
Figure 6B:
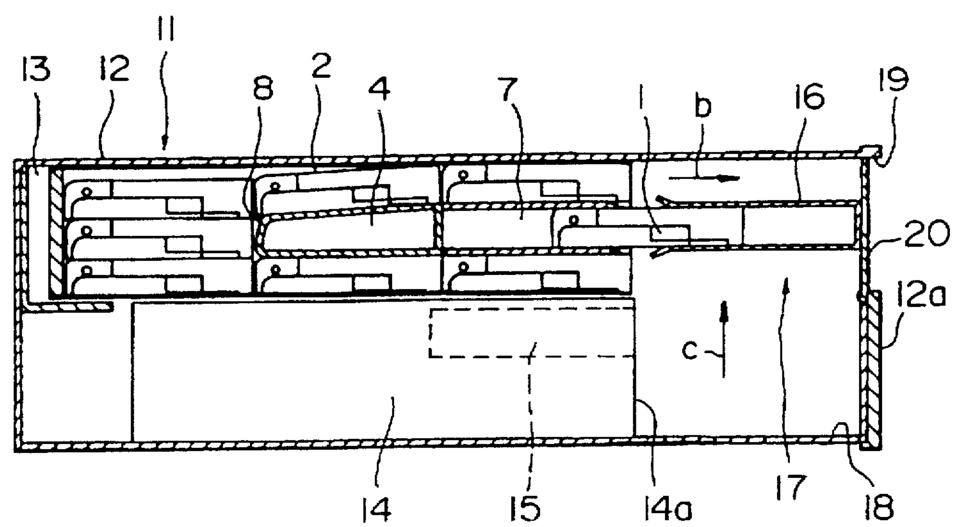
Figure 7A:
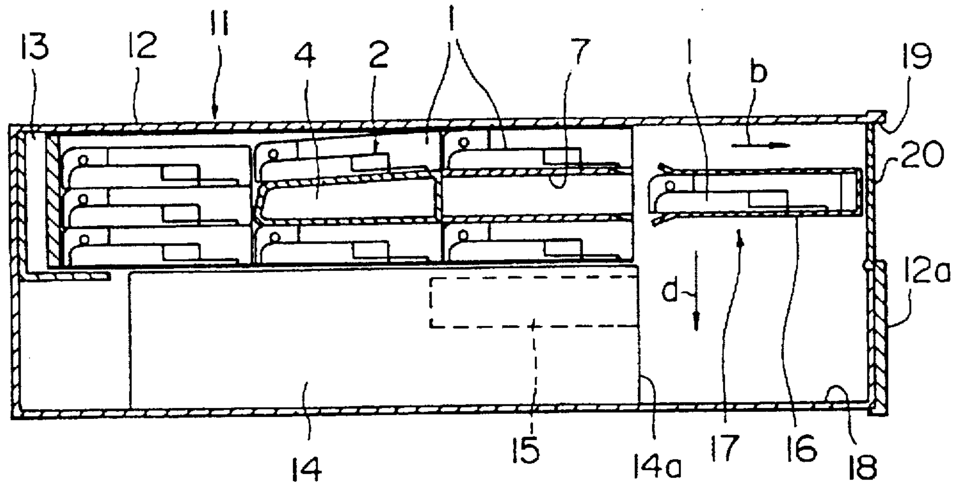
FIGS. 7A and 7B are schematic sectional side views illustrating the operation of transferring a tape cartridge, which is ejected into a cartridge tray of an elevator from a cartridge containment port of a magazine, to a cartridge port of a drive.

After the cartridge tray 16 is moved upward to the magazine middle stage position opposite to the cartridge containment port 7 of the magazine 2 from the drive position shown in FIG. 6(A), as shown in FIG. 6(B), only one tape cartridge 1 contained in the cartridge containment port 7 is horizontally pushed into the cartridge tray 16 in the direction of arrow b by a third cartridge ejecting mechanism which will be described below, as shown in FIGS. 6(B) and 7(A).

Figure 7B:
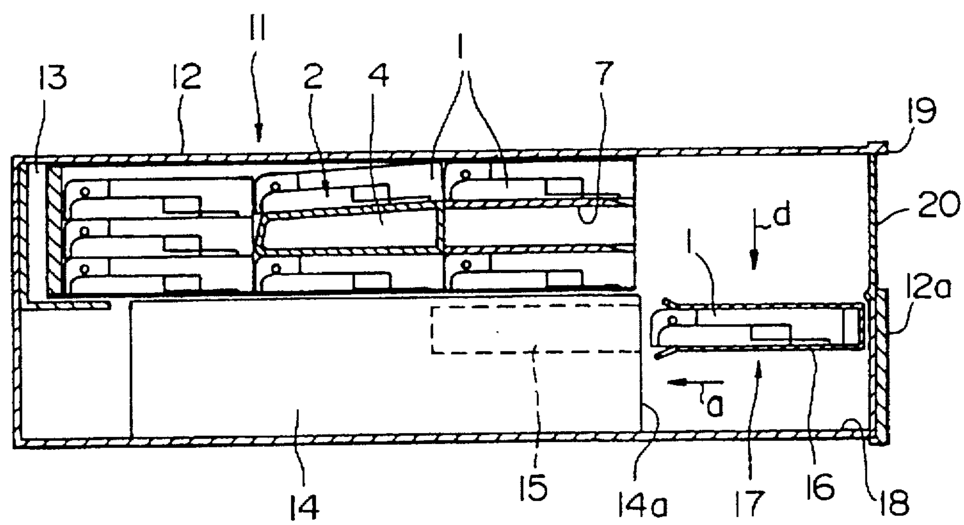
Figure 8A:
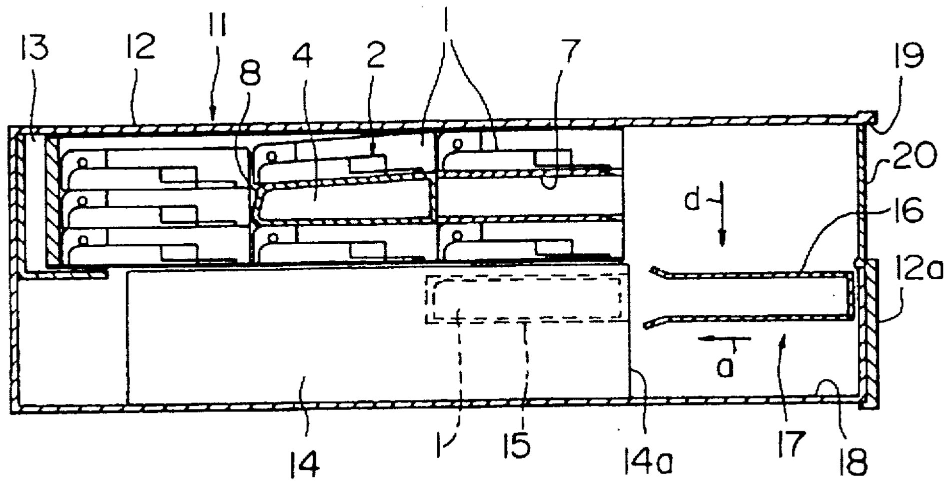
FIGS. 8A and 8B are schematic sectional side views illustrating the operation of transferring a tape cartridge between a cartridge tray of an elevator and a cartridge port of a drive.
Figure 8B:
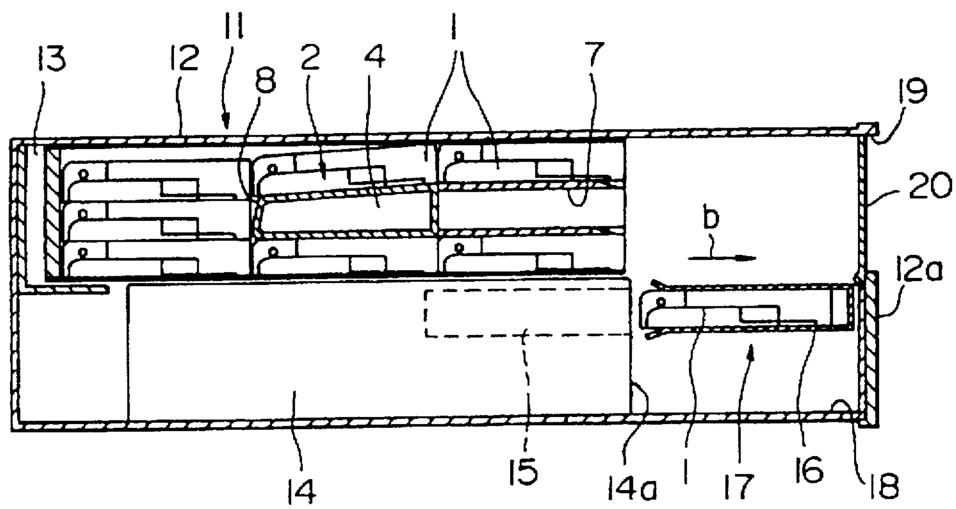

After the tape cartridge 1 is moved downward to the drive position in the direction of arrow d by the cartridge tray 16, as shown in FIG. 7(B), the tape cartridge 1 is horizontally pushed into the cartridge port 15 of the drive 14 from the cartridge tray 16 in the direction of arrow a by the same method as described above, as shown in FIG. 8(A), to be automatically loaded in the drive 14 for performing desired recording or reproduction.

Figure 9A:
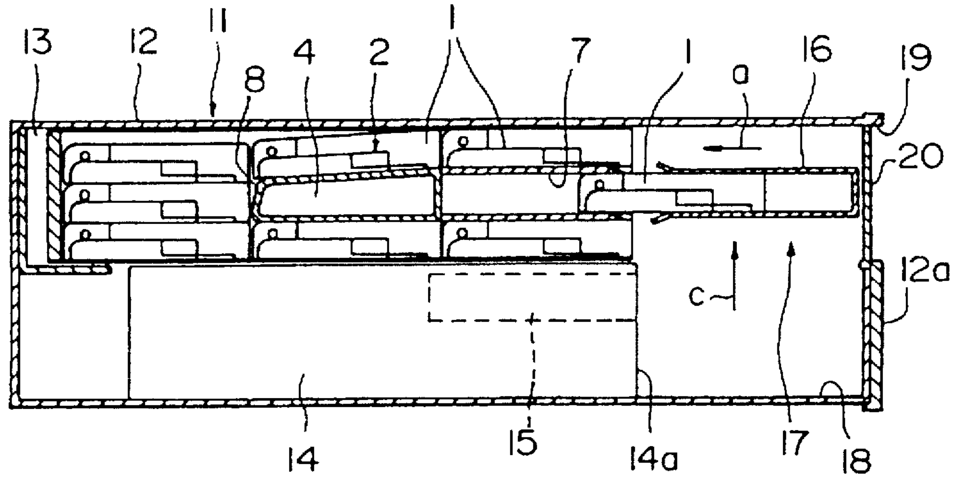
FIGS. 9A and 9B are schematic sectional side views illustrating the operation of returning a tape cartridge, which is ejected into a cartridge tray of an elevator from a cartridge port of a drive, into a cartridge containment port of a magazine.
Figure 9B:
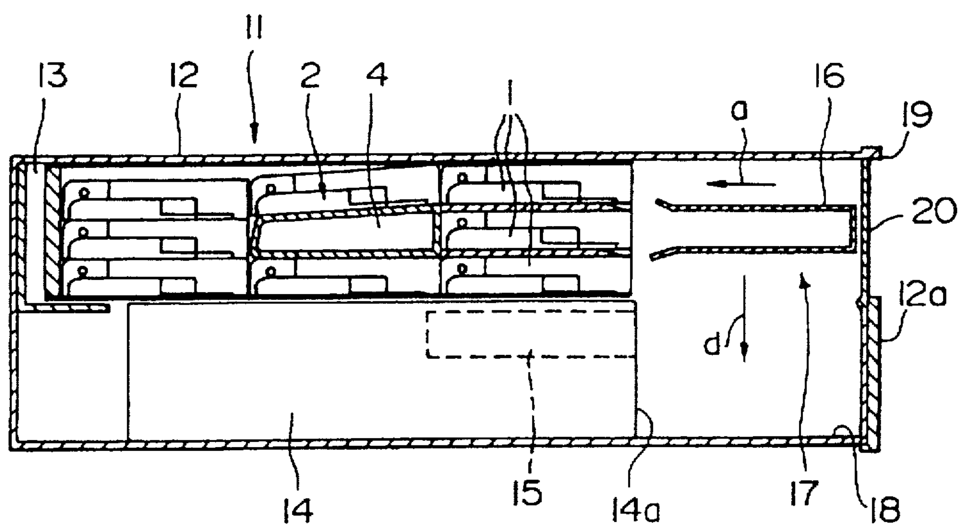

After recording or reproduction is completed, the tape cartridge 1 is horizontally pushed into the cartridge tray 16 from the cartridge port 15 of the drive 14 in the direction of arrow b by the same method as described above, as shown in FIG. 8(B), and is then moved upward to the magazine middle stage position by the cartridge tray 16 in the direction of arrow c, as shown in FIG. 9(A). The tape cartridge 1 is then horizontally pushed into the cartridge containment port 7 of the magazine 2 from the cartridge tray 16 in the direction of arrow a to be returned, as shown in FIGS. 9(A) and (B), and the cartridge tray 16 is again moved downward to the drive position in the direction of arrow d.

The second rotation operation permits only one tape cartridge to be rapidly rotated between the magazine 2 and the drive 14.

If a special tape cartridge for an index or cleaning is contained in the cartridge containment port 7 of the magazine 2, the special tape cartridge 1 can rapidly be rotated between the magazine 2 and the drive 14, thereby permitting high-speed processing of the auto-loader 11.

Although not shown in the drawings, when a tape cartridge 1 at a position within the cartridge rotation path 8 other than the cartridge ejection port 6 of the magazine 2 is selectively ejected and supplied to the drive 14, the tape cartridges 1 are successively transferred from the cartridge ejection port 6 to the cartridge insertion port 5 while cartridge tray 16 is moved upward and downward in the directions shown by arrows c and d between the cartridge ejection port 6 and the cartridge insertion port 5, so that the tape cartridges 1 are rotated in the directions shown by arrows a and b within the cartridge rotation path 8.

[Method of Controlling a Position where a Tape Cartridge is Ejected into the Elevator]

The method of controlling the ejection position in ejecting a tape cartridge into the elevator from the magazine and the drive is described below with reference to FIGS. 10A and 10B.

Figure 10A:
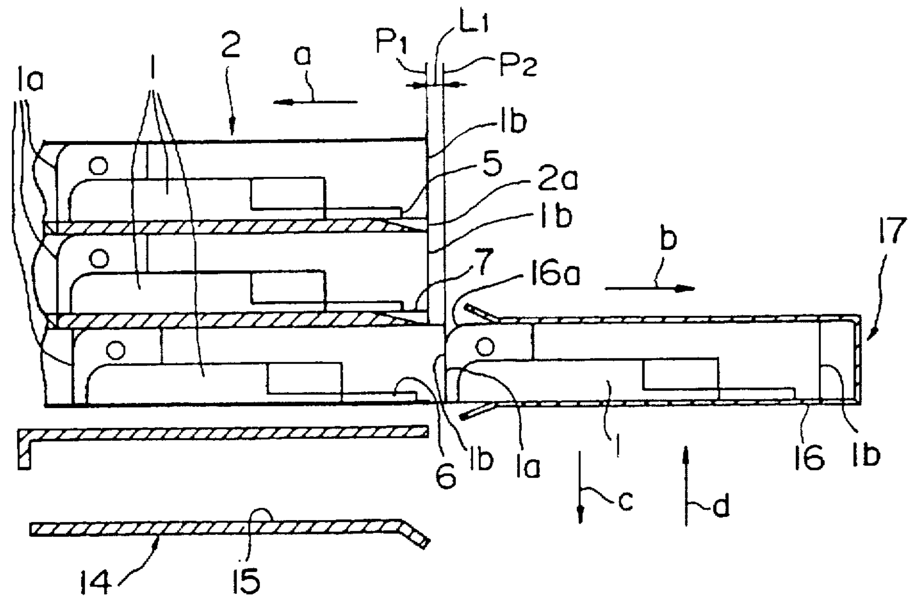
FIGS. 10A and 10B are schematic sectional side views illustrating two-step ejection positions of first and second ejection positions when a tape cartridge is ejected into a cartridge tray of an elevator from a magazine and a drive.

As shown in FIGS. 10(A) and (B), the tape cartridges 1 are respectively inserted into the cartridge insertion port 5 and the cartridge containment port 7 of the magazine 2 with the front ends 1*a* thereof at the head in the direction of arrow a. The tape cartridge 1 is pushed into the cartridge tray 16 of the elevator 17 from the cartridge ejection port 6 of the magazine 2 with the rear end 1*b* thereof at the head in the direction of arrow b.

The insertion position of the rear end 1*b* of the tape cartridge inserted into each of the cartridge insertion port 5 and the cartridge containment port 7 of the magazine 2 in the direction of arrow a is set to a reference position $P_1$ on substantially the same plane with the side 2*a* of the magazine 2, as shown in FIG. 10(A).

The ejection position $P_2$ of the front end 1*a* of the tape cartridge 1 to be ejected into the cartridge tray 16 from the cartridge ejection port 6 of the magazine 2 in the direction of arrow b is set to a first ejection position $P_2$ at a distance $L_1$ of about 1.5 mm, corresponding to one step, from the reference position $P_1$ in the direction of ejection of the cartridges (the direction shown by arrow h), as shown in FIG. 10(A).

Figure 10B:
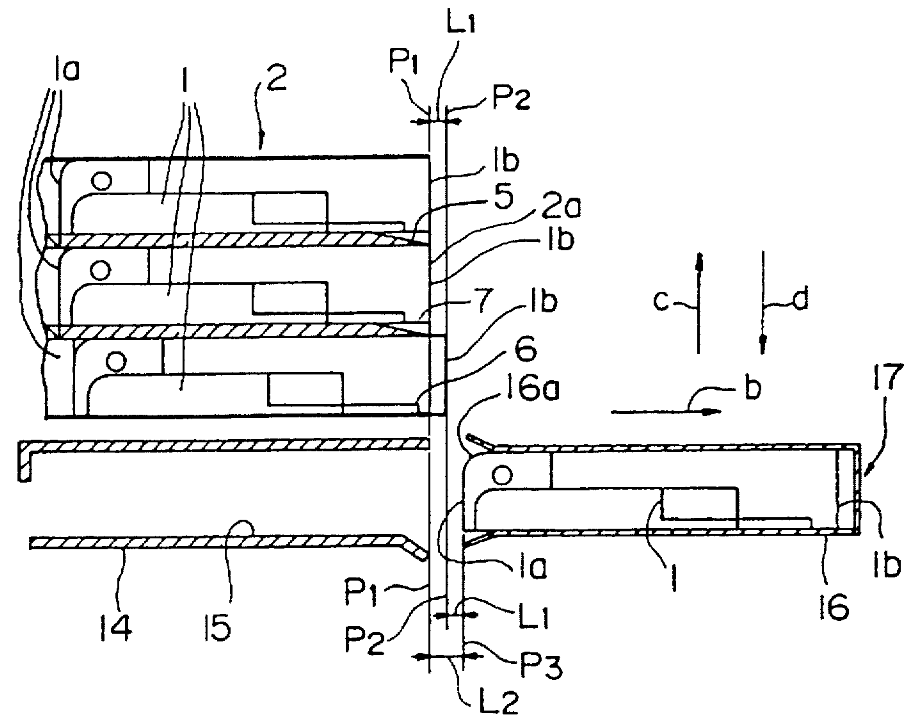
Figure 11:
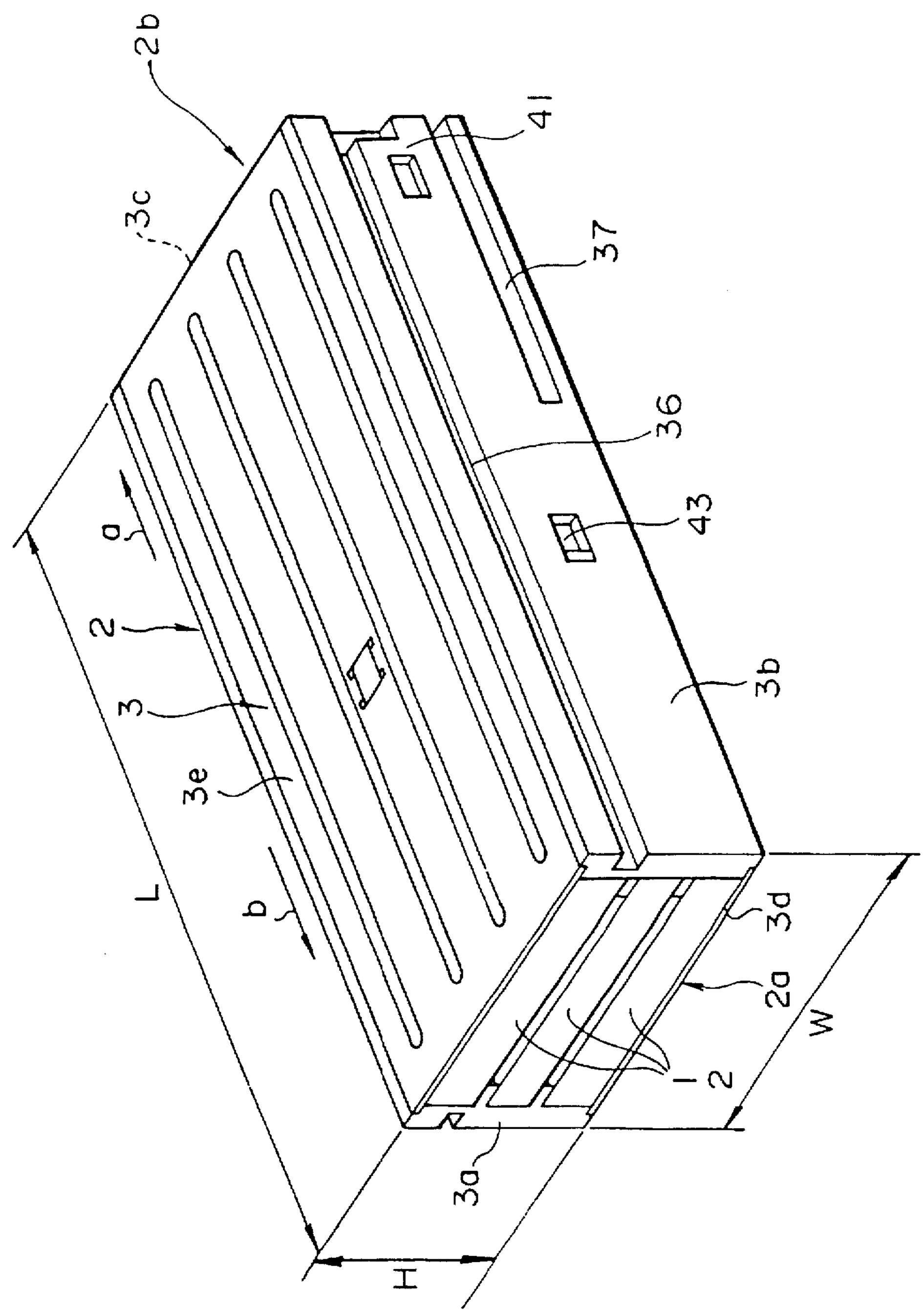
FIG. 11 is a perspective view of the whole magazine as viewed from the front and the left side thereof.
Figure 12:
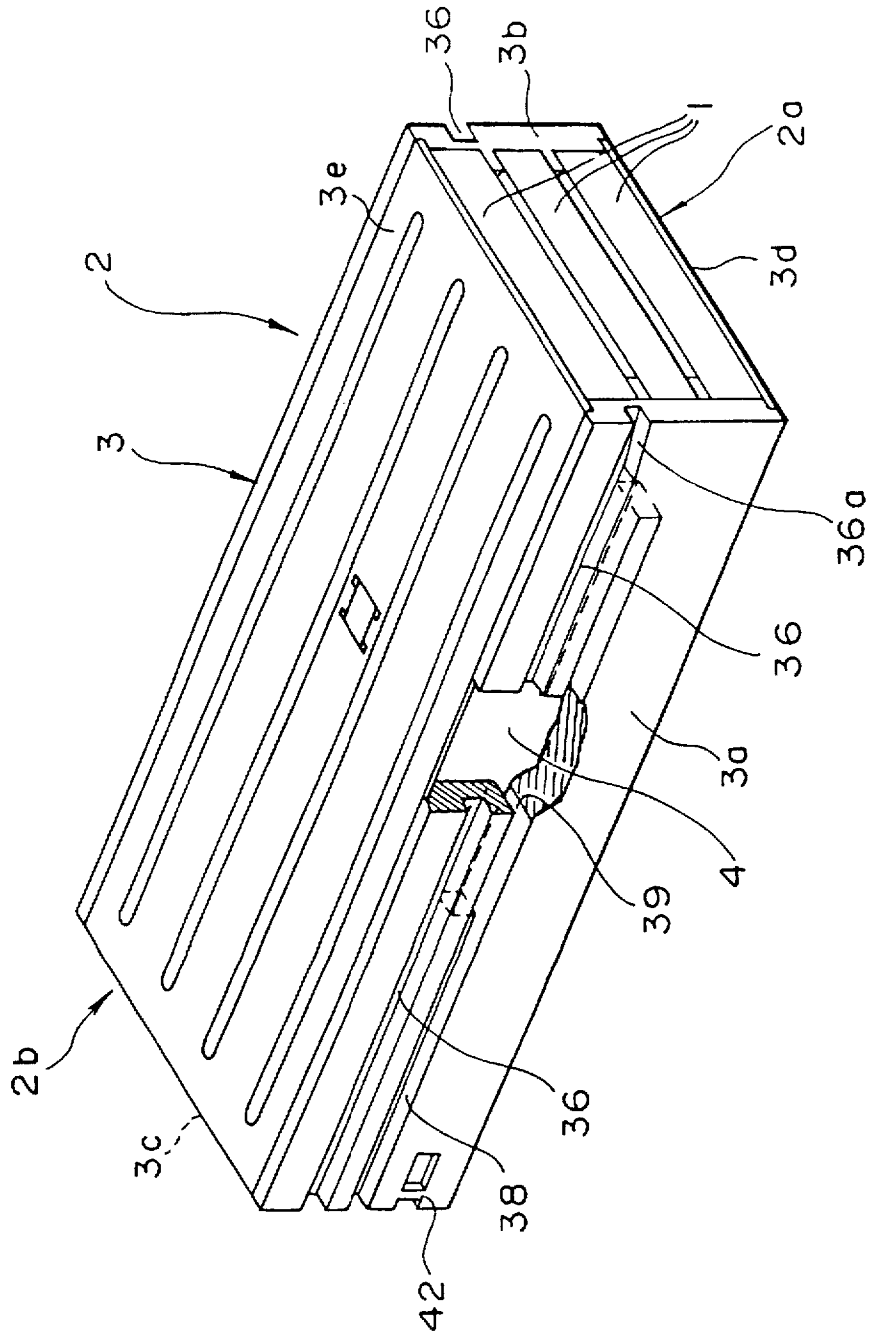
FIG. 12 is a partly broken-away perspective view of the whole magazine as viewed from the front and the left side thereof.
Figure 13:
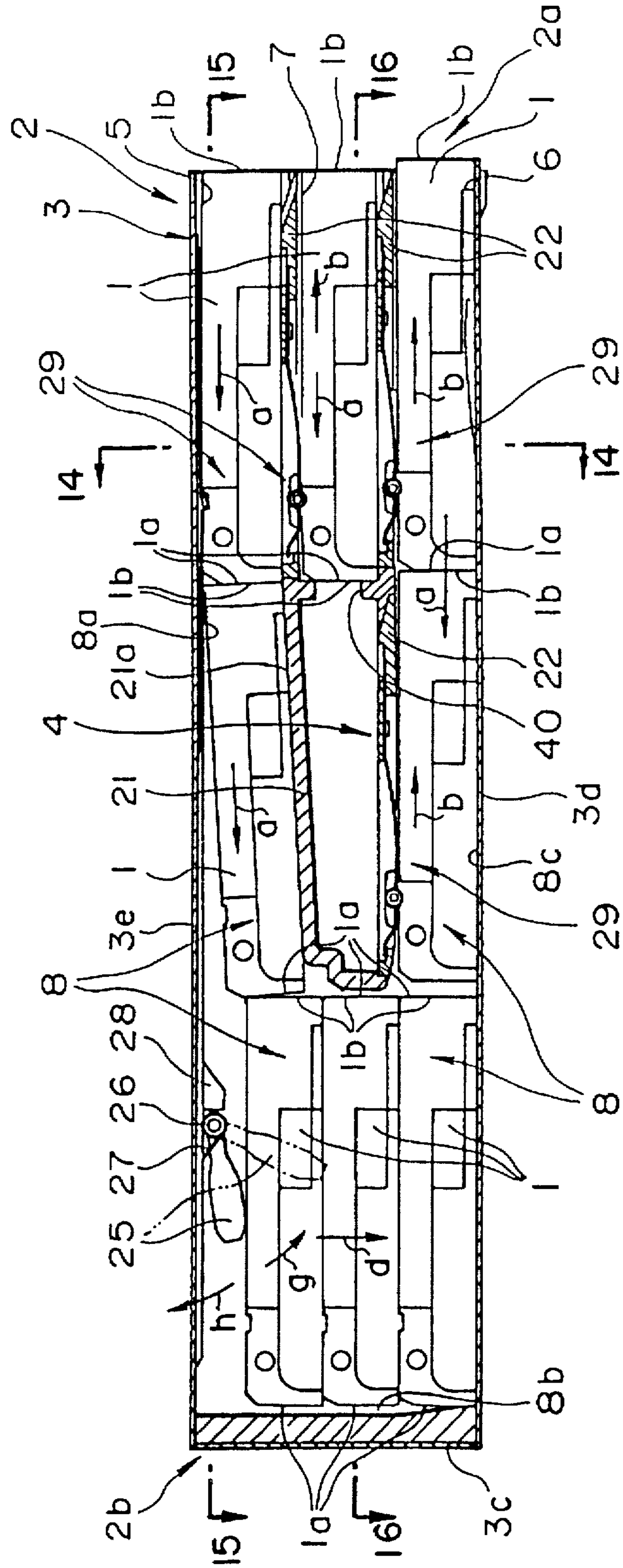
FIG. 13 is a longitudinal sectional side view of a magazine taken along a center line.
Figure 14:
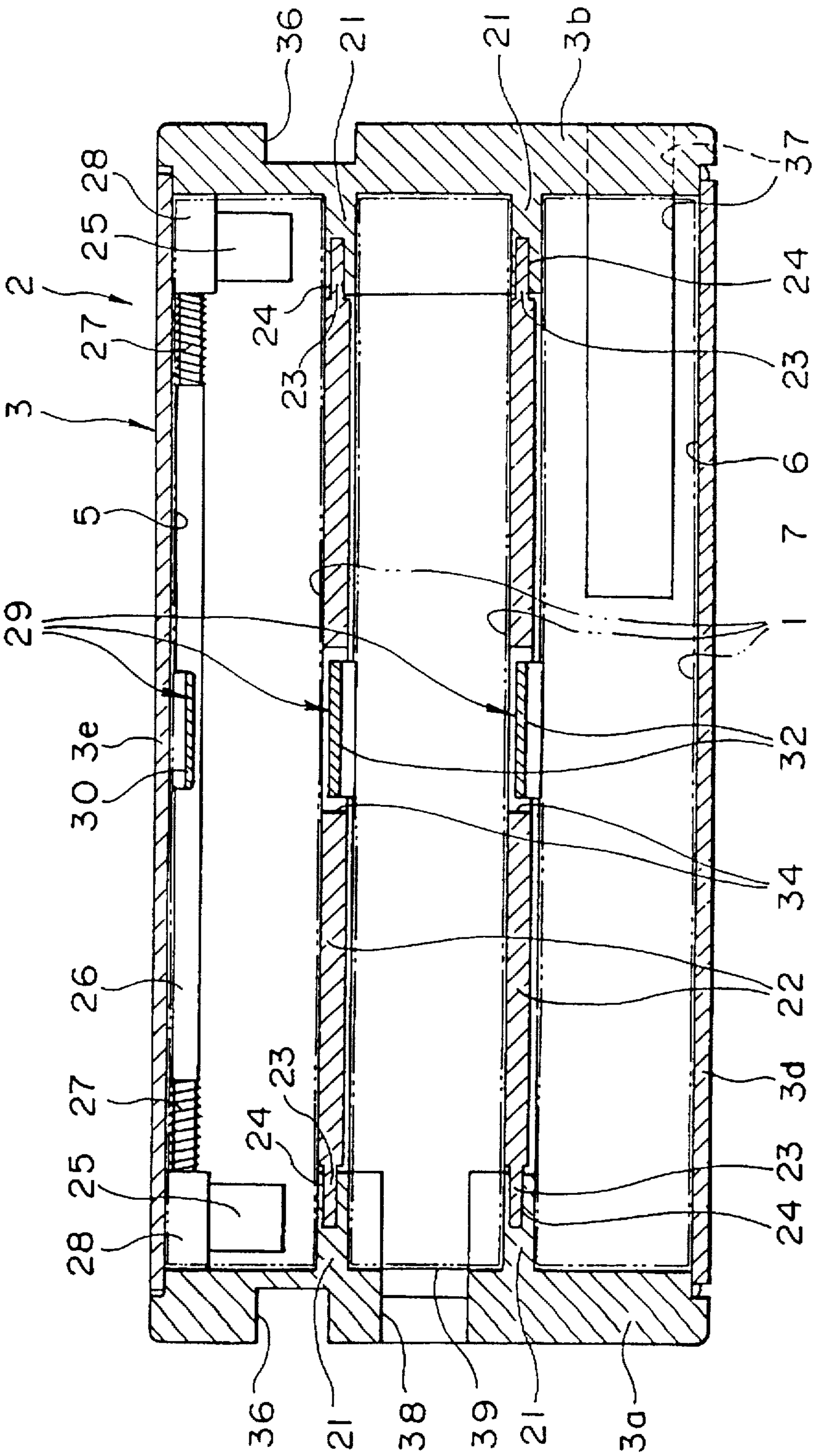
FIG. 14 is an enlarged sectional side view taken along line A—A of FIG. 13.
Figure 15:
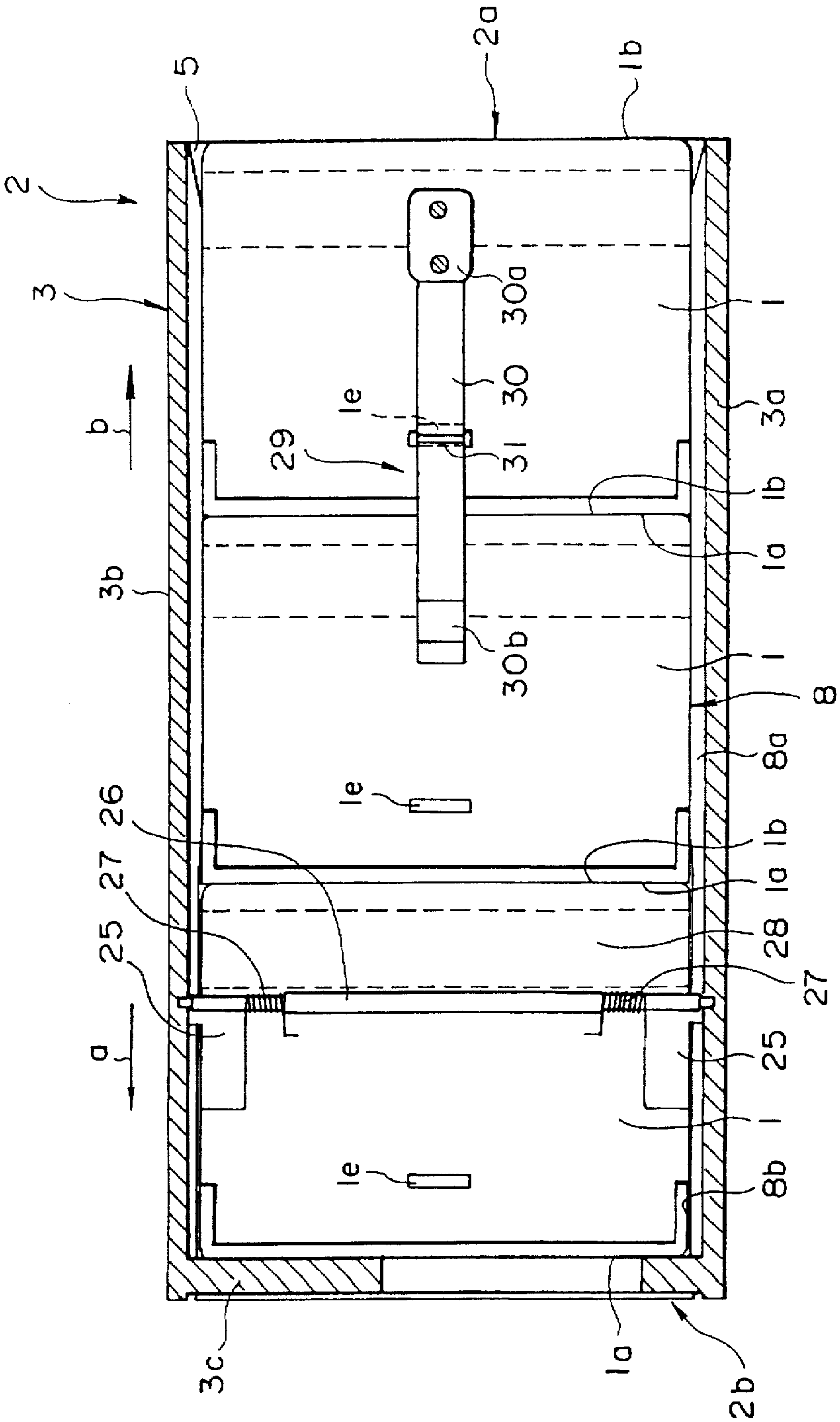
FIG. 15 is a sectional plan view taken along line B—B of FIG. 13.
Figure 16:
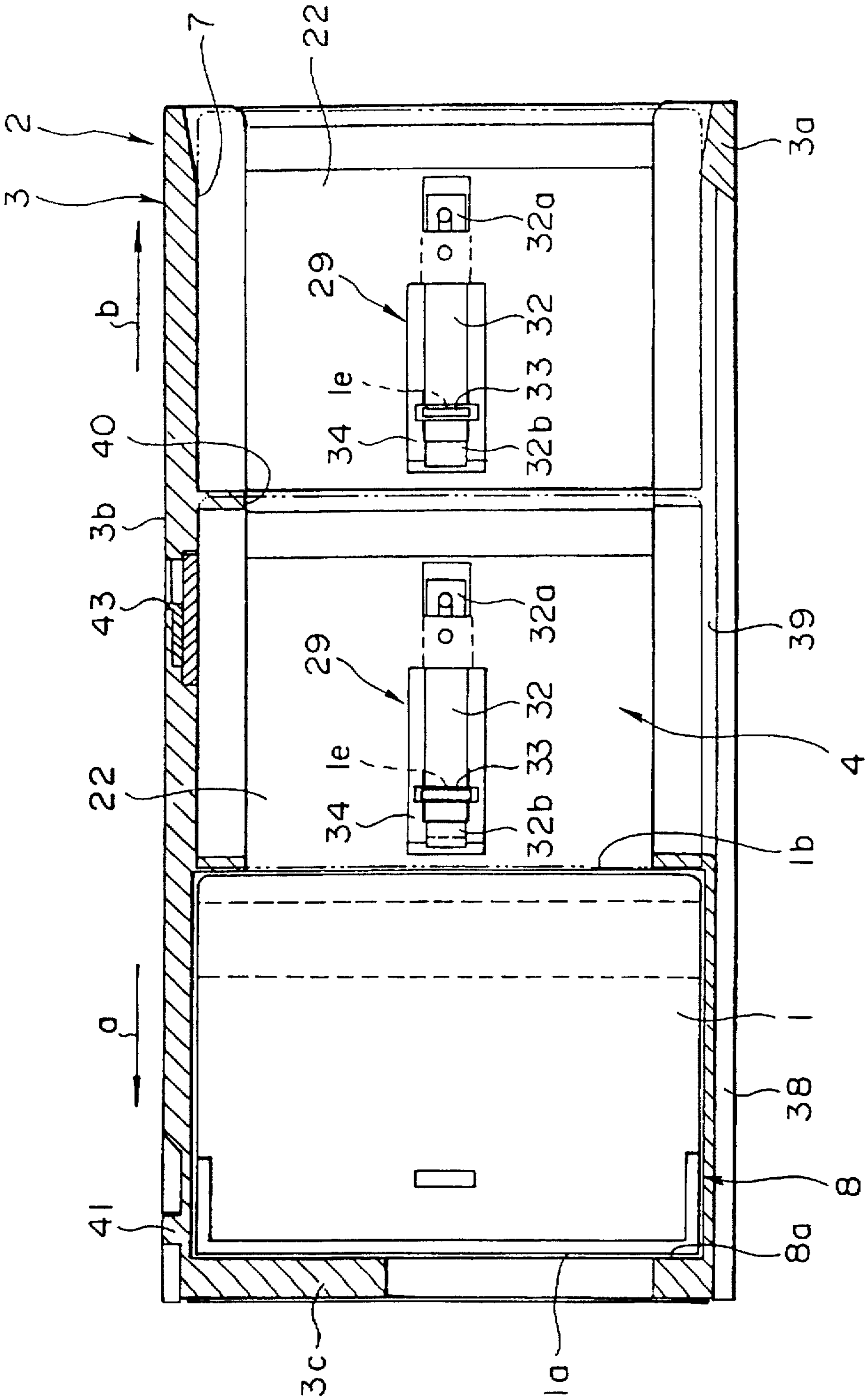
FIG. 16 is a sectional plan view taken along line C—C of FIG. 13.
Figure 17:
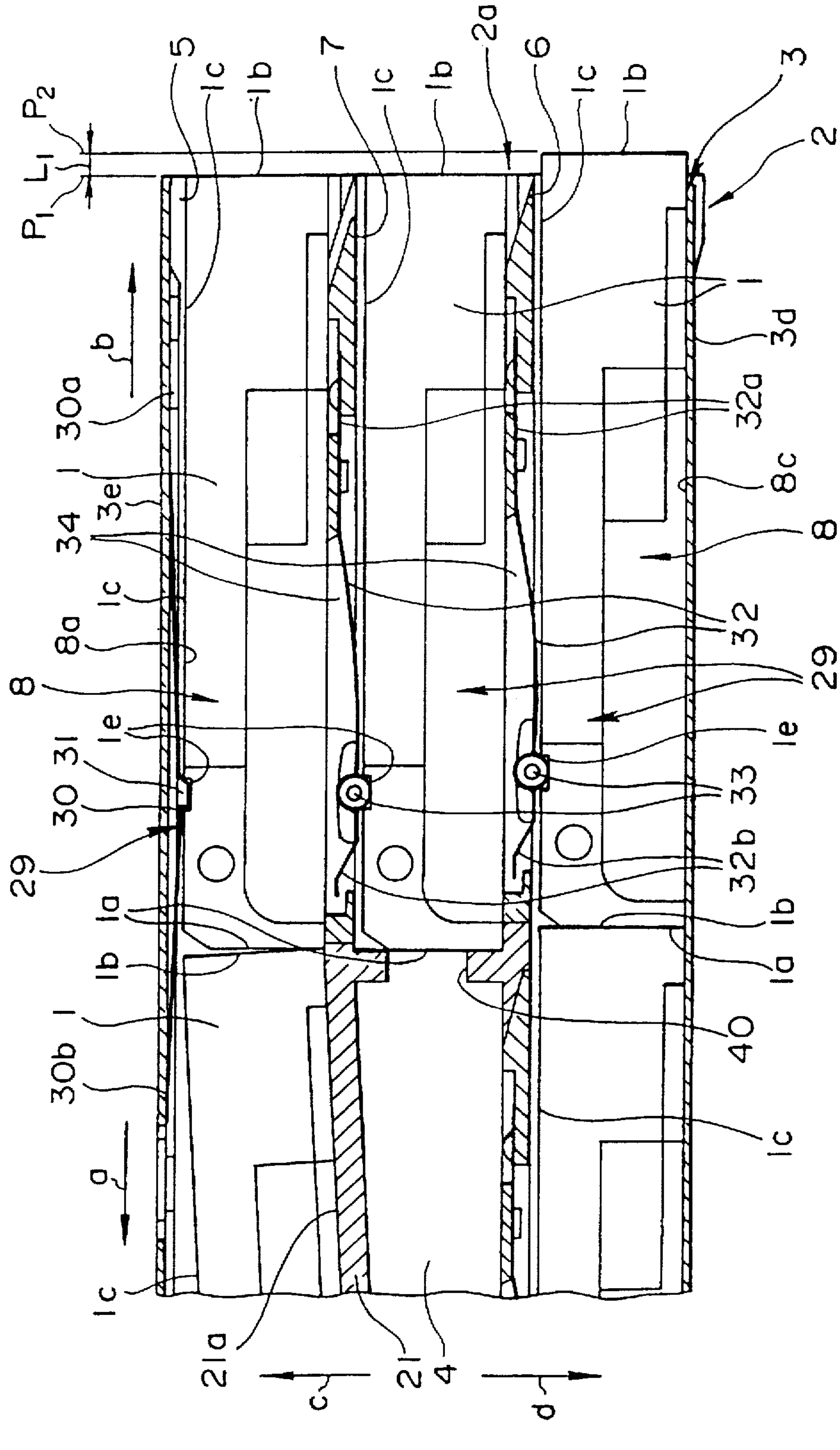
FIG. 17 is an enlarged sectional side view illustrating cartridge positioning means in a magazine.

The ejection position $P_3$ of the front end 1*a* of the tape cartridge 1 to be ejected into the cartridge tray 16 from the cartridge port 15 of the drive 14 and the cartridge containment port 7 of the magazine 2 in the direction of arrow b is set to a second ejection position $P_3$ at a distance $L_1+L_1$ corresponding to two steps from the reference position $P_1$ in the direction of ejection of the cartridge (the direction of arrow b), as shown in FIG. 10(B).

Namely, the ejection position $P_3$ of the front end 1*a* of the tape cartridge 1 to be ejected into the cartridge tray 16 from the cartridge port 15 and the cartridge containment port 7 is displaced to distance $L_2$ equal to $2L_1$ ($2L_1=L_1+L_1$) from the reference position $P_1$ in the direction of arrow b.

In this way, when the tape cartridges 1 are respectively ejected into the cartridge tray 16 from the cartridge ejection port 6 of the magazine 2 and the cartridge port 15 of the drive 14 in the direction of arrow b, the front ends 1a of the tape cartridges 1 are controlled to the ejection position $P_1$ displaced to a position at distance $L_1$ corresponding to one step, and the ejection position $P_3$ displaced to a position at distance $2L_1$ corresponding to two steps, respectively, from the reference position $P_1$ in the direction of arrow b. When the tape cartridge 1 pushed back into the cartridge tray 16 from the cartridge port 15 of the drive 14 in the direction of arrow b is moved upward in the direction of arrow c and returned into the cartridge insertion port 5 and the cartridge containment port 7 of the magazine 2, or when the tape cartridge 1 is moved upward from the cartridge ejection port 6 of the magazine 2 to the cartridge insertion port 5 thereof by the cartridge tray 16, it is possible to prevent mutual interference between the rear end 1b of the tape cartridge 1 positioned in the cartridge ejection port 6 and the front end 1a of the tape cartridge 1 moved upward in the direction of arrow c by the cartridge tray 16, thereby permitting the safe operation of rotating the tape cartridges 1.

[Description of the Magazine]

The magazine is described below with reference to FIGS. 11 through 17.

The magazine 2 has a magazine body 3 which is formed in a substantially rectangular parallelepipedic box, and outside dimensions including a height H of 39 mm, a width w of 83 mm and a length L of 168 mm.

The magazine body 3 comprises left and right side plates 3a and 3b which are made of a synthetic resin plate having an appropriate thickness, and a back plate 3c, a bottom plate 3d and a top plate 3e which are made of a thin metallic plate such as a stainless plate or the like. These left and right side plates 3a and 3b, the back plate 3c, the bottom plate 3d and the top plate 3e are assembled by an engagement structure and screws.

A pair of guide ribs 21 having a flat and substantially prismatic form are integrally respectively formed on the opposite inner surfaces of the left and right side plates 3a and 3b at substantially the center thereof in the lengthwise direction (the directions of arrows a and b) and the vertical direction (the directions of arrows c and d). The hollow portion 4 having a volume corresponding to substantially one tape cartridge is formed between the pair of the right and left guide ribs 21.

The lengthwise side 2a of the magazine body 3 is completely open, and three horizontal partition plates 22 are provided at a total of three positions, i.e., two positions corresponding to the upper and lower sides of the hollow portion 4 between the side 2a and the hollow portion 4, and the position of the lower side of the hollow portion, between the left and right side plates 3a and 3b. Each of the partition plates 22 comprises a thin synthetic resin plate, and is detachably placed between the left and right side plates 3a and 3b by a structure of engagement between the left and right ends thereof and left and right side plates using a plurality of dowels 23 and slits 24.

On the side 2a of the magazine body 3, the cartridge insertion port 5 is formed between the top plate 3e and the upper partition plate 22, the cartridge containment port 7 is formed between the upper and lower partition plates 22, and the cartridge ejection port 6 is formed between the lower partition plate 22 and the bottom plate 3d.

A vertical path 8b is formed in the vertical space between the hollow portion 4 and the back plate 3c in the magazine body 3. The substantially U-shaped cartridge rotation path 8, which is formed around the hollow portion 4 in the directions shown by arrow a, d and b, comprises an upper horizontal path 8a extending from the cartridge insertion port 5 to the upper portion of the vertical path 8b through the portion above the hollow portion 4, the vertical path 8b, and a lower horizontal path 8c extending from the lower portion of the vertical path 8b to the cartridge ejection port 6 through the portion below the hollow portion 4.

Each of the upper surfaces of the pair of the left and right guide ribs 21, which form the upper side of the hollow portion 4, comprises an inclined surface 21a inclined downward in the direction shown by arrow a, and a pair of left and right cartridge depressing levers 25 are provided on the upper portion of the vertical path 8b.

The pair of the left and right cartridge depressing levers 25 are provided at both ends of a fulcrum shaft 26 horizontally placed between the left and right side plates 3a and 3b so as to be rotatable in the directions shown by arrows g and h, and are urged by a pair of springs 27 so as to be rotated in the direction shown by arrow g. A pair of left and right cartridge guides 28 which also respectively serve as stoppers for regulating the rotation angles of the pair of the left and right cartridge depressing levers 25 are fixed to the lower side of the top plate 3e.

A total of four cartridge positioning mechanisms 29 for respectively positioning the tape cartridges 1 are provided at four positions including positions in the cartridge insertion port 5, the cartridge ejection port 6 and the cartridge containment port 7, and a lower position in the hollow portion 4.

An end 30a of the cartridge positioning mechanism 29 provided in the cartridge insertion port 5 in the direction of arrow b is fixed to the lower side of the top plate 3e, the other end 30b in the direction of arrow a comprising a long plate spring 30 which is engaged with the top plate 3e so as to be slidable in the directions shown by arrows a and b, and an engaging claw 31 serving as an engaging portion integrally formed substantially at the center of the plate spring 30 in the lengthwise direction thereof. The engaging claw 31 of the plate spring 30 can vertically be moved in the directions shown by arrows c and d within a narrow space between the top plate 3e and the upper side 1c of the cartridge 1. The engaging claw 31 has the directional property which allows the tape cartridge 1 to pass in the direction of arrow a, but inhibits the reverse movement in the direction shown by arrow b.

The ends 32a of the total of the three cartridge positioning mechanisms 29 in the direction shown by arrow b, which are provided in the cartridge ejection port 6 and the cartridge containment port 7 and at the lower position of the hollow portion 4, are respectively fixed to the three partition plates 22, each of the other ends 32b in the direction shown by arrow a comprising a short plate spring 32 which is vertically movable in the directions shown by arrows c and d, and an engaging roller 33 serving as an engaging portion which is rotatably provided at a position near the other end 32a of the plate spring 32. The plate spring 32 and the engaging roller 33 can vertically be moved in the directions shown by arrows c and d within the opening 34 formed in each of the partition plates 22.

Each of the engaging claw 31 and the engaging rollers 33 of the cartridge positioning mechanisms 29 is elastically downwardly engaged in a recessed portion 1e which serves as an engaged portion and which is formed at the central portion of the upper side 1c of each of the tape cartridges 1 near the front end 1a thereof, so as to position each of the tape cartridges 1 at the above-described position.

A pair of left and right horizontal guide grooves 36 are respectively formed along the upper ends of the left and right side plates 3*a* and 3*b*, which form the left and right lateral sides of the magazine body 3 in the widthwise direction thereof, so as to extend lengthwise between both sides 2*a* and 2*b*. In order to prevent error in insertion of the magazine into the auto-loader 11, the end 36*a* of one of the guide grooves 36 on the side of the point of arrow a, which is formed in the side plate 3*a*, is tapered.

A first slit opening 37 is formed at the same height as the cartridge ejection port 6 by cutting the side plate 3*b* from the lower end of the back plate 3*c* of the magazine body 3 along the lower end of the side plate 3*b* in the direction shown by arrow b. A guide groove 38 is formed in the other side plate 3*a* of the magazine body 3 so as to extend from the other side 2*b* in the direction shown by arrow b at the same height as the cartridge containment port 7. The guide groove 38 has a second slit opening 39 extending from the hollow portion 4 to the cartridge containment port 7. A slit-like notch 40 is formed at the end of the hollow portion 4 in the direction of arrow b at the same height as the second opening 39.

First and second locked portions 41 and 42 which respectively comprise projections are formed at the ends of the left and right side plates 3*a* and 3*b* of the magazine body 3 on the side of the other side 2*b*. An erasing error detecting means 42 comprising a sliding claw or the like for detecting erasing error of the eight tape cartridges 1 contained in the magazine 2 is provided at substantially the center of the side plate 3*b*.

[Operation of Setting Tape Cartridges in the Magazine]

The operation of setting the total of eight tape cartridges 1 in the magazine 2 is described below with reference to FIGS. 13 through 17.

In a normal state wherein the upper and lower sides 1*c* and 1*d* of each of the, tape cartridges 1 are vertically correctly positioned, the front ends 1*a* of the five tape cartridges 1 are successively inserted into the cartridge insertion port 5 of the upper horizontal path 8*a* of the cartridge rotation path 8 in the direction shown by arrow a. As a result, the tape cartridges 1 are successively pushed into the upper horizontal path 8*a* in the direction shown by arrow a against the plate spring 30 of the cartridge positioning mechanism 29 in the upper horizontal path 8*a*.

At this time, since the upper surface of the hollow portion 4 comprises the inclined surface 21*a* downwardly inclined in the direction shown by arrow a, the tape cartridges 1 can smoothly be moved within the upper horizontal path 8*a* in the direction shown by arrow a.

The preceding three tape cartridges 1 are successively entered in the upper portion of the vertical path 8*b* from the upper horizontal path 8*a*, and vertically successively pushed downward into the vertical path 8*b* in the direction shown by arrow d by the action of the pair of the left and right cartridge guides 28 to obliquely downwardly guide the tape cartridges 1, and the action of the coil springs 27 of the pair of the left and right cartridge depressing levers 25 to push the tape cartridges 1 in the downward direction shown by arrow g. These three tape cartridges 1 are vertically stacked and contained in the vertical path 8*b*.

The succeeding two tape cartridges 1 are respectively contained in the portion above the hollow portion 4 and in the cartridge insertion port 5 within the upper horizontal path 8*a*. At this time, the engaging claw 31 of the plate spring 30 which constitutes the upper cartridge positioning mechanism 29 is elastically downwardly engaged in the recessed portion 1*e* of the tape cartridge 1 contained in the cartridge insertion port 5 so that the tape cartridge 1 is correctly positioned in the cartridge insertion port 5 and inhibited from falling off from the cartridge insertion port 5 in the direction shown by arrow b. The tape cartridge 1 contained in the portion above the hollow portion 4 is positioned by holding the front and rear ends 1*a* and 1*b* thereof between the front end 1*a* of the tape cartridge 1 contained in the cartridge insertion port 5 and the rear end 1*b* of the tape cartridge 1 contained in the upper portion of the vertical path 8*b*.

In the normal state wherein the upper and bottom sides 1*c* and 1*d* of each of the tape cartridges 1 are correctly vertically positioned, the front ends 1*a* of the two tape cartridges 1 are successively inserted into the cartridge ejection port 6 of the lower horizontal path 8*c* of the cartridge rotation path 8 in the direction shown by arrow a. As a result, the two tape cartridges 1 are successively pushed into the lower horizontal path 8*c* against the plate springs 32 and the engaging rollers 33 of the two cartridge positioning mechanism 29 within the lower horizontal path 8*c*, and the engaging rollers 33 are respectively elastically engaged downward in the recessed portions 1*e* of the two tape cartridges 1, to respectively correctly position the two tape cartridges 1 in the portion below the hollow portion 4 and in the cartridge ejection port 6.

At this time, the three tape cartridges 1 may be first successively inserted into the lower horizontal path 8*c* and the lower portion of the vertical path 8*b* in the cartridge rotation path 8 from the cartridge ejection port 6 in the direction shown by arrow a. The four tape cartridges 1 may be then inserted into the upper horizontal path 8*a* and the vertical path 8*b* from the cartridge insertion port 5.

In this way, the total of seven tape cartridges 1 can be contained in the upper horizontal path 8*a*, the vertical path 8*b* and the lower horizontal path 8*c* of the cartridge rotation path 8.

The front end 1*a* of the remaining tape cartridge 1 in the normal state is then inserted into the cartridge containment port 7 in the direction shown by arrow a in the same manner as described above, and the engaging roller 33 of the plate spring 32 of the cartridge positioning mechanism 29 is elastically downwardly engaged in the recessed portion 1*e* of the tape cartridge 1 to position the tape cartridge 1. Thus, the operation of setting the total of eight tape cartridges in the magazine 2 can be completed.

The magazine 2 is characterized in that the total of eight tape cartridges 1 can rapidly smoothly be set in the magazine 2 only by the simple operation of successively inserting, in the direction shown by arrow a, the total of eight tape cartridges 1 into the vertical three-stage openings formed on the side 2*a*, i.e., the cartridge insertion port 5, the cartridge ejection port 6 and the cartridge containment port 7.

(Operation of Rotating Tape Cartridges Within the Magazine)

The operation of rotating the seven tape cartridges 1 within the cartridge rotation path 8 of the magazine 2 is described below with reference to FIGS. 2 through 5 and FIG. 13.

When a tape cartridge 1 is pushed into the cartridge tray 16 from the cartridge ejection port 6 of the magazine 2 in the direction shown by arrow b, as described above with reference to FIG. 2(A), the front end 1*a* of the tape cartridge 1 in the lower stage of the vertical path 8*b* is horizontally pushed in the direction shown by arrow b by the ejection operation of the first cartridge ejecting mechanism, which will be described below, in the direction of arrow b, to simultaneously push out the total of three tape cartridges 1 contained in the lower stage of the vertical path 8*b* and the lower horizontal path 8c by a stroke corresponding to one tape cartridge in the direction of arrow b. At this time, the two engaging rollers 33 in the lower horizontal path 8c are upwardly separated from the recessed portions 1e of the two tape cartridges 1 against the plate springs 31 to push out the tape cartridges 1 in the direction of arrow b.

The two tape cartridges 1 in the vertical path 8b are simultaneously and horizontally dropped down by a step corresponding to one tape cartridge in the direction shown by arrow d within the vertical path 8b by the return operation of the first cartridge ejecting mechanism, which will be described below, in the direction of arrow a, and the dropping operation accompanied with the force of the coil springs 27 of the pair of the left and right cartridge depressing levers 25 to push the tape cartridges 1 in the downward direction shown by arrow d, as described above with reference to FIG. 2(B), to generate the space S for one tape cartridge 1, in the upper portion of the vertical path 8b.

As described above with reference to FIGS. 4(B) and 5(A), the tape cartridge 1 is then pushed into the cartridge insertion port 5 of the magazine 2 from the cartridge tray 16 in the direction shown by arrow a to insert the three tape cartridges 1 in the upper horizontal path 8a and the upper portion of the vertical path 8b against the plate spring 30 of the cartridge positioning mechanism 29 in the upper horizontal path 8a, thereby loading the tape cartridge 1 in the space S.

As a result, the tape cartridges 1 are rotated by an amount corresponding to one tape cartridge in the directions of a, d and b within the cartridge rotation path 8. When this operation is repeated seven times, the total of the seven tape cartridges 1 can be rotated in a cycle within the cartridge rotation path 8. As described above, one tape cartridge 1 is simply moved in and out of the cartridge containment port 7 against the engaging roller 33 and the plate spring 32 of the cartridge positioning mechanism 29 in the directions shown by arrow a and b.

[Modified Embodiment of the Magazine]

Figure 18:
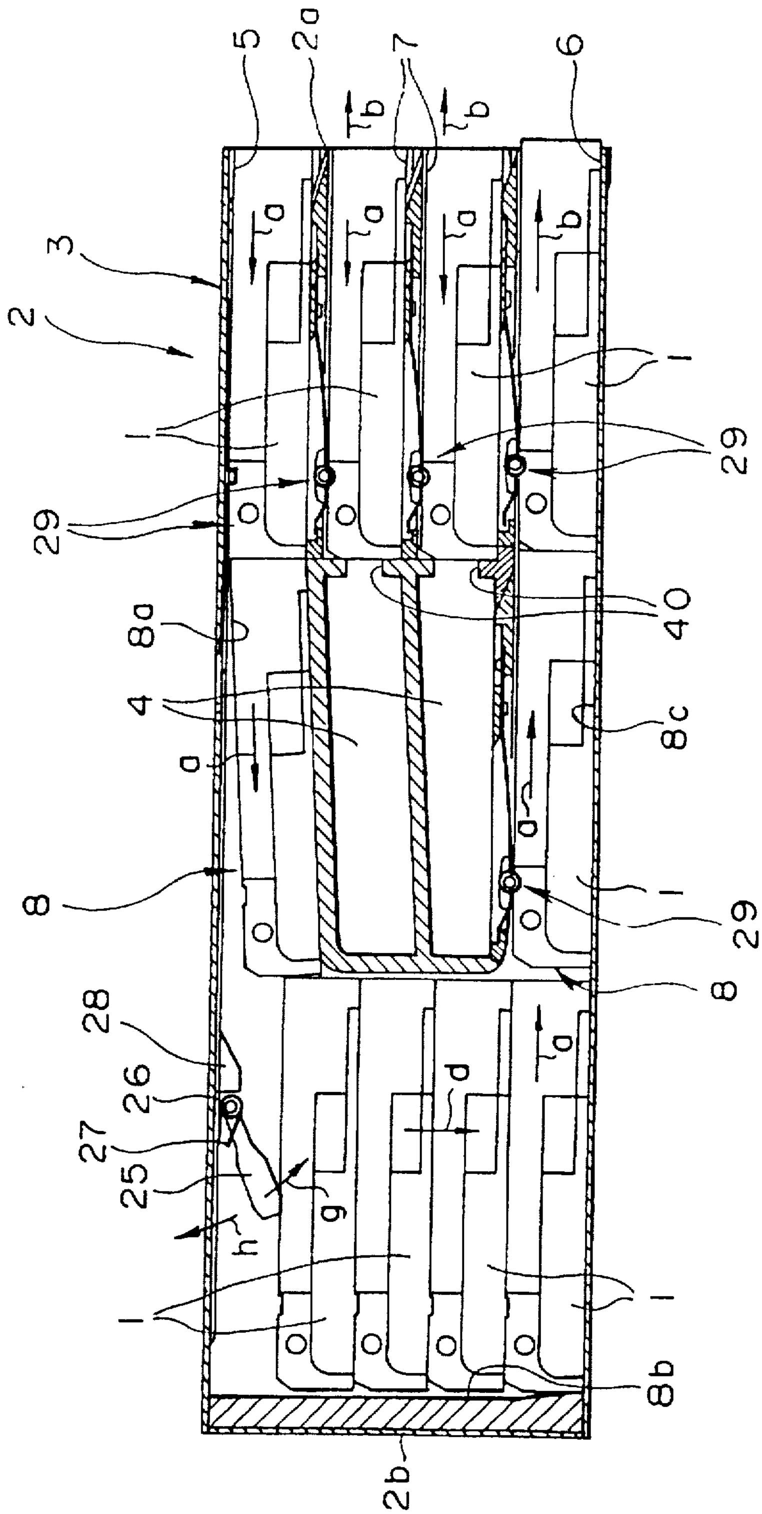
FIG. 18 is a longitudinal sectional view taken along a center line and illustrating a modified embodiment of a magazine.

A modified embodiment of the magazine is described below with reference to FIG. 18.

This magazine 2 comprises a cartridge insertion port 5, a cartridge ejection port 6, and cartridge containment ports 7 in upper and lower stages, which are disposed between the cartridge insertion port 5 and the cartridge ejection port 6 so that four tape cartridges 1 can vertically be stacked and contained in the vertical path 8b of the cartridge rotation path 8. This permits the containment of eight tape cartridges 1 in the cartridge rotation path 8, and the containment of a total of ten tape cartridges 1 including the two tape cartridges 1 contained in the cartridge containment ports 7 in the upper and lower stages, thereby significantly increasing the storage capacity of the auto-loader 11.

[Outline of the Auto-Loader]

The auto-loader is outlined with reference to FIGS. 19 through 23.

An auto-loader 11 comprises an auto-loader body 12 which is formed in a substantially rectangular parallelepipedic box, the auto-loader body 12 having the outside dimensions of a height $H_{10}$ of 82.5 mm, a width $W_{10}$ of 146.05 mm and a length $L_{10}$ of 243.2 mm.

A chassis 45 of the auto-loader body 12 is made of a sheet metal, and has a substantially U-shaped form comprising a horizontal bottom chassis 45a, and left and right side chassis 45b and 45c which are vertically formed at both sides of the bottom chassis 45a. The upper side and the left and right sides of the left and right side chassis 45b and 45c are covered with a substantially U-shaped top plate 45d, and the front side is closed by a front panel 12a made of a synthetic resin or the like to form a box.

A horizontal long magazine insertion space 13 is formed in an upper portion between the left and right side chassis 45b and 45c, and a magazine insertion port 19 is formed at the center of the upper portion of the front panel 12a in front of the magazine insertion space 13 (on the side of the point of arrow b) opposite thereto, a movable cover 20 made of a synthetic resin being provided on the inside of the front panel 12a so as to open the magazine insertion port 19 from the inside thereof.

The magazine 2 which is horizontally inserted from the magazine insertion port 19 in the direction shown by arrow a is guided by a pair of left and right guide rails 46 which are respectively horizontally provided on the insides of the left and right side chassis 45b and 45c and which respectively engage with the pair of left and right guide grooves 36, and the magazine 2 is then drawn into the magazine insertion space 13 to be set therein. A drive 14 is horizontally provided on the bottom chassis 45a below the magazine insertion space 13, and a cartridge tray 16 of an elevator 17 is horizontally disposed in the vertical tray elevating space 18 which is formed between the front side 14a of the drive 14, a side 2a of the magazine 2 set in the magazine insertion space 13, and the front panel 12a.

An eject button 47 is provided on the front panel 12 of the auto-loader 12. An interface 48, a power supply connector 49, etc. for connection with a computer (CPU) are provided on a rear panel 12b of the auto-loader body 12.

In the auto-loader body 12, the following are provided: A magazine loading mechanism 51 for loading and ejecting the magazine 2 into and from the magazine insertion space 13 in the directions shown by arrows a and b, a tray elevating mechanism 52 for moving upward and downward the cartridge tray 16 of the elevator 17 in the elevator space 18 in the directions shown by arrows c and d, a movable cover opening/closing mechanism 53 for opening and closing the movable cover 19 in the directions shown by arrow e and f, a first cartridge ejecting mechanism 54 for ejecting the tape cartridge 1 into the cartridge tray 16 from the cartridge ejection port 6 of the magazine 2 in the direction shown by arrow b, a second ejecting mechanism 55 for ejecting the tape cartridge 1 into the cartridge port 15 of the drive 14 and the cartridge insertion port 5 and the cartridge containment ports 7 of the magazine 2 from the cartridge tray 16 in the direction shown by arrow a, a third cartridge ejecting mechanism 56 for ejecting the tape cartridge 1 into the cartridge tray 16 from the cartridge containment port of the magazine 2 in the direction shown by arrow b, a cartridge loading mechanism 57 provided in the drive 14, a cartridge ejecting mechanism 58 for ejecting the tape cartridge 1 into the cartridge tray 16 from the cartridge port 15 of the drive 14 in the direction shown by arrow b, and a cartridge positioning mechanism 59 for positioning the tape cartridge 1 in the cartridge tray 16.

(Description of the Magazine Loading Mechanism)

The magazine loading mechanism 51 is described below with reference to FIGS. 21, 25 through 30 and 72.

The magazine loading mechanism 51 comprises a horizontal guide shaft 61 provided in parallel with the magazine insertion space 13 on the outside (the outside relative to the magazine insertion space 13) of one of the side chassis 45b and 45c of the chassis 45, and a slider 62 serving as a slide driving member which is slid along the guide shaft 61 in the directions shown by arrows a and b.

A pair of front and rear engaging claws 64 and 65a, which form a latch mechanism for latching a first locked projecting portion 41 of the magazine 2 in the lengthwise direction thereof, i.e., in the directions shown by arrow a and b, are provided at an end of the slider 62 on the side of the point of arrow a. The front engaging claw 64 on the side of the point of arrow a is fixed to the slider 62, and the rear engaging claw 65a on the side of the point of arrow b is integrally formed at the end of the engaging claw lever 65 on the side of the point of arrow a, which is provided on the slider 62 through a vertical fulcrum shaft 66 so as to be rotatable in the directions shown by arrows i and j. The front and rear engaging claws 64 and 65a are set at the same height as the first locked portion 41 of the magazine 2 loaded in the autoloader 11.

The engaging claw 64 is projected into the magazine insertion space 13 from an elongated hole 67 horizontally formed in the side chassis 45c, and the other engaging claw 65a can be moved in and out of the magazine insertion space 13 in the directions shown by arrows i and j through the elongated hole 67 by the engaging claw lever 65. The engaging claw lever 65 is rotationally urged by a coil spring 68 in the direction shown by arrow i so that the amount of projection of the engaging claw 65a into the magazine insertion space 13 is regulated by contact between a roller 69 serving as a stopper and provided on the engaging claw lever 65 and the side chassis 45c in the direction shown by arrow i.

A projection cam 70 for retracting the engaging claw lever 65 from the inside of the magazine insertion space 13 by rotating it around the fulcrum shaft 66 in the direction shown by arrow j against the coil spring 68 when the slider 62 is slid to standby position $P_{12}$ in the direction shown by arrow b is formed at the end of the elongated hole 67 of the side chassis 45c on the side of the point of arrow a, a driven cam 71 which is brought into contact with the projection cam 70 being formed in the engaging claw lever 65.

A driving mechanism for sliding the slider 62 in the directions shown by arrows a and b comprises a rack and pinion mechanism 76 comprising a rack 72 formed on the side of the slider 62, and a pinion 75 rotated by a motor 73 through a gear train 74 to drive the rack 72. The motor 73, the gear train 74 and the pinion 75 are provided on the side chassis 45c. In the rack and pinion mechanism 76, the motor 73 and the pinion 75 are connected by the gear train 74 comprising flat gears so that optical sensors which will be described below can be operated by moving, in the direction shown by arrow a, the slider 62 by the magazine 2 manually inserted in the direction shown by arrow a, as described. below.

Figure 27:
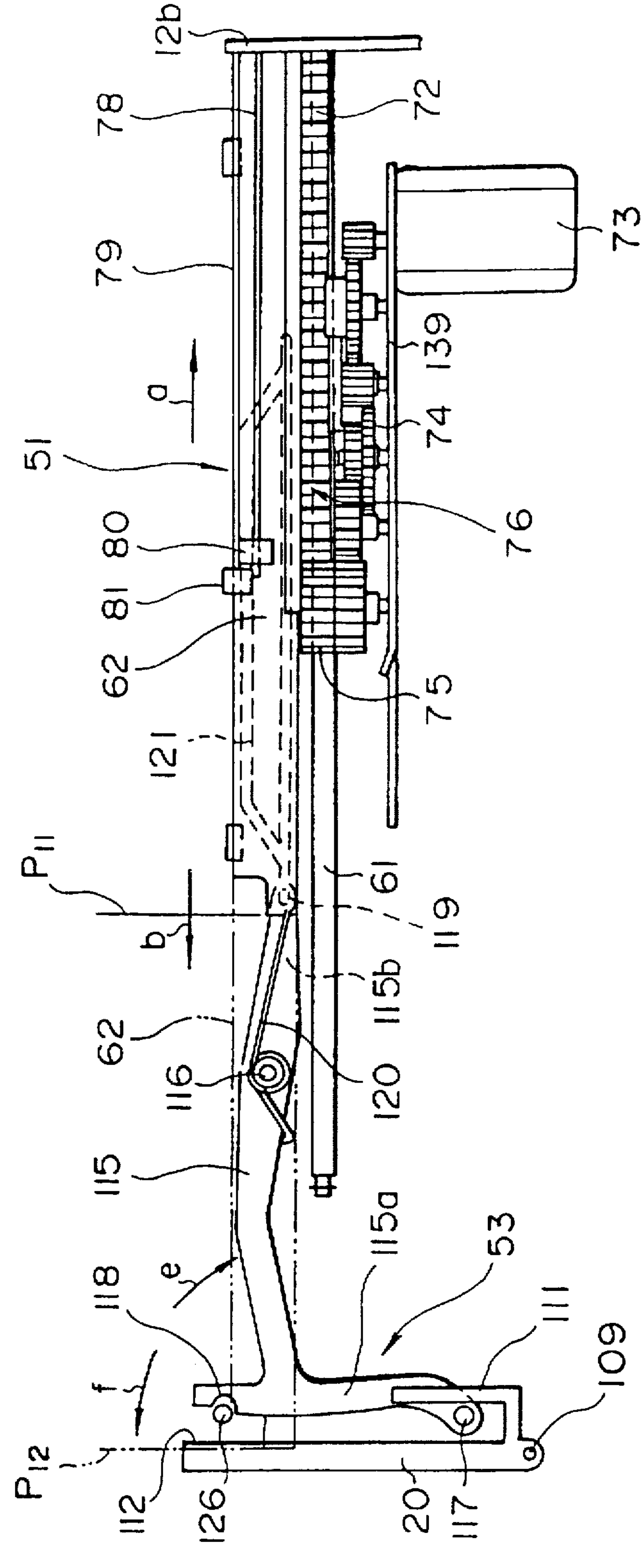
FIG. 27 is a sectional side view taken along line F—F of FIG. 26.
Figure 72:
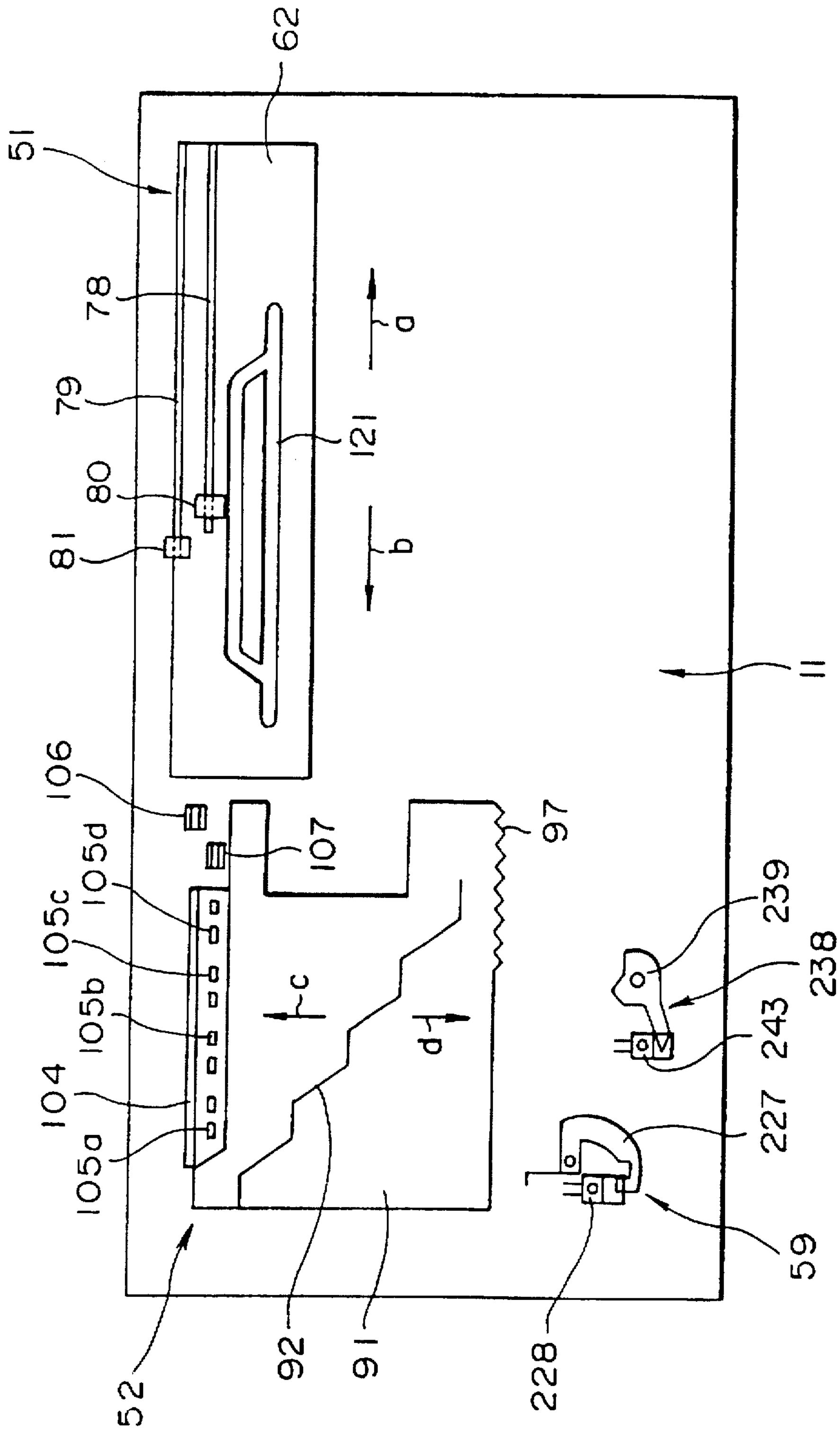
FIG. 72 is a schematic right side view illustrating a plurality of optical sensors in an auto-loader.

As shown in FIGS. 27 and 72, horizontal optical shutter plates 78 and 79 in upper and lower stages are integrally formed at the upper edge of the slider 62, and a pair of upper and lower optical sensors 80 and 81 which serve as photo-interrupters turned on and off by the optical shutter plates 78 and 79, respectively, are provided on the side chassis 45c. The optical sensor 80 serves as a magazine-in sensor for detecting insertion of the magazine 2, and the other optical sensor 81 serves as a magazine loading/eject sensor for detecting the completion of loading and ejection of the magazine 2.

[State of the Magazine Ejected]

Figure 26:
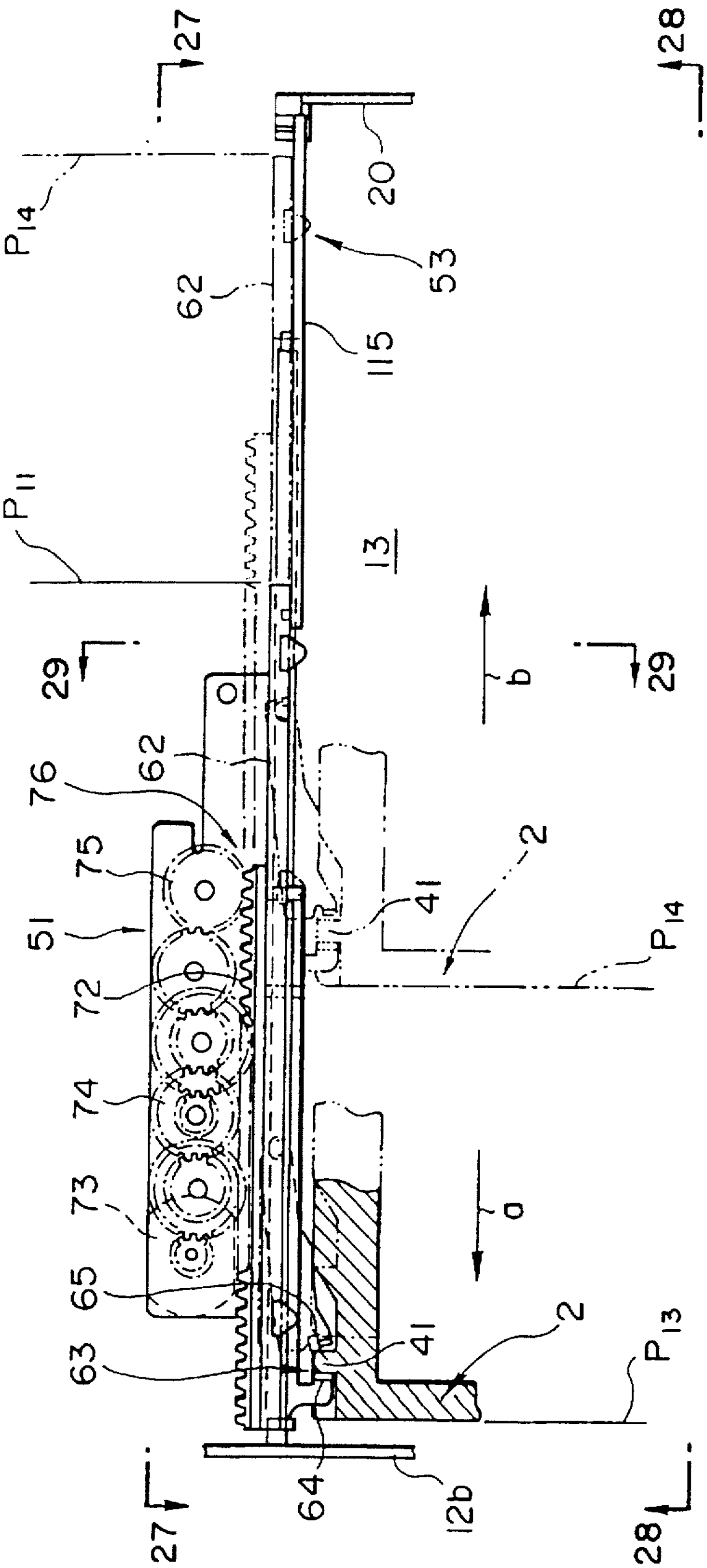
FIG. 26 is a partly broken-away plan view illustrating a magazine loading mechanism.
Figure 28:
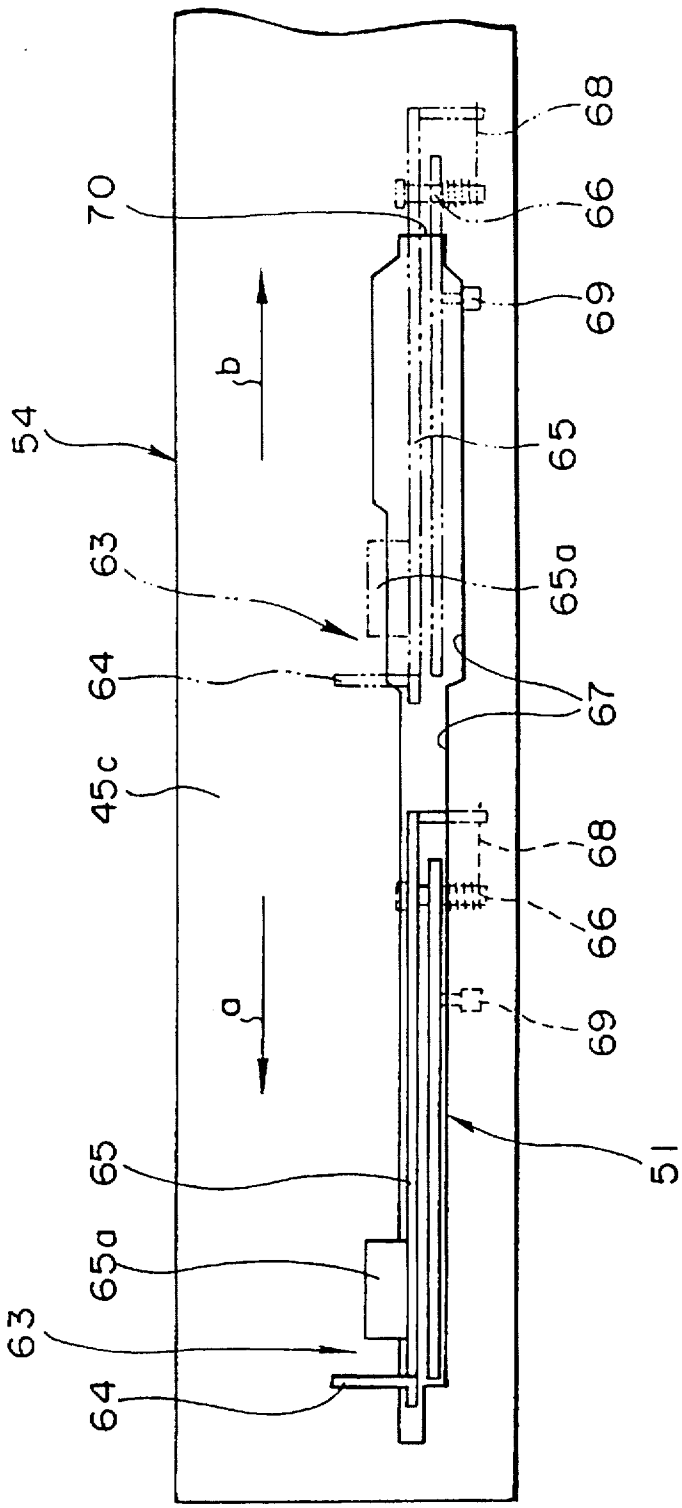
FIG. 28 is a sectional side view taken along line G—G of FIG. 26.
Figure 29:
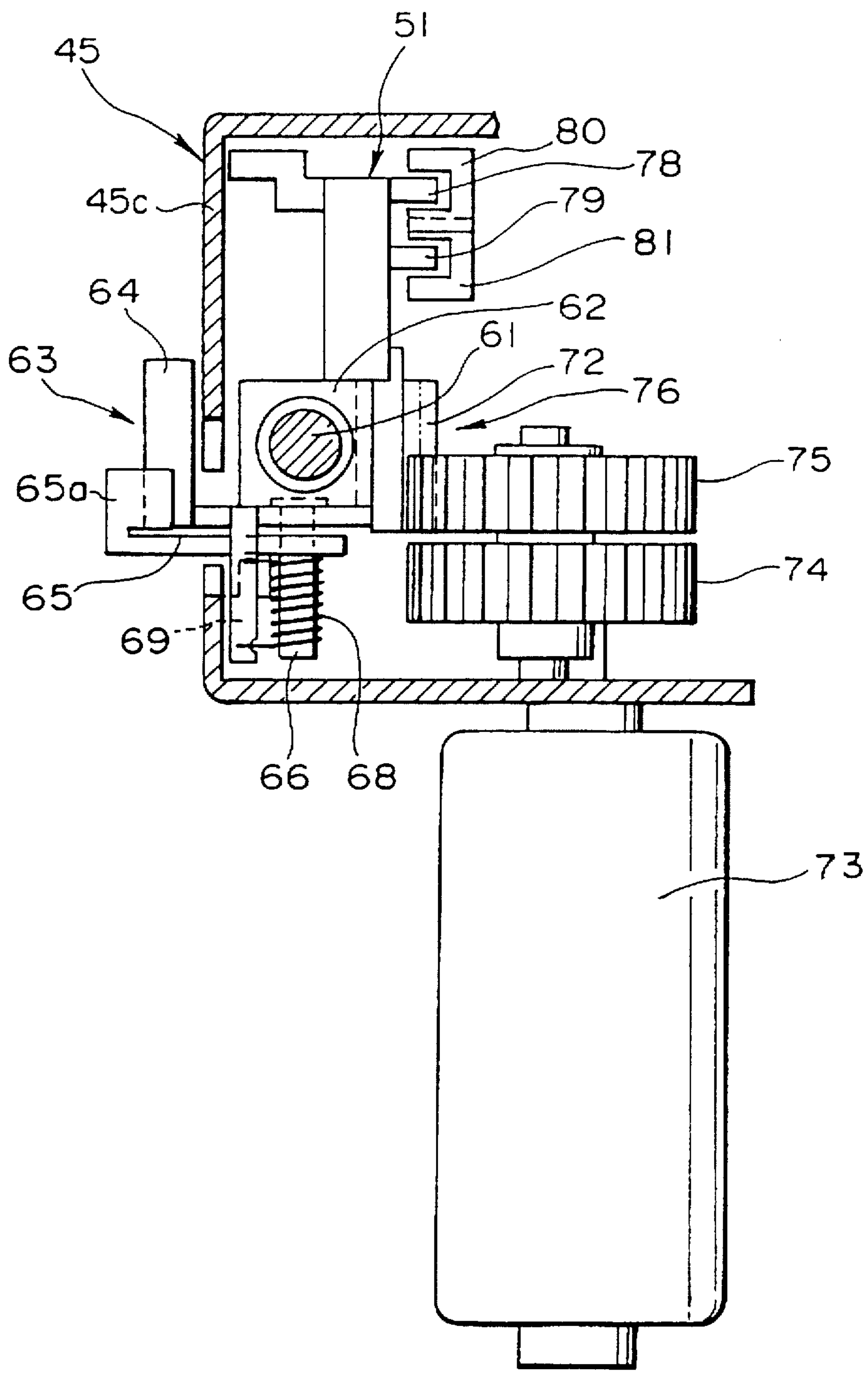
FIG. 29 is an enlarged sectional side view taken along line H—H of FIG. 26.
Figure 30A:
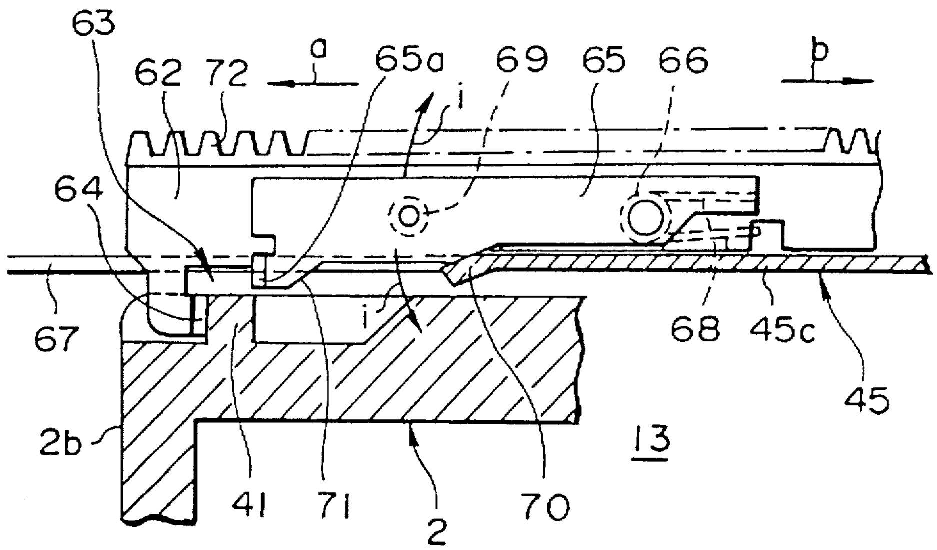
FIG. 30 is an enlarged sectional side view illustrating a latch mechanism of a magazine loading mechanism.

When the power supply for the auto-loader 11 is turned on, the rack 72 is driven in the direction shown by arrow b by the pinion 75 rotated in the reverse direction by the motor 73 of the rack and pinion mechanism 76, and the slider 62 is slid to the standby position $P_{12}$ shown by a one-dot-chain line in FIGS. 26 and 28 in the direction shown by arrow b to be on standby. At this time, as shown in FIG. 30(A), the drive cam 71 of the engaging claw lever 65 of the latch mechanism 63 contacts the cam 70 in the direction shown by arrow b, and the engaging claw lever 65 is rotated around the fulcrum shaft 66 in the direction shown by arrow j against the coil spring 68 to escape the engaging claw 65a from the magazine insertion space 13.

[Operation of Auto-Loading the Magazine]

As described above with reference to FIG. 1(A), the magazine 2 is manually horizontally inserted in the direction shown by arrow a from the magazine insertion port 19 of the auto-loader 11, and the pair of the left and right guide grooves 36 of the magazine 2 are engaged with the pair of the left and right guide rails 46. When the magazine 2 is pushed to the predetermined position $P_{14}$ in the direction shown by arrow a, as shown in FIG. 30(A), the first locked portion 41 of the magazine 2 contacts the engaging claw 64 in the direction shown by arrow a, to slightly push the slider 62 in the direction shown by arrow a.

Figure 30B:
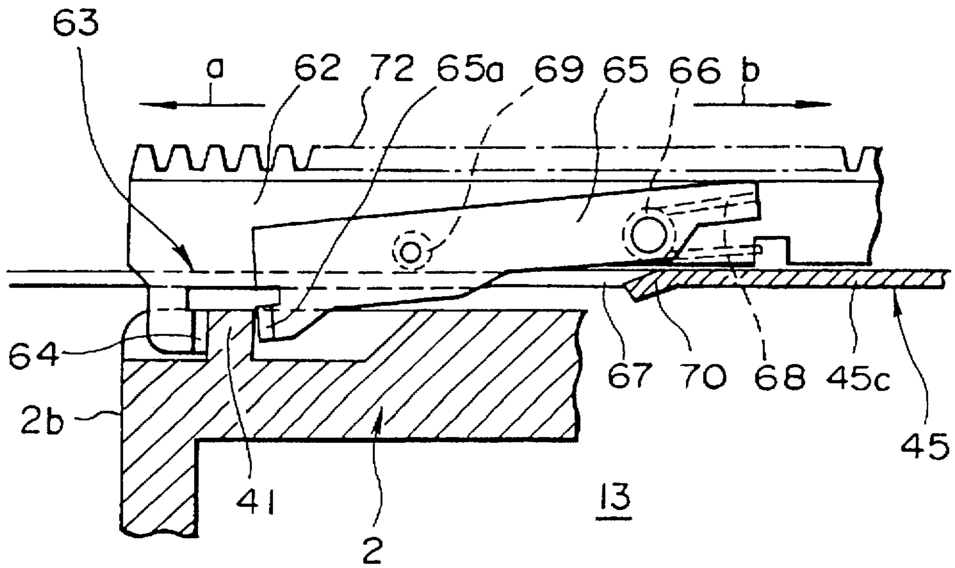
Figure 31:
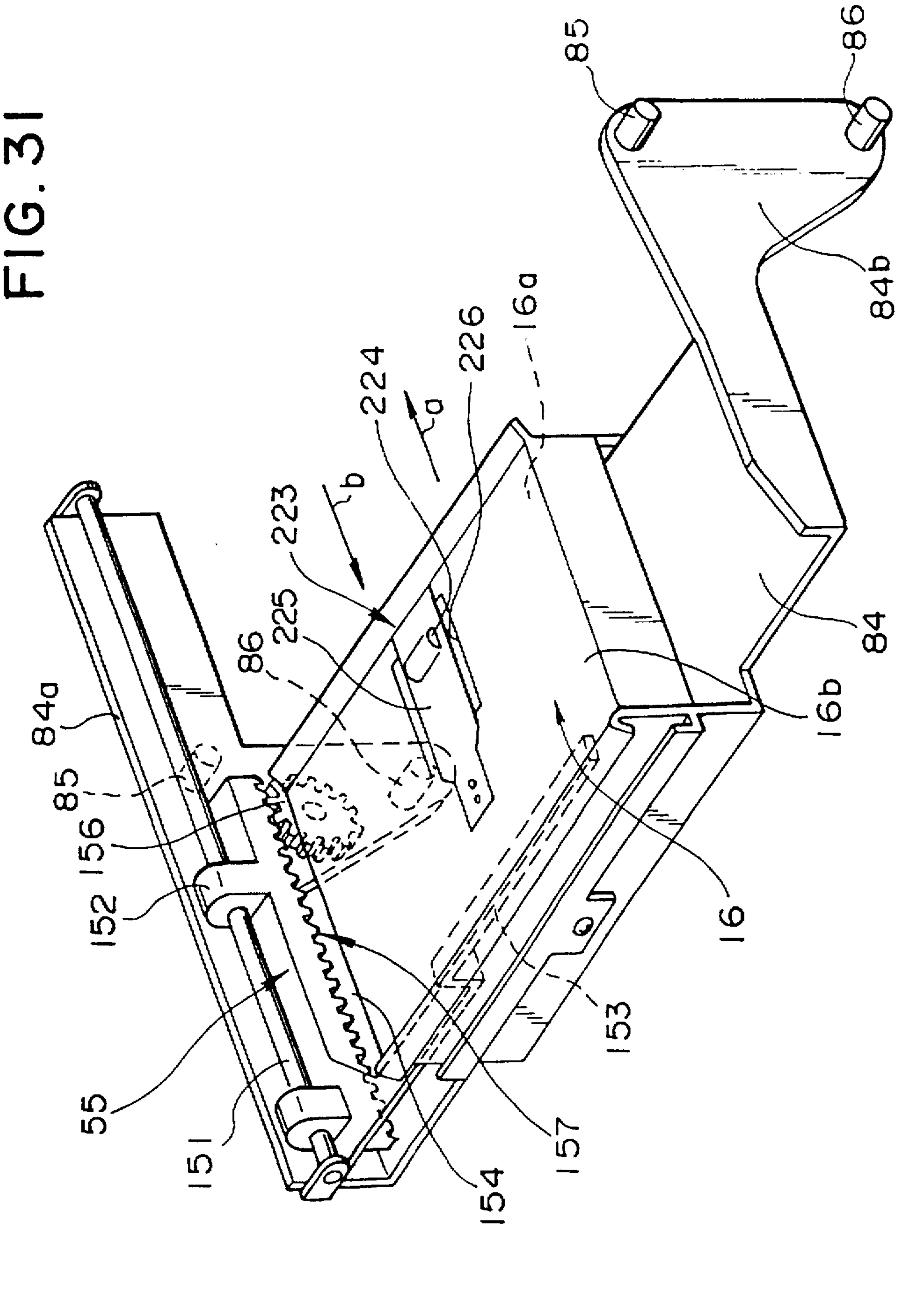
FIG. 31 is a perspective view illustrating a cartridge tray and a tray elevator of an elevator.
Figure 32:
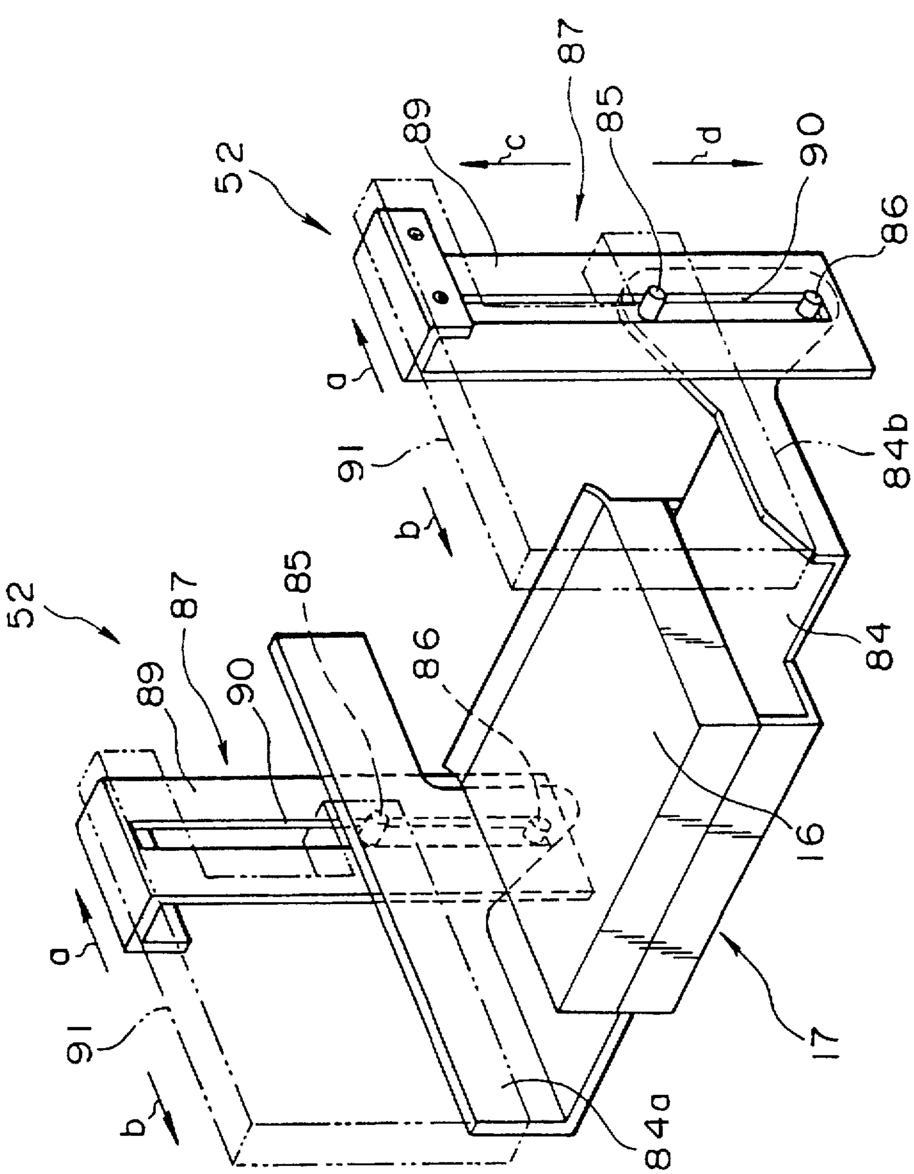
FIG. 32 is a perspective view illustrating a tray elevator and a vertical guide of an elevator.
Figure 33:
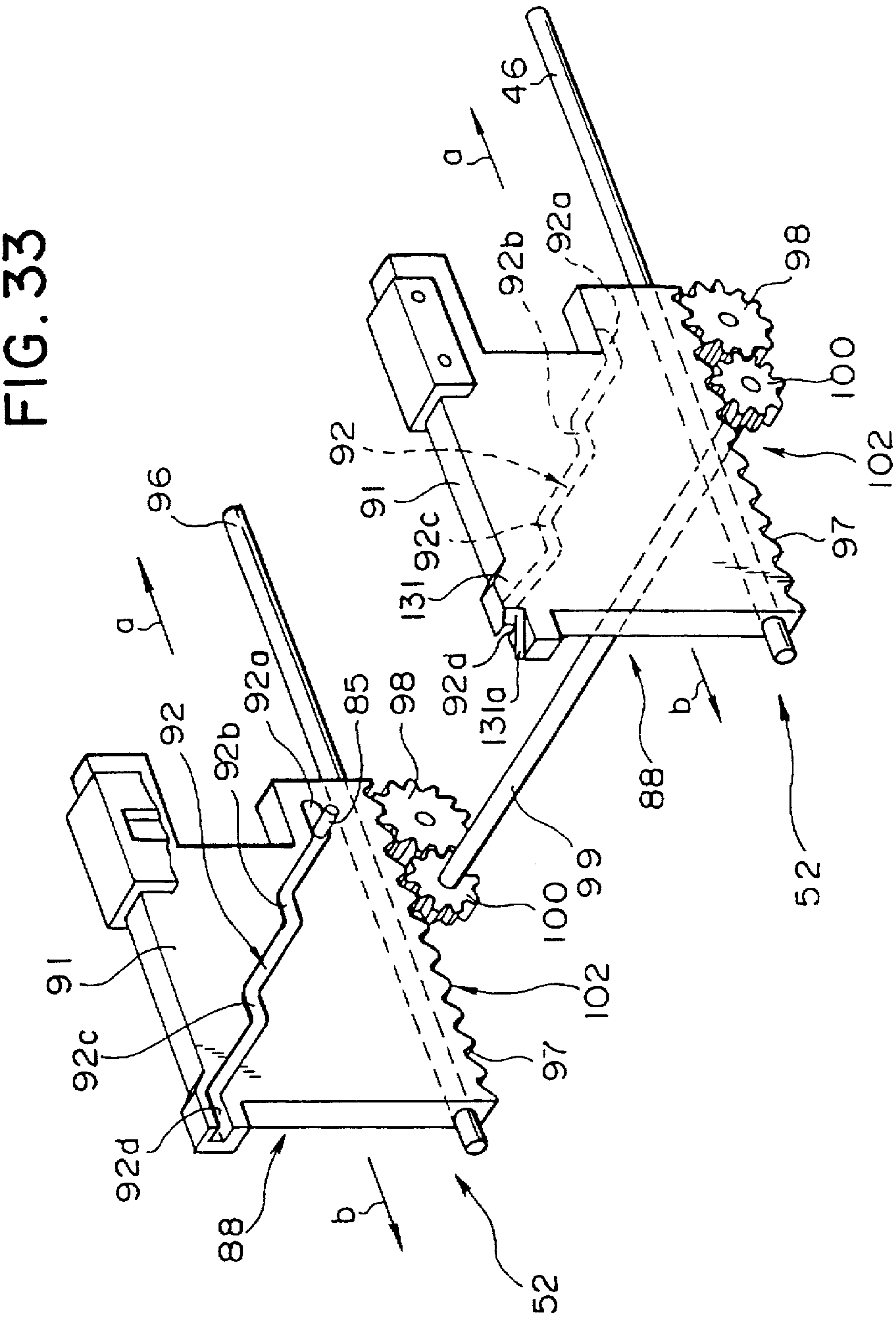
FIG. 33 is a perspective view illustrating a tray elevator and an inclined guide of an elevator.
Figure 34:
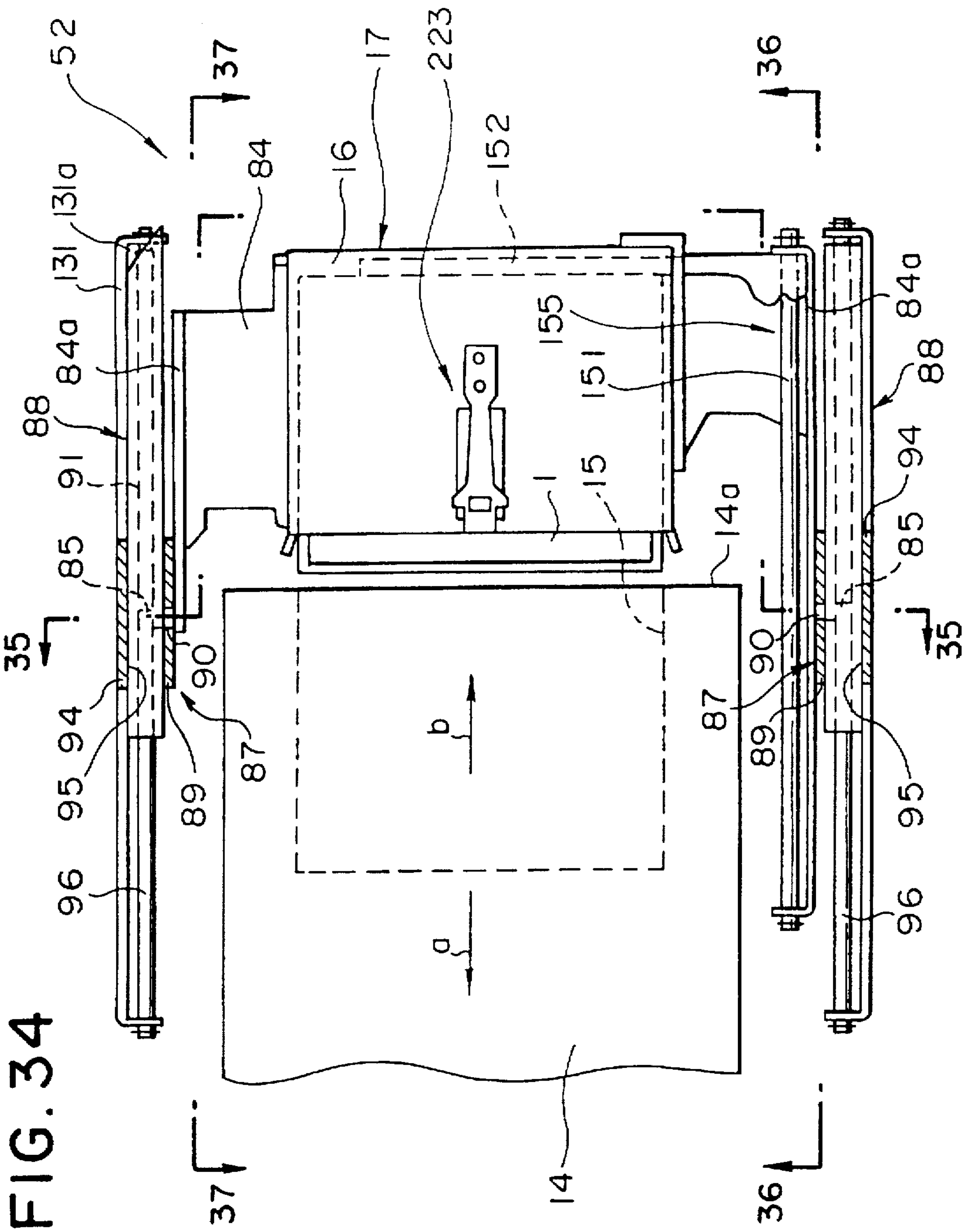
FIG. 34 is a partly broken-away plan view illustrating a tray elevating mechanism of an elevator.
Figure 35:
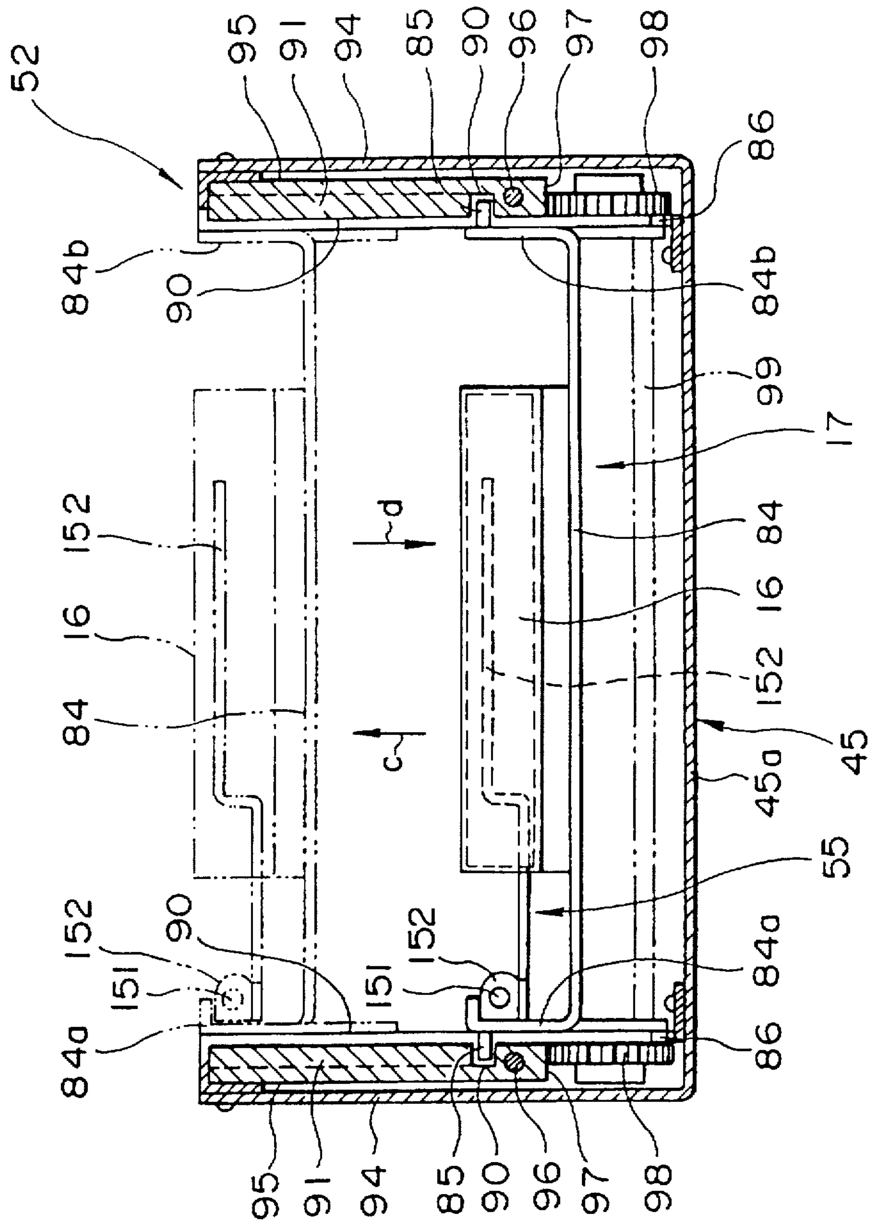
FIG. 35 is a sectional side view taken along line I—I of FIG. 34.

As a result, as shown in FIG. 30(B), the engaging claw lever 65 is also moved together with the slider 62 in the direction shown by arrow a, and the driven cam 71 is separated from the cam 70 in the direction shown by arrow a, thereby rotating the engaging claw lever 65 around the fulcrum shaft 66 in the direction shown by arrow i by the coil spring 68.

The engaging claw 65a at the end of the engaging claw lever 65 is projected into the magazine insertion space 13 from the elongated hole 67 of the side chassis 45C in the direction shown by arrow i, and engaged with the first locked portion 41 of the magazine 2 in the direction shown by arrow b to latch (hold the front and rear sides) the first locked portion 41 of the magazine 2 between the pair of the engaging claws 64 and 65a. At the same time, the roller 69 of the engaging claw lever 65 contacts the side chassis 45c in the direction shown by arrow i, and is then rolled in the directions shown by arrows a and b while contacting the side chassis 45c.

The moment the slider 62 is slightly pushed in the direction shown by arrow a, the optical sensor 80 at the end of the optical shutter plate 78 on the side of the point of arrow a shown in FIGS. 27 and 72 is operated (ON - OFF) to detect the insertion of the magazine 2 into the auto-loader 11. When the pinion 75 is normally rotated by the motor 73 of the rack and pinion mechanism 76 through the gear train 74, the rack 72 is driven in the direction shown by arrow a, and the slider 62 is slid to the loading completion position $P_{11}$, shown by a solid line in FIG. 26 along the guide shaft 61 in the direction shown by arrow a.

The first locked portion 41 is pushed in the direction shown by arrow a by the engaging claw 65a of the latch mechanism 63 which is moved in the direction shown by arrow a together with the slider 62, to perform the auto-loading operation of automatically pulling the magazine 2 in the direction shown by arrow a to the loading completion position $P_{11}$, in the magazine insertion space 13 of the auto-loader 11.

Figure 21:
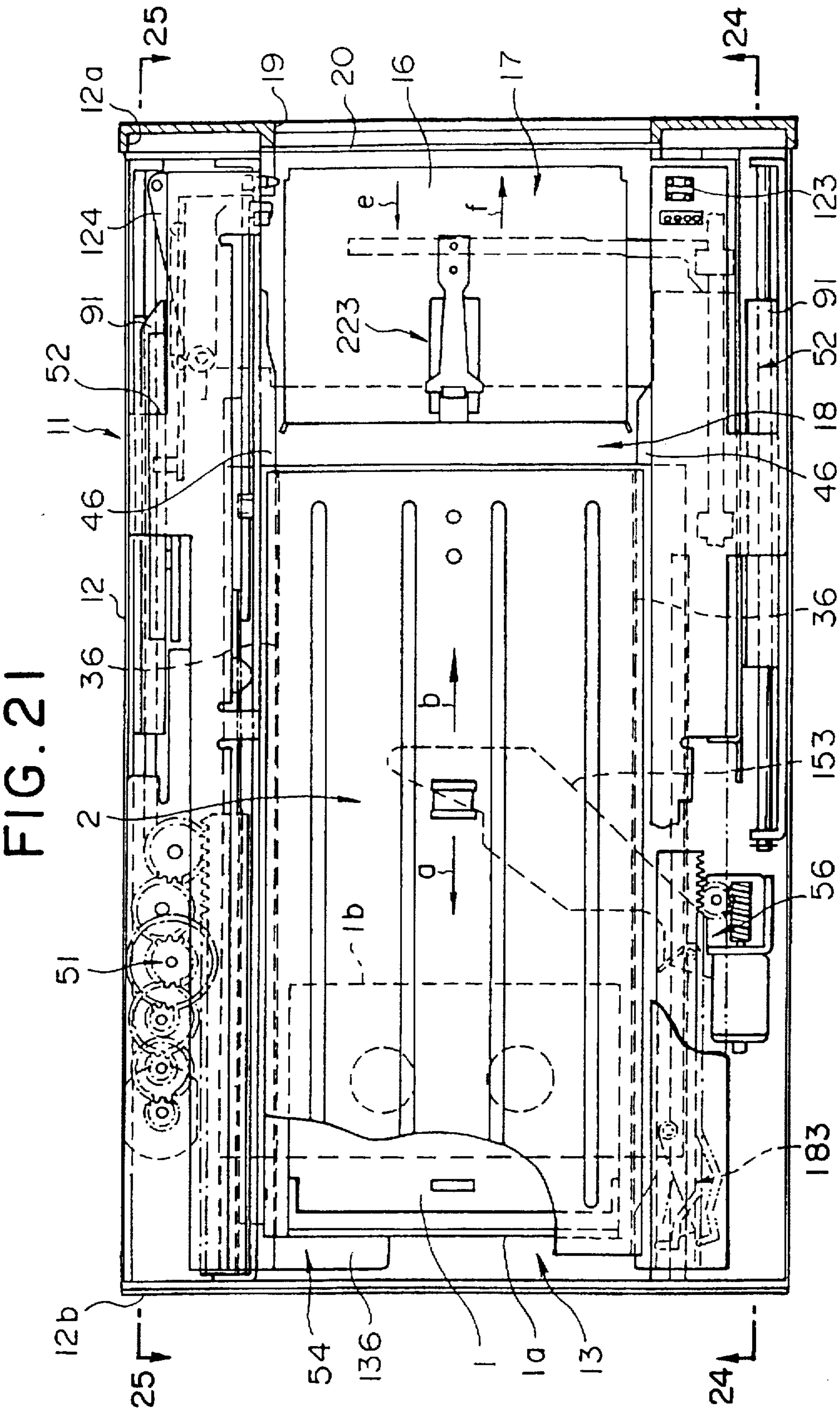
FIG. 21 is a partly broken-away plan view of the whole auto-loader without a cover.

At the time of the completion of loading when the magazine 2 is drawn to the set position shown in FIG. 21 in the magazine insertion space 13 of the auto-loader 11 in the direction shown by arrow a, the optical sensor 81 is operated (OFF→ON) by the end of the other optical shutter plate 79 of the slider 62 shown in FIGS. 27 and 72 on the side of the point of arrow b, to detect the completion of loading of the magazine 2, and the motor 73 is then stopped.

[Operation of Auto-Ejecting the Magazine]

Figure 19:
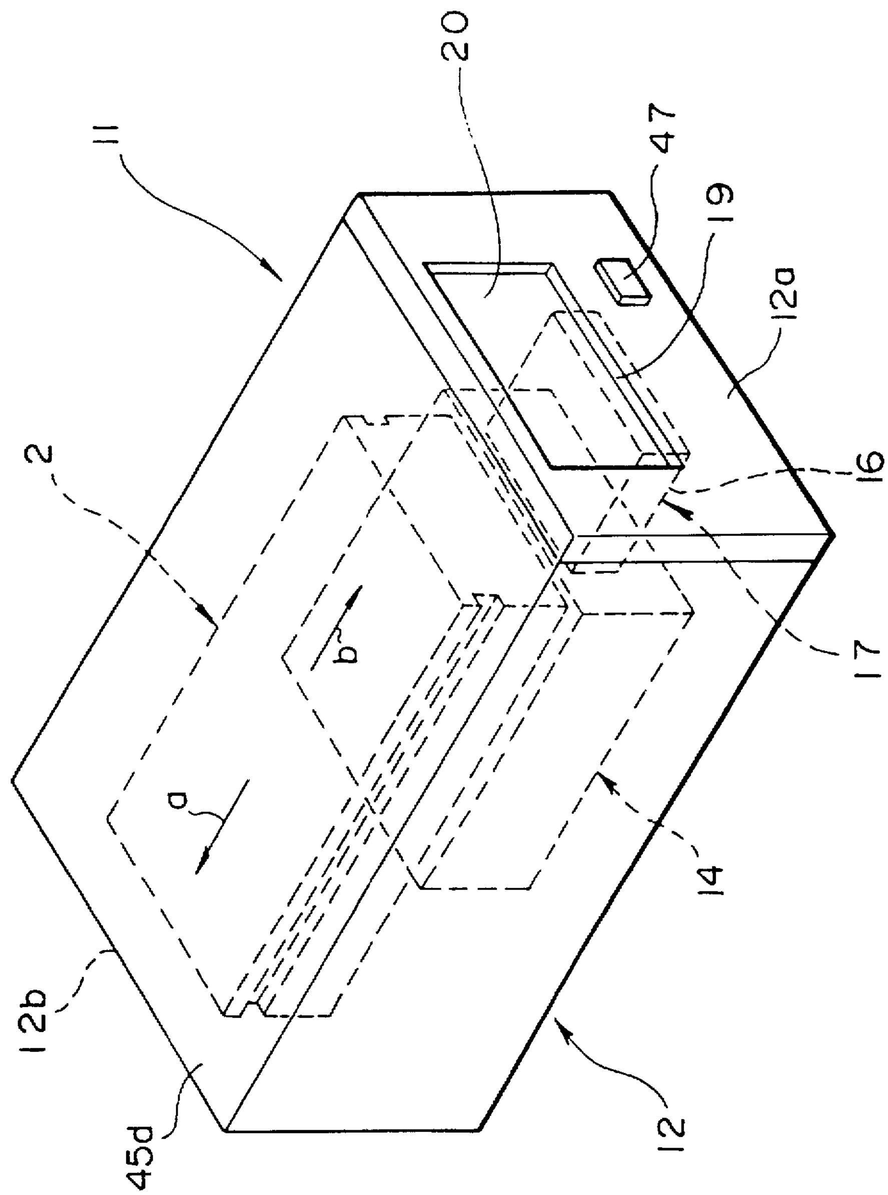
FIG. 19 is a perspective of the whole auto-loader.
Figure 20:
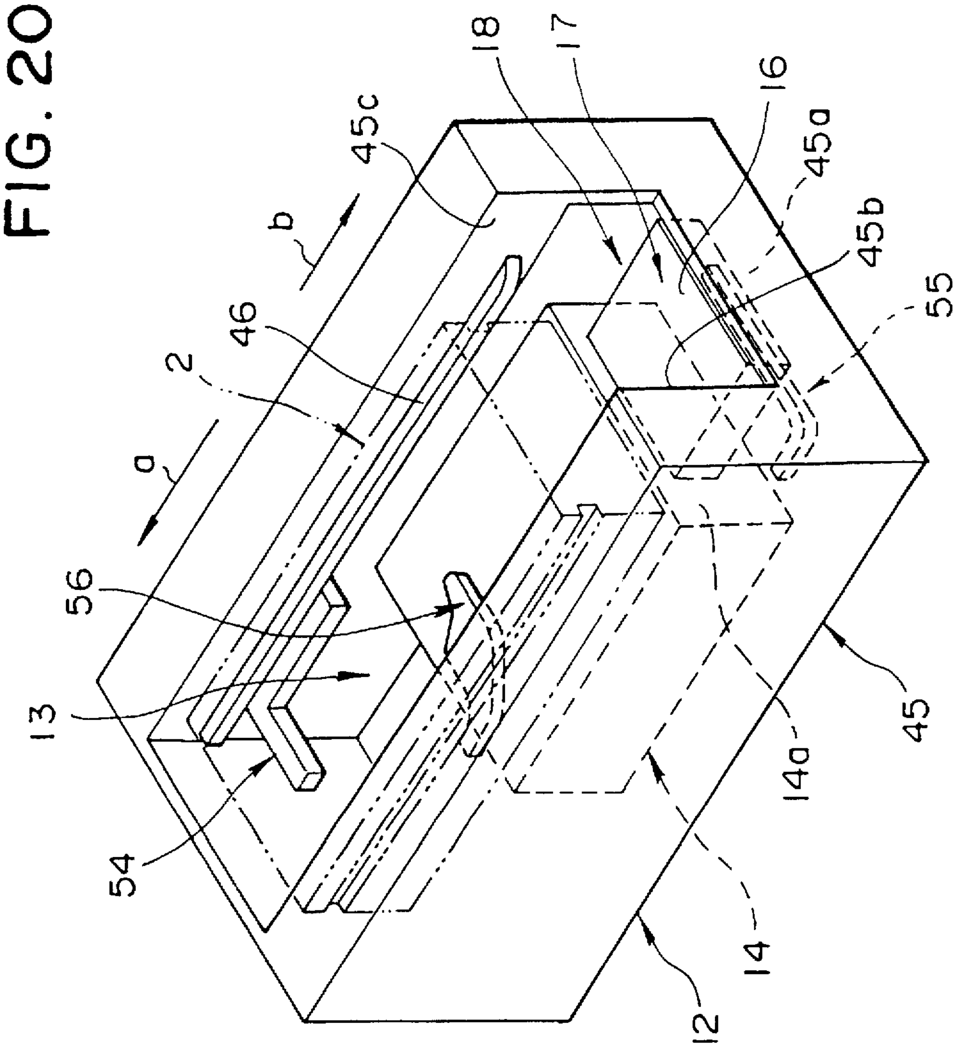
FIG. 20 is a schematic perspective illustrating a substantially U-shaped chassis of an auto-loader.
Figure 22:
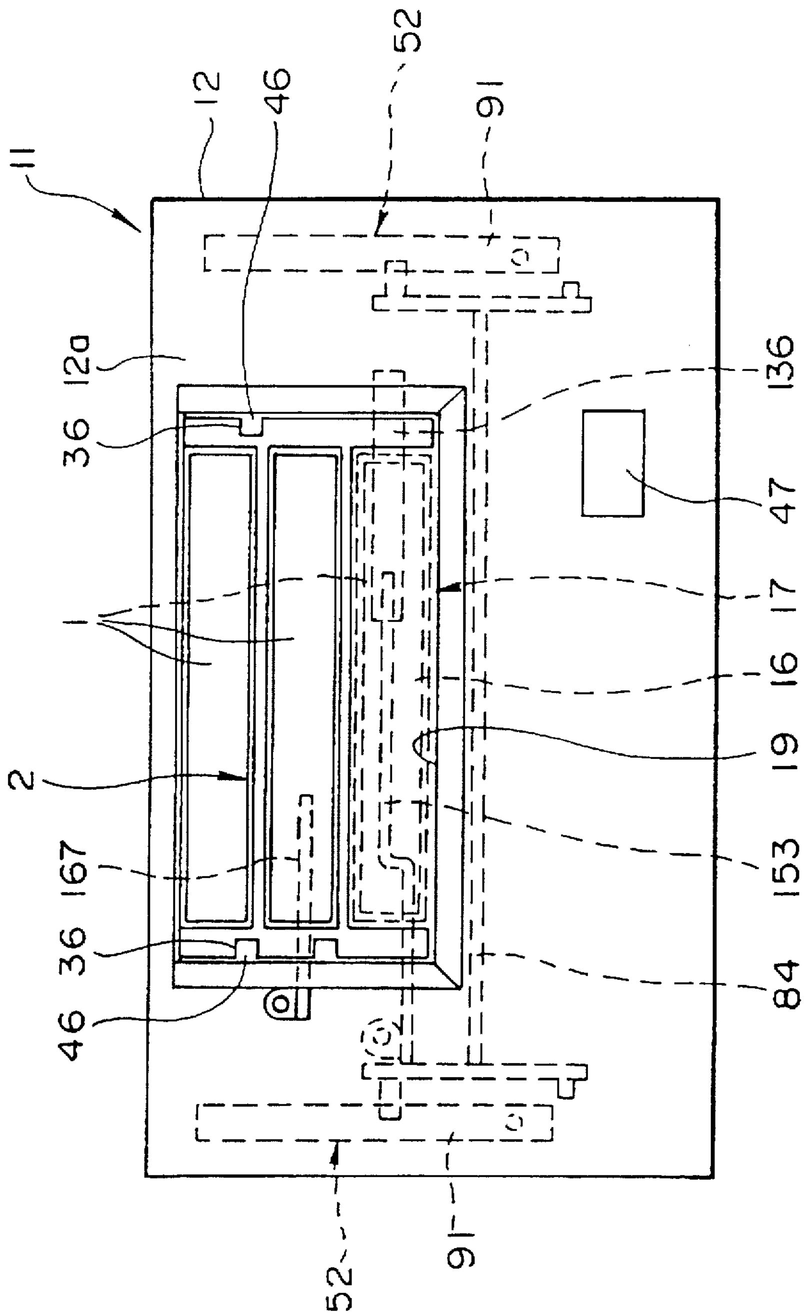
FIG. 22 is a front view of an auto-loader.
Figure 23:
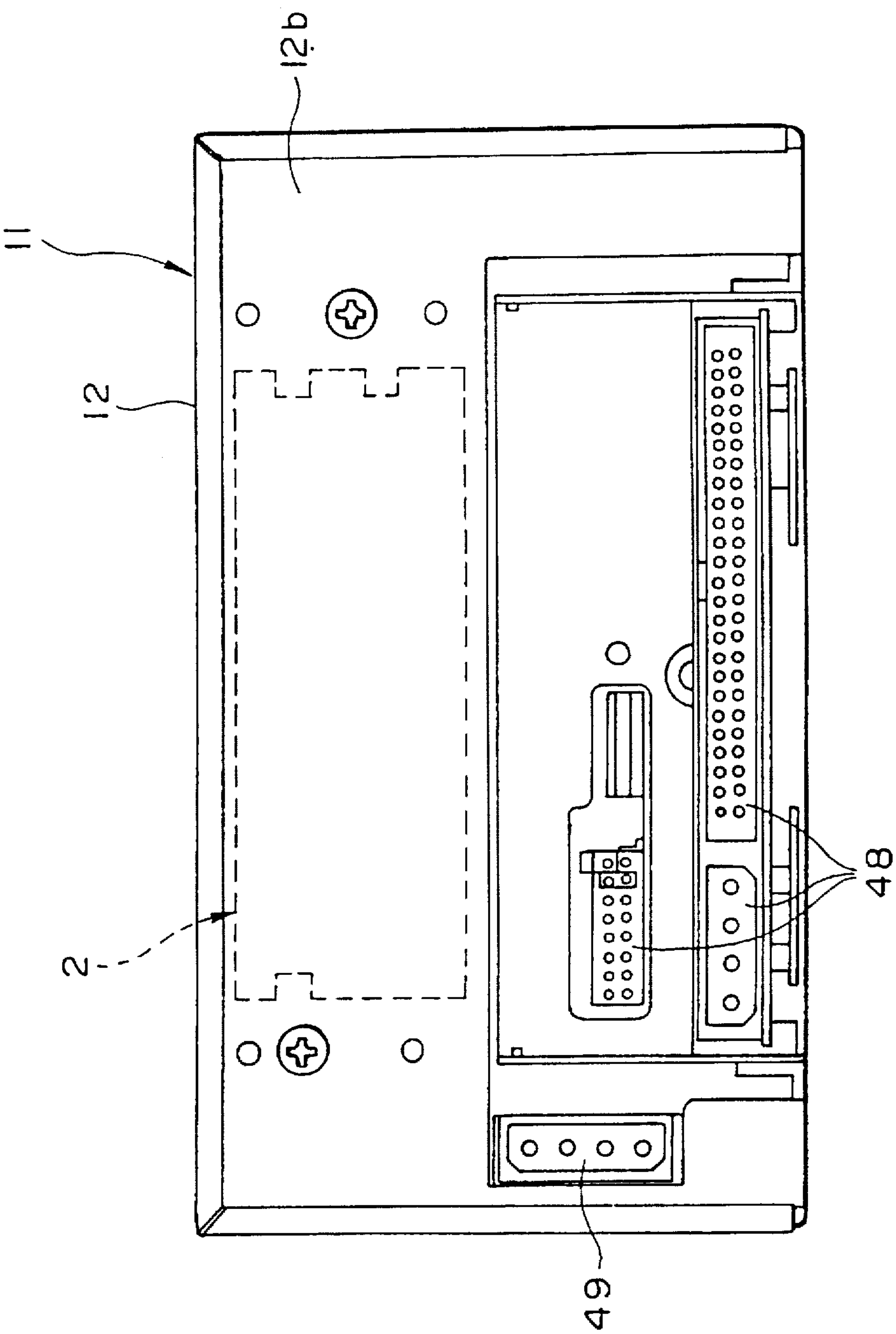
FIG. 23 is a rear view of an auto-loader.
Figure 24:
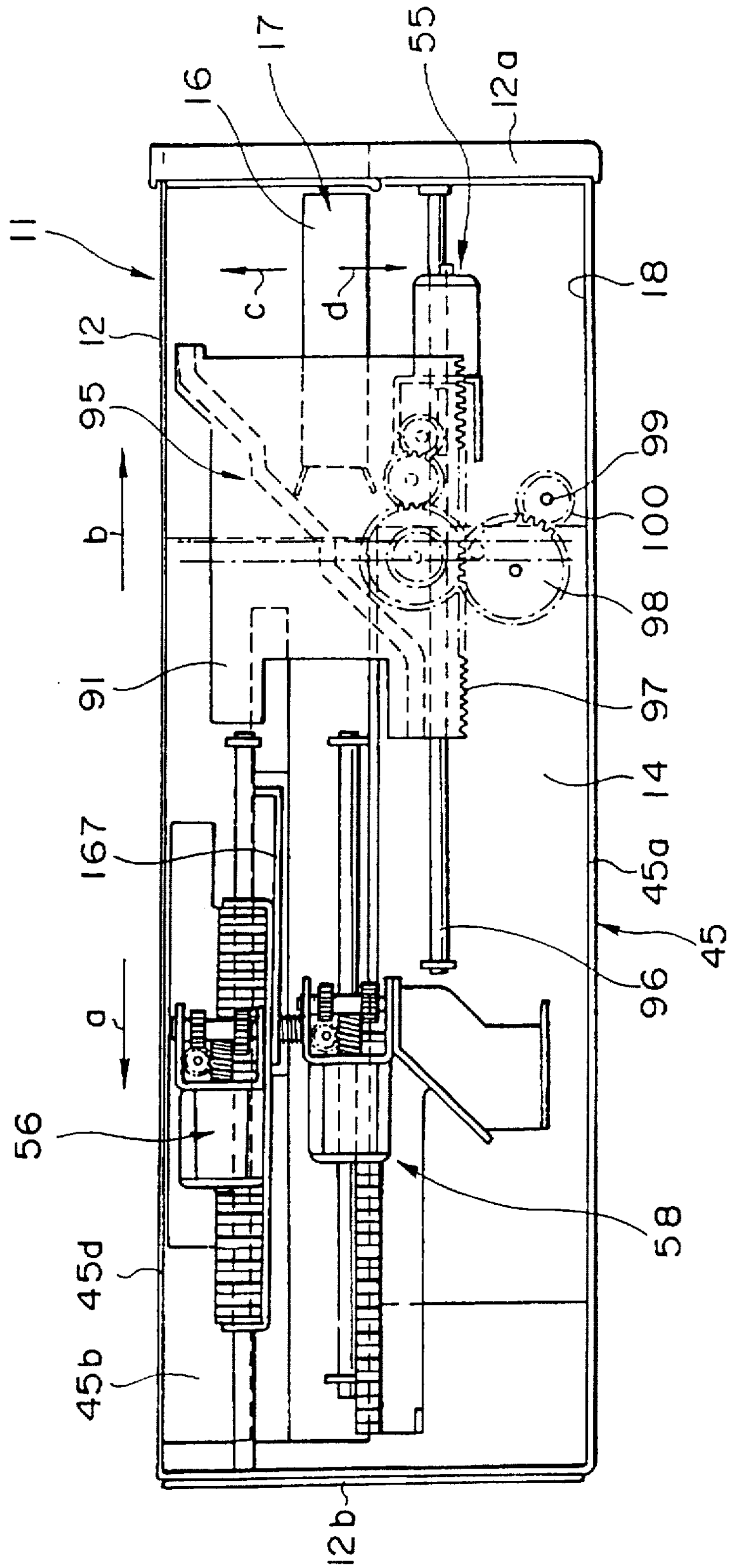
FIG. 24 is a partly broken-away sectional side view taken along line D—D of FIG. 21.
Figure 25:
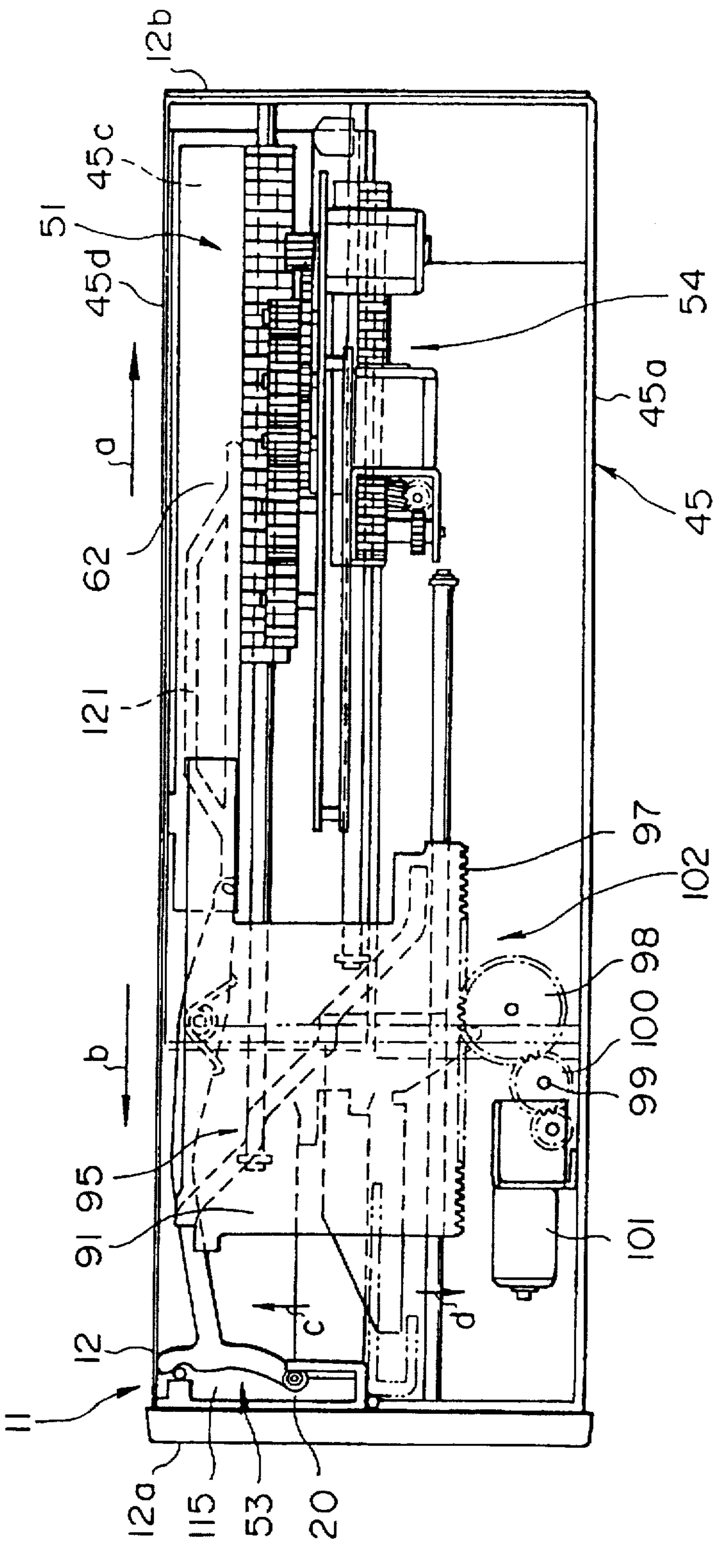
FIG. 25 is a partly broken-away sectional side view taken along line E—E of FIG. 21.

When the eject button 47 shown in FIGS. 19 and 22 is then pushed, the motor 73 of the rack and pinion mechanism 76 is operated to rotate the pinion 75, in the reverse direction, with the gear train 74. The rack 72 is driven in the direction shown by arrow b to slide the slider 62 from the loading completion position $P_{11}$, shown by the solid line in FIG. 26 to the standby position $P_{12}$ shown by the one-dot-chain line along the guide shaft 61 in the direction shown by arrow b.

As shown in FIG. 30(B), the engaging claw 64 of the latch mechanism 63 moved together with the slider 62 in the direction shown by arrow b pushes the first locked portion 41 of the magazine 2 in the direction shown by arrow b, to perform the auto-ejection operation of automatically pushing the magazine 2 from the loading completion position $P_{13}$ in the magazine insertion space 13 of the auto-loader 11 to the predetermined position $P_{14}$ outward of the magazine insertion port 19 in the direction shown by arrow b.

When the slider 26 is slid to the standby position $P_{12}$ shown by the one-dot-chain line in FIG. 26 in the direction shown by arrow b, as shown in FIG. 30(A), the driven cam 71 of the engaging claw lever 65 of the latch mechanism 63 contacts the cam 70 in the direction shown by arrow b, and the engaging claw lever 65 is rotated around the fulcrum shaft 66 against the coil spring 68 in the direction shown by arrow j to separate the engaging claw 65a from the first locked portion 41.

At this time, the optical sensor 81 is operated (ON→OFF) by the end of the optical shutter 79 of the slider 62 shown in FIGS. 27 and 72 on the side of the point of arrow a, to detect the completion of ejection of the magazine 2. The motor 73 is then stopped. The magazine 2 can then manually be drawn in the direction shown by arrow b from the magazine insertion port 19 of the auto-loader 11.

[Description of the Tray Elevating Mechanism]

The tray elevating mechanism 52 of the elevator 17 is described below with reference to FIGS. 21, 24, 25, 31 through 38, and 72.

The elevator 17 comprises the horizontal cartridge tray 16 which has an opening 16a open toward the side 2a of the magazine 2 and the front side 14a of the drive 14, so that only one tape cartridge 1 can freely horizontally be moved in the directions shown by arrows a and b through the opening 16a.

The cartridge tray 16 is horizontally mounted on the tray elevator 84, a pair of upper and lower guide pins 85 and 86 being horizontally provided in symmetry on each of the left and right vertical side plates 84a and 84b, which are integrally formed at both sides of the tray elevator 84, i.e., a total of four guide pins being provided, so as to be vertically arranged in a line. The upper pair of the left and right guide pins 85 are long guide pins, and the lower pair of the left and right guide pins 86 are short guide pins.

The tray elevating mechanism 52 comprises a pair of left and right vertical guides 87 and a pair of left and right inclined guides 88 for driving the total of the four guide pins 85 and 86 of the tray elevator 84 so that the cartridge tray 16 in a horizontal state is moved upward and downward in the vertical directions shown by arrows c and d within the tray elevating space 18.

The pair of the left and right vertical guides 87 respectively comprise a pair of left and right guide plates 89 which are respectively vertically disposed at the left and right sides of the both side plates 84a of the tray elevator 84 and which are fixed on the bottom chassis 45a of the chassis 45, and vertical guide slots 90 which are vertically formed along the centers of the vertical guide plates 89. The total of the four guide pins 85 and 86 of the tray elevator 84 are loosely fitted in the pair of the left and right guide slots 90 so as to be guided upward and downward in the directions shown by arrows c and d.

The pair of the left and right inclined guides 88 respectively comprise a pair of left and right slide guide plates 91 which are vertically disposed on both sides of the pair of the left and right guide plates 89 so as to be horizontally slid in the directions shown by arrows a and b, and a pair of left and right inclined guide grooves 92 which are obliquely formed on the opposite inner sides of the pair of the left and right slide guide plates 91. The upper pair of the left and right long guide pins 85 of the tray elevator 84 are respectively passed through the pair of the left and right vertical guide slots 90 and loosely fitted in the pair of the left and right guide grooves 92. When the pair of the left and right slide guide plates 91 are slid in the directions shown by arrows .a and 1a, the pair of the left and right guide pins 85 are driven upward and downward in the directions shown by arrows c and d by the cam action of the pair of the left and right guide grooves 92.

The pair of the left and right inclined guide grooves 92 are respectively inclined at about 45° with respect to the direction of sliding of the pair of the left and right slide guide plates 91, i.e., the directions shown by arrows a and b. Each of the pair of the left and right inclined grooves 92 has four steps 92a, 92b, 92c and 92d which are formed for correctly stopping the cartridge tray 16 at a drive position $P_{31}$ opposite to the cartridge port 15 of the drive 14, a magazine lower stage position $P_{32}$ opposite to the cartridge ejection port 6 of the magazine, a magazine middle stage position $P_{33}$ opposite to the cartridge containment port 7 and a magazine upper stage position $P_{34}$ opposite to the cartridge insertion port 5, respectively.

A pair of left and right gaps 95 are respectively vertically formed between the pair of the left and right vertical guide plates 89 and a pair of left and right vertical outer guide plates 94 which are vertically provided on the bottom chassis 45a at a distance from the left and right sides of the left and right vertical guide plates 89. The pair of the left and right slide guide plates 91 are respectively inserted into the pair of the left and right gaps 95 so that the slide guide plates 91 are slid synchronously in the directions shown by arrows a and b along a pair of left and right guide shafts 96 which are horizontally provided in parallel with the magazine 2 inside the pair of the left and right vertical guide plates 94.

A driving mechanism for synchronously sliding the pair of the left and right slide guide plates 91 in the directions shown by arrows a and b comprise a rack and pinion mechanism 102 comprising a pair of left and right racks 97 which are respectively horizontally formed along the lower sides of the slide guide plates 91, a pair of left and right pinions 98 for respectively driving the racks 97, a pair of left and right interlocking gears 100 fixed to both ends of a driving shaft 99 so as to synchronously rotate the pair of the left and right pinions 98, and a geared motor 101 for rotating one of the interlocking gears 100. The pinions 98, the driving shaft 99 and the geared.motor 101 are mounted on the side of the chassis 45.

Figure 38B:
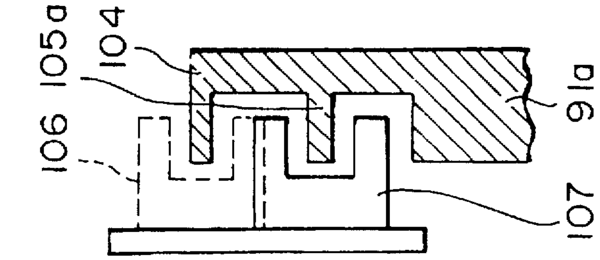
FIG. 38 is a side view illustrating optical sensors and optical shutter plates of a tray elevating mechanism of an elevator and an enlarged sectional side view of a principal portion.
Figure 38A:
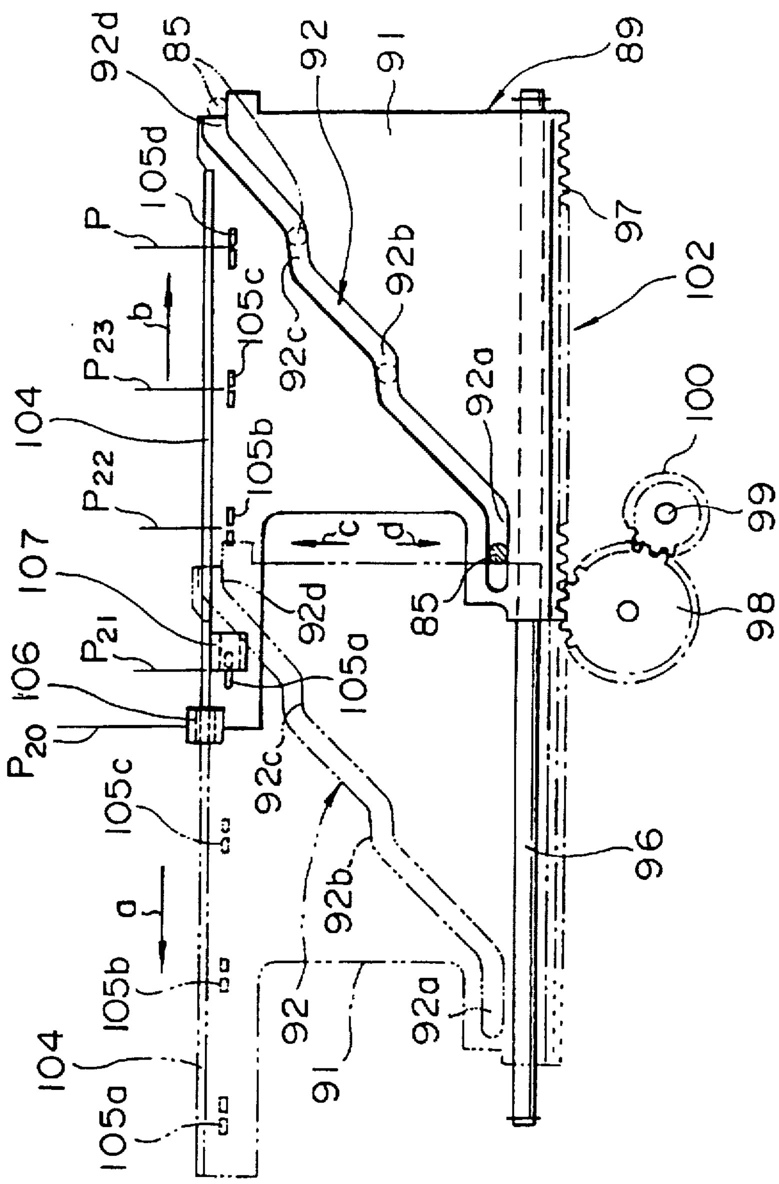

As shown in FIGS. 38 and 72, a long optical shutter plate 104 and a total of four short optical shutter plates 105a, 105b, 105c and 105d, which are disposed at predetermined intervals in the directions shown by arrows a and b, are horizontally integrally formed in two vertical stages at the upper edge of one of the slide guide plates 91, and a pair of upper and lower optical sensors 106 and 107, which serve as photointerrupters turned on and off by the optical shutter plates 104 and 105a to 105d, are mounted on one of the vertical guide plates 94. The optical sensor 106 serves as a sensor for detecting the initial position of the slide guide plate 91, and the other optical sensor 107 serves as a sensor for detecting the positions of the four stages in upward and downward movement of the cartridge tray 16.

[Initial Position of the Slide Guide Plate]

Figure 36:
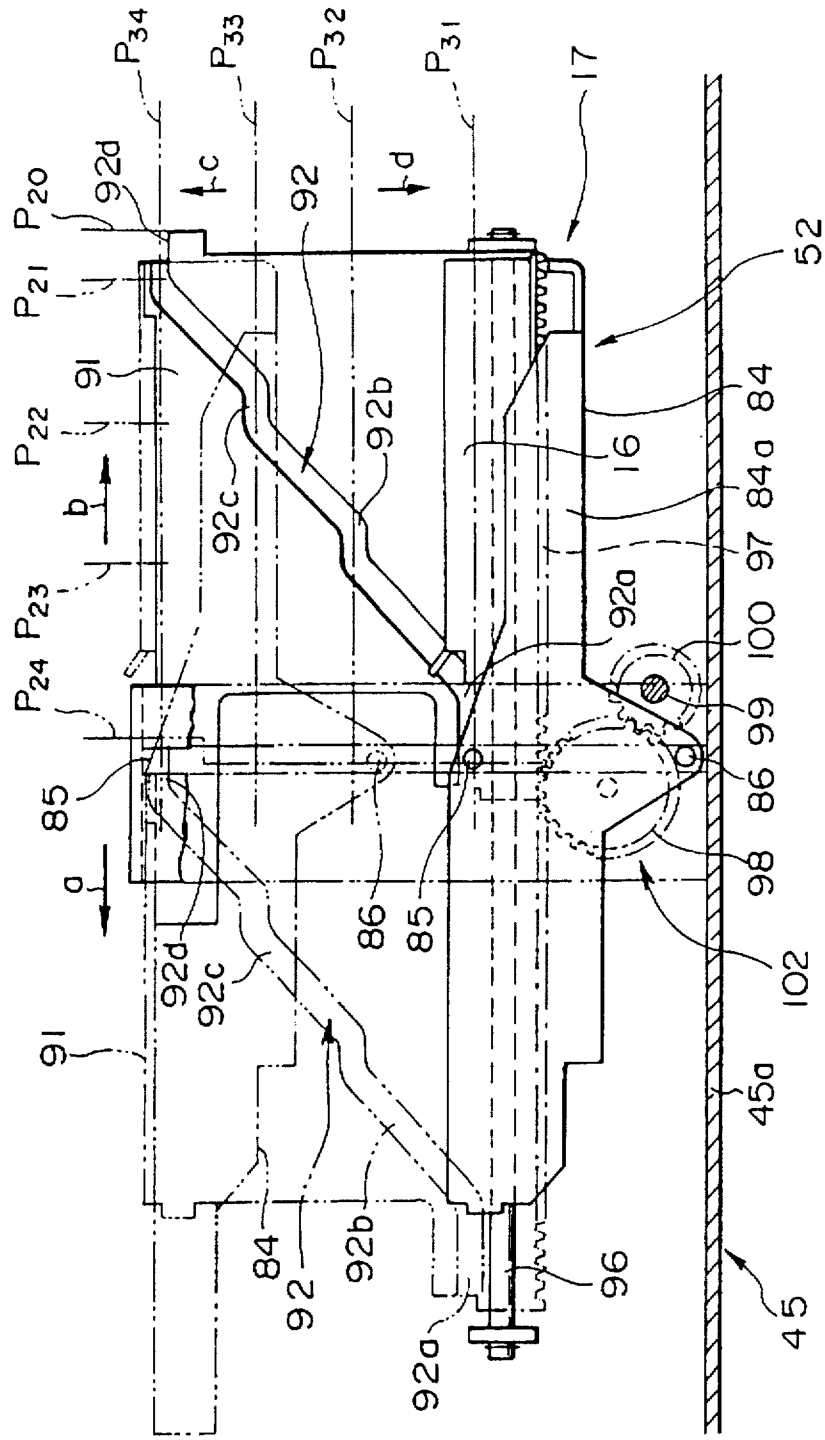
FIG. 36 is a sectional side view taken along line J—J of FIG. 34.
Figure 37:
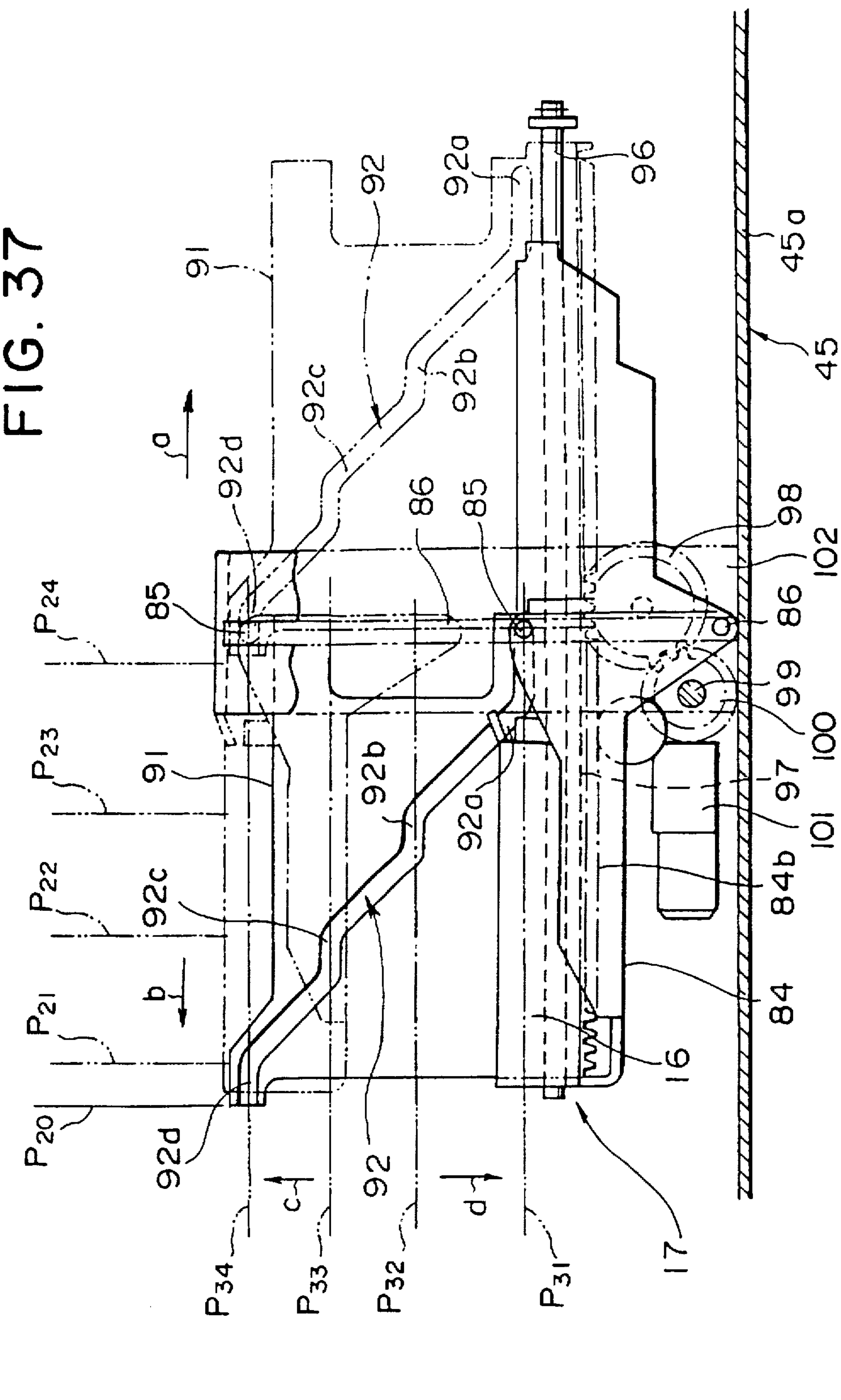
FIG. 37 is a sectional side view taken along line K—K of FIG. 34.

When the power supply for the auto-loader 11 is turned on, the pair of left and right pinions 98 are rotated in the reverse direction by the geared motor 101 of the rack and pinion mechanism 102 through the pair of the interlocking gears 100 and the driving shaft 99, and the pair of the left and right racks 97 are driven in the direction shown by arrow b, as shown by solid lines in FIGS. 36 to 38, to move the pair of the left and right slid guide plates 91 to the initial position $P_{20}$ in the direction shown by arrow b. The optical sensor 106 is operated (ON→OFF) by the end of the optical shutter plate 104 on the side of the point of arrow a shown in FIGS. 38 and 72, and the geared motor 101 is then stopped. The pair of the left and right slid guide plates 91 are thus set at the initial position $P_{20}$. At this time, the pair of the left and right upper guide pins 85 are respectively positioned in the first horizontal steps 92*a* which are lowermost steps of the pair of the left and right inclined guide grooves 92, as shown in FIGS. 36 to 38, so that the cartridge tray 16 is moved downward, in the direction shown by arrow d, to the drive position $P_{31}$ opposite to the cartridge port 15 of the drive 14.

[Standby Position of the Cartridge Tray]

When the pair of left and right pinions 98 are normally rotated by the geared motor 101 on the basis of a command signal output from the computer to set the cartridge tray 16 at the standby position, the pair of left and right racks 97 are driven in the direction shown by arrow a to move the pair of left and right slide guide plates 91 from the initial position $P_{20}$ to the standby position $P_{21}$, in the direction shown by arrow a. When the pair of left and right slide guide plates 91 reach the standby position $P_{21}$, the optical sensor 107 shown in FIGS. 38 and 72 is operated (ON→OFF→ON) by the optical shutter plate 105*a* in the first step, and the geared motor 101 is stopped to set the pair of left and right slide guide plates 91 at the standby position $P_{21}$. At this time, only the pair of the upper guide pins 85 are relatively moved in the direction shown by arrow b along the first horizontal steps 92*a* of the pair of left and right inclined guide grooves 92, while the cartridge tray 16 remains set at the drive position $P_{31}$. The operation of automatically loading the magazine 22 in the auto-loader 11 in the direction shown by arrow a is performed in the state wherein the cartridge tray 16 is set at the drive position $P_{31}$, as described above.

[Upward Drive of the Cartridge Tray]

When the pair of left and right pinions 98 are normally rotated by the geared motor 101 of the rack and pinion mechanism 102 through the pair of left and right interlocking gears 100 and the driving shaft 99 on the basis of a command signal from the computer to upwardly drive the cartridge tray 16, the pair of left and right racks 97 are driven in the direction shown by arrow a to successively slide the pair of the slide guide plates 91 to the magazine lower stage position $P_{22}$, the magazine middle stage position $P_{23}$ and the magazine upper stage position $P_{24}$ from the standby position P21 shown in FIGS. 36 to 38 in the direction shown by arrow a.

In the state wherein the movement of the total of the four guide pins 85 and 86 of the tray elevator 84 in the directions shown by arrow a and b is restricted by the pair of the left and right vertical guide slots 90, when the pair of the left and right upper guide pins 85 are driven upward in the upward direction shown by arrow c by the inclined guide grooves 92 of the pair of the left and right inclined guides 88, the total of the four guide pins 85 and 86 are driven upward in the pair of the left and right vertical guide slots 90 in the direction shown by arrow c. As a result, the cartridge tray 16 in a horizontal state is driven upward (parallel motion) together with the tray elevator 84 in the direction shown by arrow c.

The pair of the left and right upper guide pins 85 are successively moved upward to the second, third and fourth horizontal steps 92*b*, 92*c* and 92*d* from the first horizontal step 92*a* of the pair of the inclined guide grooves 92, as shown by the one-dot-chain lines in FIGS. 36 to 38, to successively drive the cartridge tray 16 upward to the magazine lower stage position $P_{32}$, the magazine middle stage position $P_{33}$ and the magazine upper stage position $P_{34}$ from the drive position $P_{31}$ in the direction shown by arrow c.

At this time, when the slide guide plates 91 are slid from the standby position $P_{21}$ in the direction shown by arrow a, as shown in FIGS. 38 and 72, the optical sensor 107 is successively operated (ON→OFF→ON) by the second, third and fourth optical shutter plates 105*b*, 105*c* and 105*d*, to successively detect the magazine lower stage position $P_{32}$, the magazine middle stage position $P_{33}$ and the magazine upper stage position $P_{34}$ of the cartridge tray 16 (position detecting operation).

When the cartridge tray 16 reaches the stop position among the magazine lower stage position $P_{32}$, the magazine middle stage position $P_{33}$ and the magazine upper stage position P34, which is specified by the computer, the cartridge tray 16 can be stopped at the desired specified stop position by stopping the geared motor 101 on the basis of the position detection output from the optical sensor 107.

[Downward Drive of the Cartridge Tray]

When the pair of the left and right pinions 98 are rotated in the reverse direction by the geared motor 101 of the rack and pinion mechanism 102 on the basis of the command signal from the computer to drive the cartridge tray 16 downward, the pair of the left and right racks 97 are driven in the direction shown by arrow b to slide the pair of the left and right slide guide plates 91 to the standby position $P_{21}$ from the magazine upper stage position $P_{24}$ shown by the one-dot-chain lines in FIGS. 36 to 38 in the direction shown by arrow b.

The cartridge tray 16 is thus successively driven downward to the magazine middle stage position $P_{33}$, the magazine lower stage position $P_{32}$ and the drive position $P_{31}$ from the magazine upper stage position $P_{34}$ in the direction shown by arrow d opposite to the direction of driving the cartridge tray 16 upward. When the cartridge tray 16 reaches the stop position among the magazine middle stage position $P_{33}$, the magazine lower stage position $P_{32}$ and the drive position $P_{31}$, which is specified by the computer, the cartridge tray 16 can be stopped at the specified position by stopping the geared motor 101 on the basis of the position detection output from the optical sensor 107.

When the operation of rotating the tape cartridges 1 between the magazine 2 and the drive 14 as described above with reference to FIGS. 1 through 9, the pair of the left and right slide guide plates 91 are slid to the standby position $P_{21}$ shown by the solid line in FIGS. 36 through 38 in the direction shown by arrow b on the basis of the operation end signal from the computer, and the geared motor 101 is stopped on the basis of the position detection output from the optical sensor 107 to finish a series of operations of driving the cartridge tray 16 upward.

[Description of the Movable Cover Opening/Closing Mechanism]

The movable cover opening/closing mechanism 53 is described below with reference to FIGS. 21, 25, 27, 33, 39 through 46 and 73.

Figure 39:
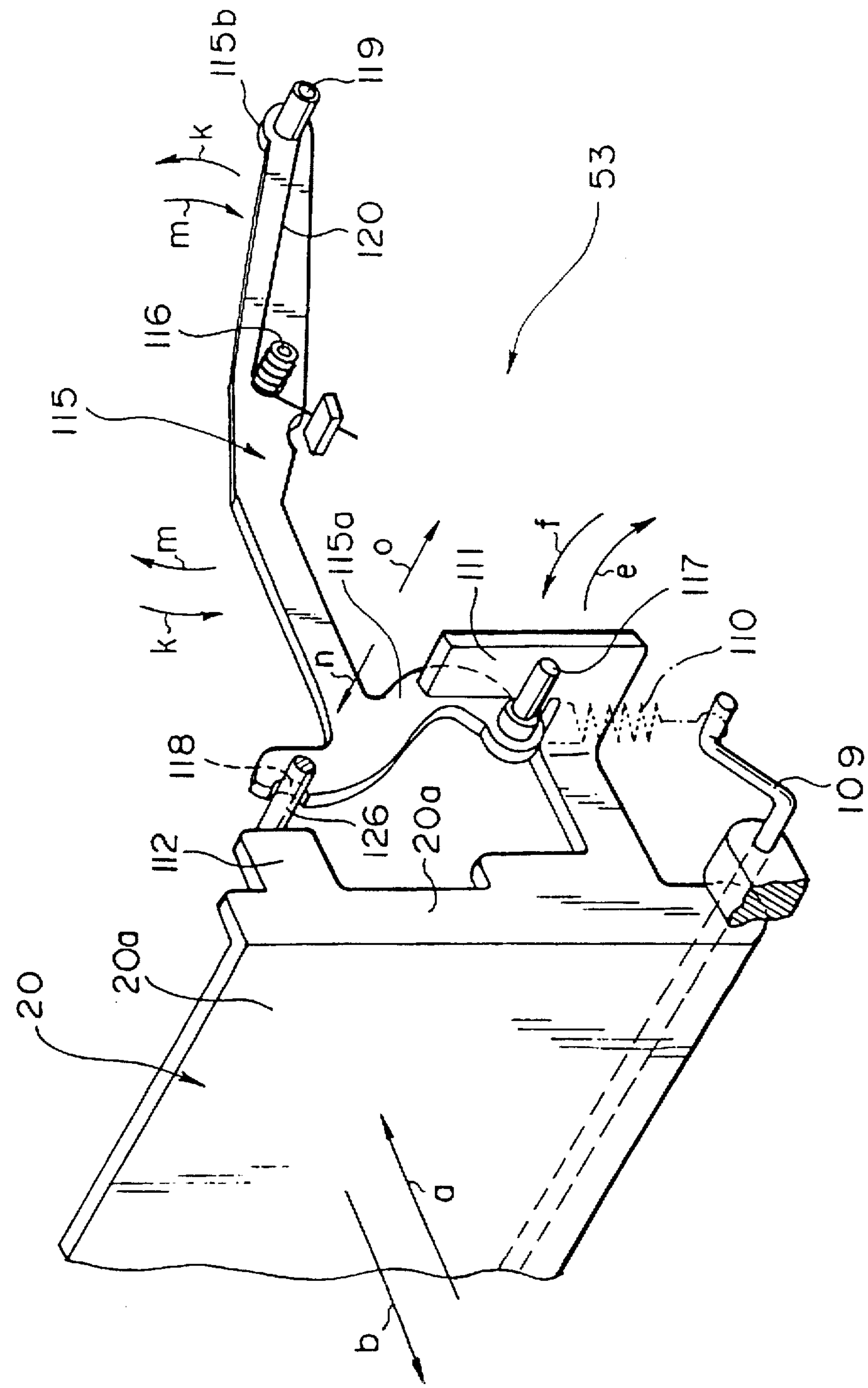
FIG. 39 is a perspective view illustrating a movable cover opening/closing mechanism.

The movable cover 20 is made of a synthetic resin, and has a substantially U-shaped form comprising a back 20*a* and left and right side plates 20*b* which are vertically integrally formed at both ends of the back 20*a*. The movable cover 20 is mounted on the inside of the front panel 12*a* through a horizontal fulcrum shaft 109 which is laterally passed through the lower end of the movable cover 20 so that the movable cover 20 can be rotated in the vertical directions shown by arrows e and f, as shown in FIGS. 27 and 39. The movable cover 20 permits the magazine insertion port 19 to be opened and closed from the inside thereof. The movable cover 20 is urged in the direction shown by arrow f by a coil spring 110 so as to contact the back side of the front panel 12*a*. A driven arm 111 is integrally formed at a position of one of the side plates 20*b* of the movable cover 20 near the lower end thereof. The driven arm 111 has a substantially L-shaped portion comprising a portion extending rearward in the direction shown by arrow a and a portion extending outward in the lateral direction of the magazine insertion space 13, i.e., in the direction shown by arrow o, and a vertical portion extending upward in the direction shown by arrow c. An engaged member 112 which projects rearward in the direction shown by arrow a is integrally formed at a position on the side plate 20*b* of the movable cover 20 near the upper end thereof.

A movable cover driving lever 115 for opening and closing the movable cover 20 in the directions shown by arrows e and f is disposed in parallel with the magazine 2 along the outside of the side chassis 45*c* behind the movable cover 20, i.e., on the side of the point of arrow a. The movable cover driving lever 115 is attached to the side chassis 45*c* through a horizontal fulcrum shaft 116 at an intermediate position in the lengthwise direction of the movable cover driving lever 115, i.e., in the directions shown by arrows a and b, so as to be rotatable in the vertical directions shown by arrows k and m. A movable cover driving pin 117 is horizontally mounted at the lower end of a substantially T-shaped arm 115*a* on the outside thereof and is formed at the front end of the movable cover driving lever 115. The movable cover driving pin 117 is inserted into a front-side position of the driven arm 111 of the movable cover 20 on the side of the point of arrow b. A recessed portion 118 which engages with the movable cover locking pin below is formed at the upper end of the T-shaped arm 115*a* on the front side thereof. A driven cam pin 119 is horizontally provided on the outside of the movable cover driving lever 115 at the rear end 115*b* thereof, and the movable cover driving lever 115 is urged to rotate in the direction shown by arrow k by a coil spring 120.

A driving mechanism for the movable cover driving lever 115 also serves as the slider 62 of the magazine loading mechanism 51, and a cam groove 121 for driving the driven cam pin 119 is integrally formed on the inside of the slider 62 at the upper end thereof. The cam groove 121 comprises a lower horizontal path 121*a*, and an upper horizontal path 121*c* connected to the upper portion of the lower horizontal path 121*a* through a pair of front and rear inclined paths 121*b* and 121*d* to form a substantially trapezoidal endless path. The driven cam pin 119 is loosely fitted in the cam groove 121.

A movable cover locking lever 124 for locking the movable cover 20 closed is horizontally disposed above one of the sides behind the movable cover 20 on the side of the point of arrow a. The rear end of the movable cover locking lever 124 is provided on the side chassis 45*c* through a vertical fulcrum shaft 125 so as to be rotatable in the directions shown by arrows n and o. A movable cover locking pin 126 is horizontally provided on the inside of the movable cover locking lever at the front end thereof so that it can be moved in and out of a portion behind the engaged member 112 of the movable cover 20 on the side of the point of arrow a, in the directions shown by arrows n and o substantially at right angles with the directions shown by arrows e and f in which the movable cover 20 is opened and closed. The movable cover locking lever 124 is urged to rotate in the direction shown by arrow a by a coil spring 127. A driven vertical cam roller 128 is rotatably provided on the lower side of the movable cover locking lever 124 at the front end thereof on the outside opposite to the movable cover locking pin 126. A vertical guide pin 130 provided on the upper side of the side chassis 45*c* is loosely fitted in a circular-arc guide hole 129 formed on the front-end side of the movable cover locking lever 124.

One of the slide guide plates 91 of the tray elevating mechanism 52 also serves as a driving mechanism for the movable cover locking lever 124. A rail-formed cam 131 is horizontally formed on the outside of the slide guide plate 91 along the upper edge thereof. A cam slope 131*a* inclined inward in the direction shown by arrow n is formed at the end of the rail-formed cam 131 on the side of the point of arrow b.

[Released State of the Movable Cover at the Close Position]

Figure 40:
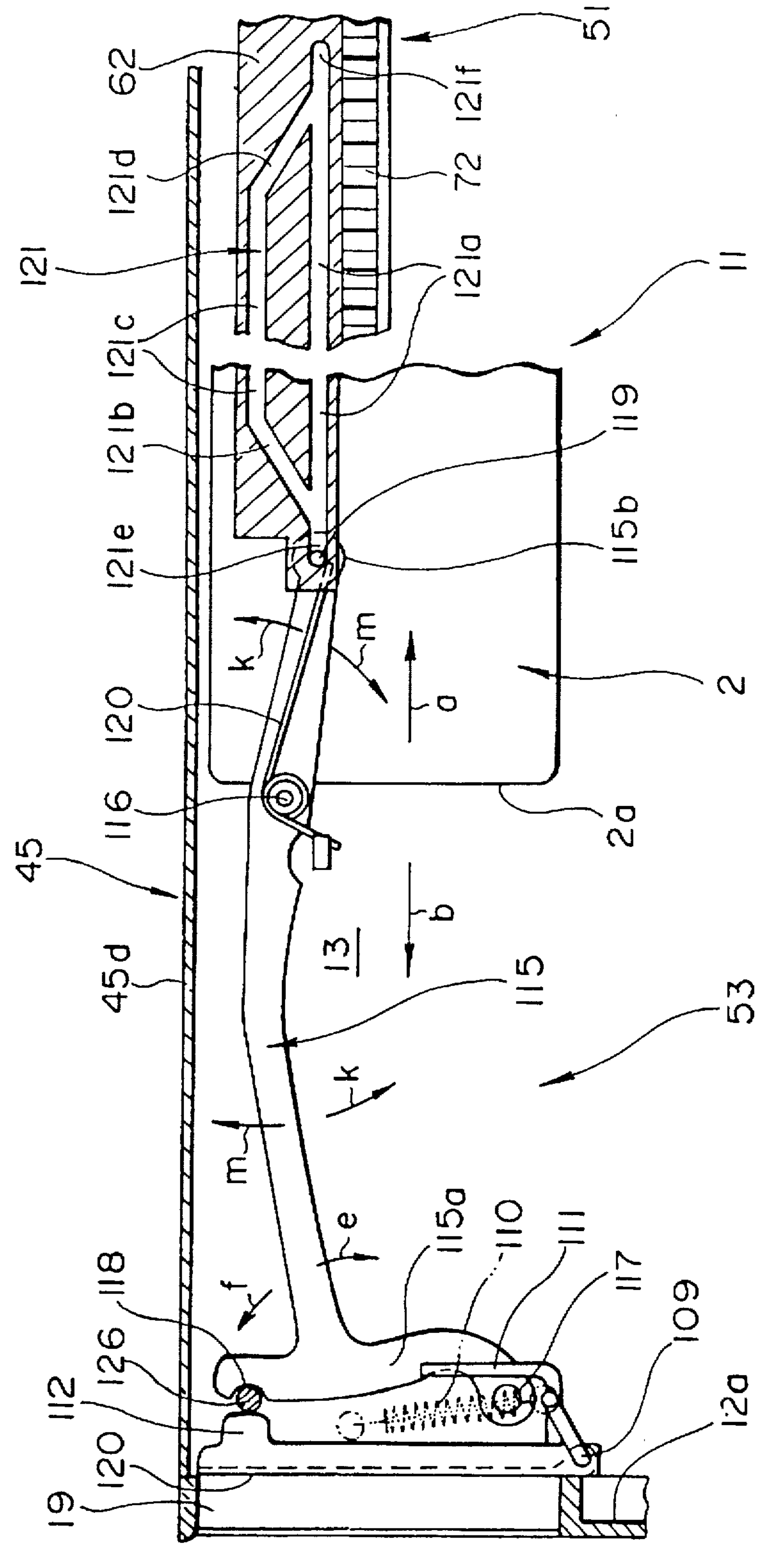
FIG. 40 is a sectional side view illustrating a movable cover opening/closing mechanism in the state wherein a movable cover is closed.
Figure 44:
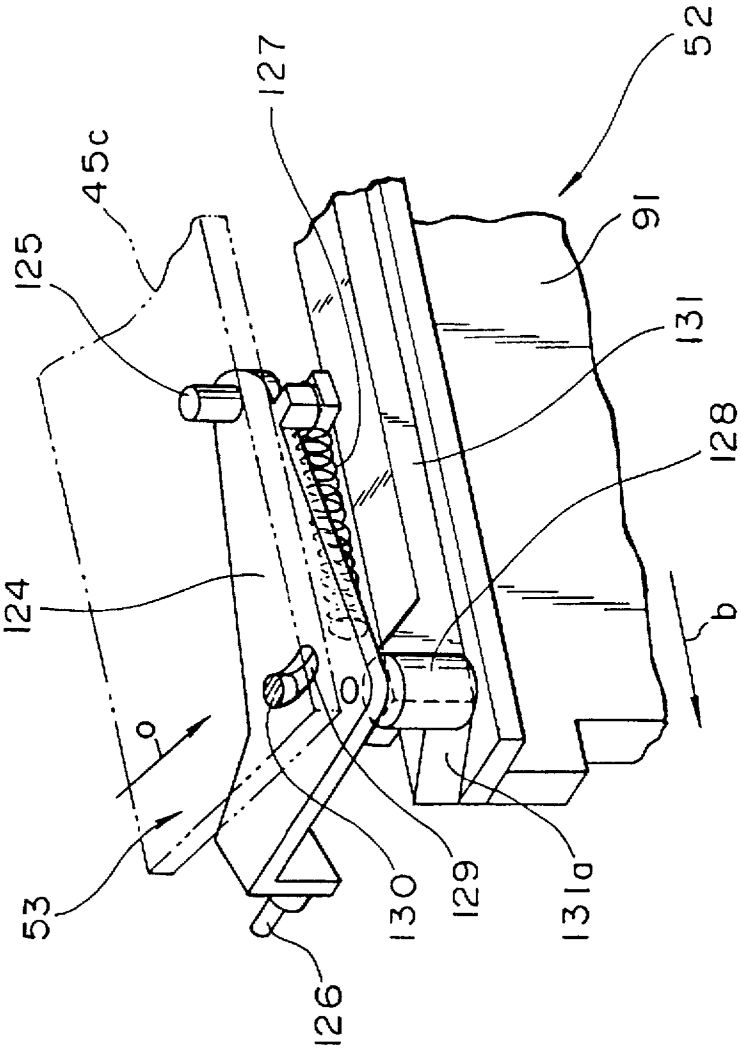
FIG. 44 is a perspective view illustrating the state wherein a movable cover locking lever of a movable cover opening/closing mechanism is released from locking.
Figure 46:
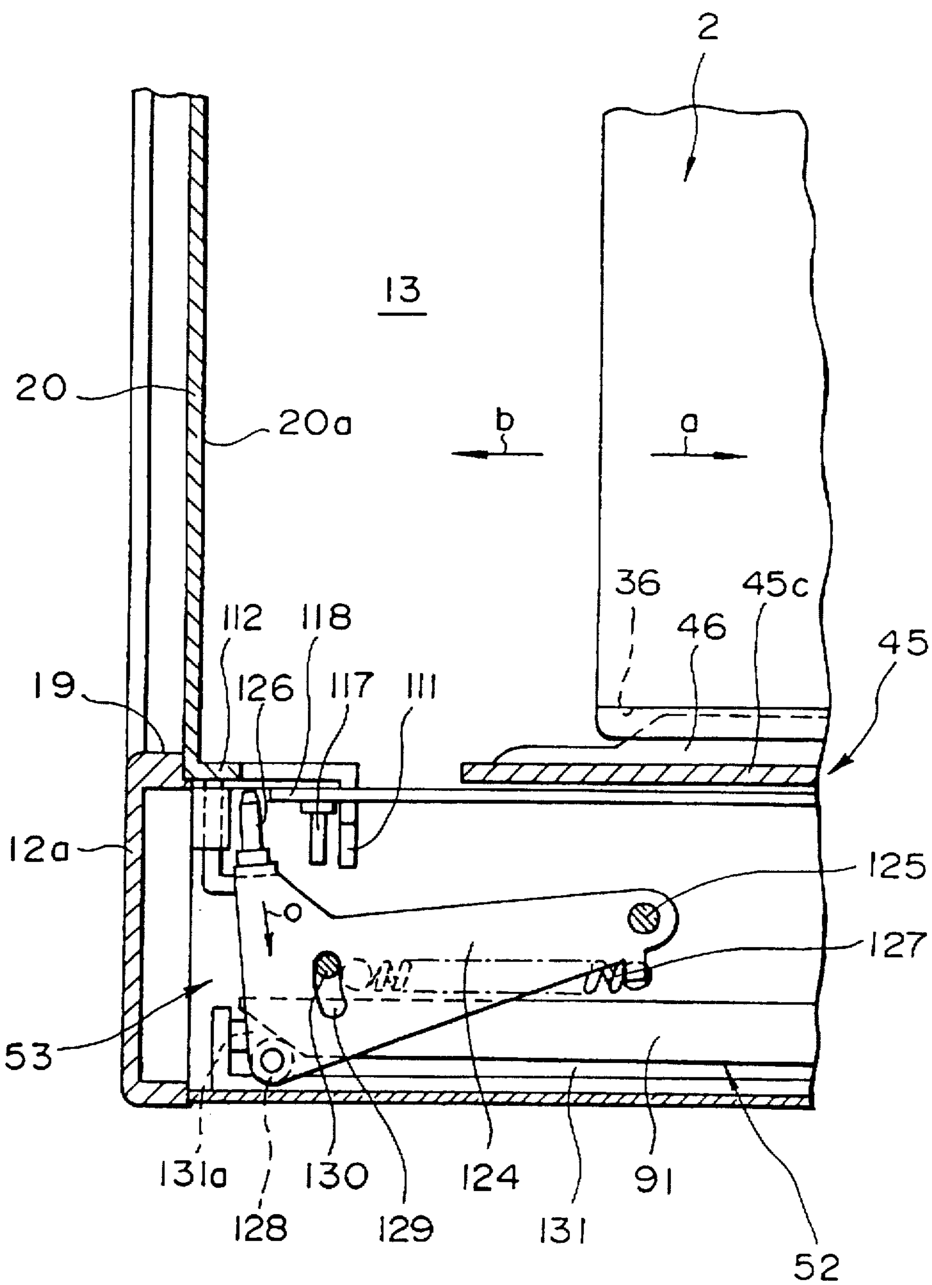
FIG. 46 is a sectional side view illustrating the state wherein a lock of a movable cover is released by a movable cover locking lever.

In the initial state, the movable cover 20 is rotated to the closed position around the fulcrum shaft 109 by the coil spring 110 in the direction shown by arrow f to close the magazine insertion port 19, as shown in FIG. 40. In this state, when the power supply for the autoloader 11 is turned on, the slide guide plates 91 are moved, in the direction shown by arrow b, to the standby position $P_{20}$ shown by the solid lines in FIGS. 36 through 38. The driven cam roller 128 of the movable cover locking lever 124 is placed on the cam rail 131 by the cam slope 131*a*, as shown in FIGS. 44 and 46, and the movable cover locking lever 124 is rotated in the direction shown by arrow o around the fulcrum shaft 125 against the coil spring 127. As a result, the movable cover locking pin 126 is separated from the engaged piece 112 of the movable cover 20 in the direction shown by arrow o to release the lock of the movable cover 20 at the closed position.

Thus, in this initial state, the movable cover 20 can thus freely be opened and closed in the directions shown by arrows e and f around the fulcrum shaft 109 against the coil spring 110. When the magazine 2 is inserted into the auto-loader 11 through the magazine insertion port 19 in the direction shown by arrow a, the movable cover 20 can be pushed open in the direction shown by arrow e by the magazine 2. After the magazine 2 is automatically loaded in the auto-loader 11 in the direction shown by arrow a, the movable cover 20 is automatically closed by the coil spring 110 in the direction shown by arrow f.

[Operation of Opening and Closing the Movable Cover by the Movable Cover Driving Lever]

The movable cover driving lever 115 is usually urged to rotate around the fulcrum shaft 116 in the direction shown by arrow k by a coil spring 120. The driven cam pin 119 is usually urged upward in the direction shown by arrow k.

On the other hand, when the slider 62 of the magazine loading mechanism 51 is slid to the loading completion position $P_{11}$ shown by the solid line in FIGS. 26 in the direction shown by arrow a, as described above, the driven cam pin 119 is relatively moved to the end 121*e* of the lower horizontal path 121*a* of the cam groove 121 on the side of the point of arrow b, as shown in FIG. 40.

Figure 41:
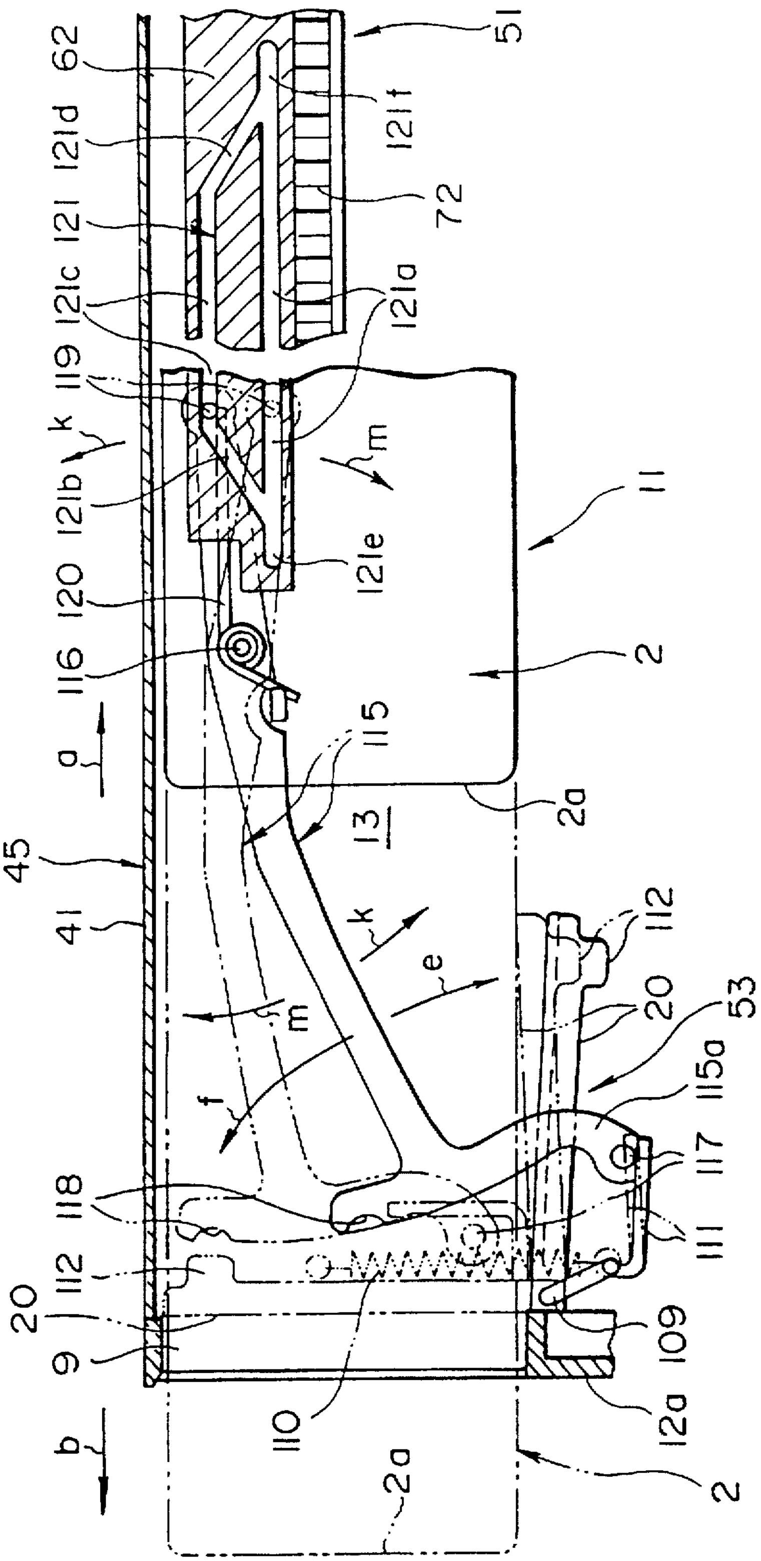
FIG. 41 is a sectional side view illustrating the operation of opening and closing a movable cover by a movable cover opening/closing mechanism.

As described above, therefore, the driven cam pin 119 is moved upward in the direction shown by arrow k from the end 121*e* of the lower horizontal path 121*a* of the cam groove 121 on the side of the point of arrow b to the upper horizontal path 121*c* along the inclined path 121*b* by the upward urging force of the coil spring 116, as shown in FIG. 41, immediately after the slider 62 is started to slide in the direction shown by arrow b from the loading completion position $P_{11}$ shown by the solid line in FIG. 26 to the standby position $P_{12}$ shown by the one-dot-chain line so that the magazine 2 is automatically ejected from the magazine insertion port 19 in the direction shown by arrow b.

The movable cover driving lever 115 is thus rotated around the fulcrum shaft 116 in the direction shown by arrow k from the open position shown by the one-dot-chain line in FIG. 41 to the closed position shown by the solid line. The movable cover driving pin 117 rotates the driven arm 111 of the movable cover 20 in the direction shown by arrow k to automatically open the movable cover 20 around the fulcrum shaft 109 in the direction shown by arrow a against the coil spring 110.

When the slider 62 is continuously slid in the direction shown by arrow b to the standby position $P_{12}$ shown by the one-dot-chain line in FIG. 26, the magazine 2 is pushed out by a predetermined length from the magazine insertion port 19 in the direction shown by arrow b, as shown by the one-dot-chain line in FIG. 41. At this time, the driven cam pin 119 is moved downward, against the coil spring 120, from the upper horizontal path 121*c* of the cam groove 120 to the end 121*f* of the lower horizontal path 121*a* on the side of the point of arrow a along the other inclined path 121*d*.

As a result, the movable cover driving lever 115 is rotated around the fulcrum shaft 116 in the direction shown by arrow m against the coil spring 20 to return to the closed position, as shown by the one-dot-chain line in FIG. 41. Although the movable cover 20 is also rotated around the fulcrum shaft 109 by the coil spring 110 in the direction shown by arrow f, it is stopped in contact with the lower side 2*c* of the magazine 2, with only the movable cover driving pin 117 of the movable cover driving lever 115 separated from the driven arm 111 of the movable cover 20 in the direction shown by arrow f.

Figure 73:
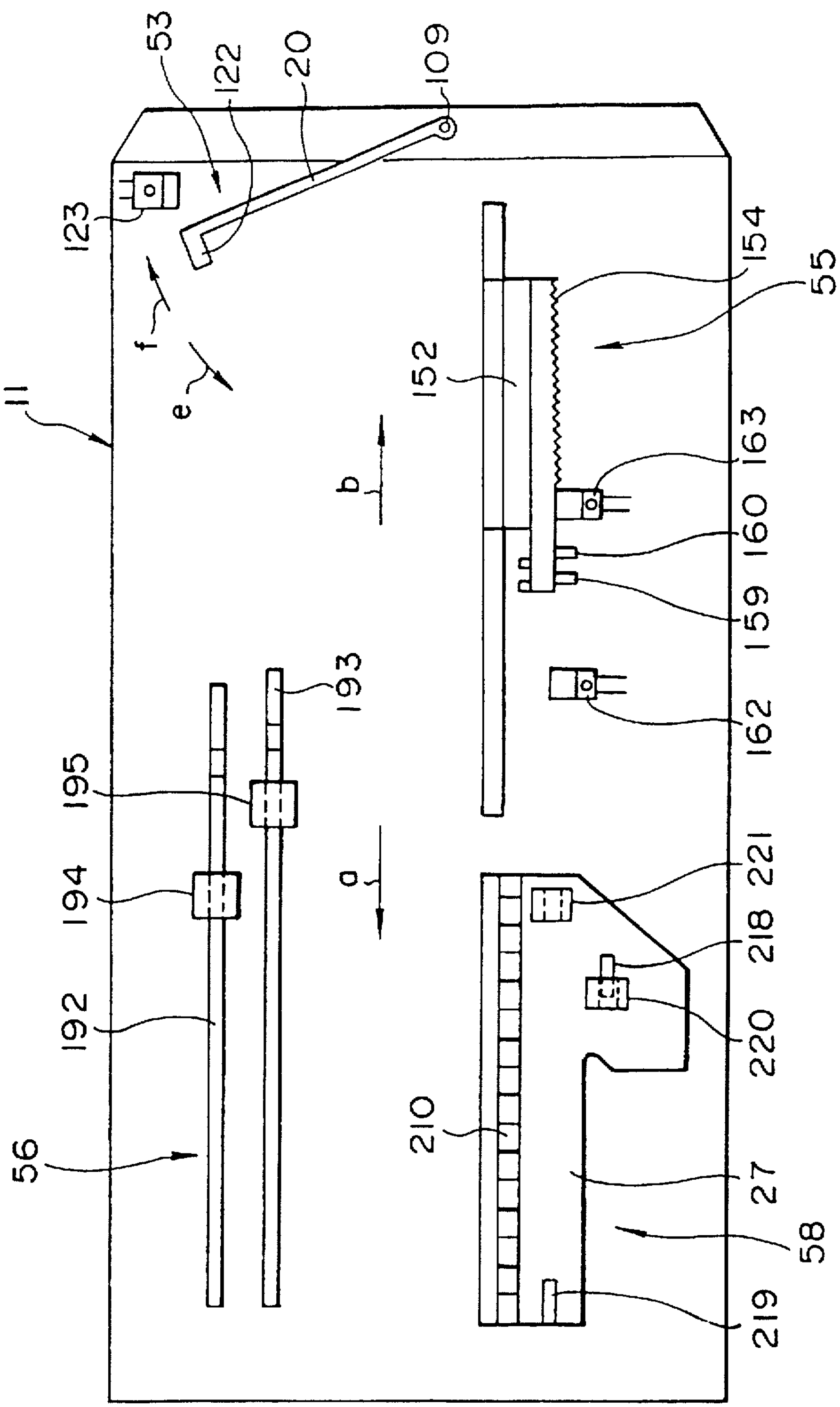
FIG. 73 is a schematic left side view illustrating a plurality of optical sensors in an auto-loader.
Figure 74:
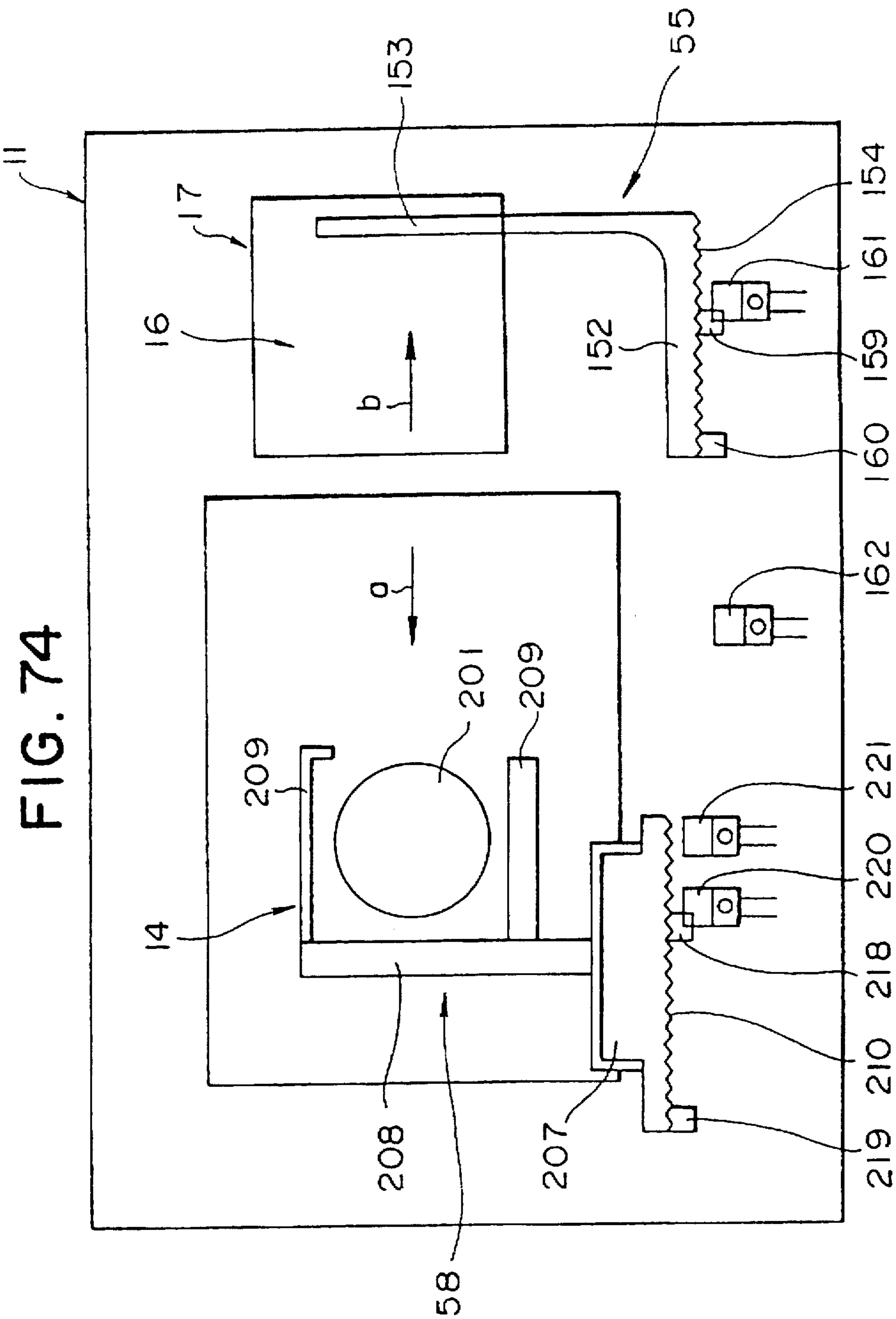
FIG. 74 is a schematic plan view illustrating a plurality of optical sensors in a drive.

After auto-ejection of the magazine 2 is completed, when the magazine 2 is manually drawn from the magazine insertion port 19 in the direction shown by arrow b, the movable cover 20 is rotated, by the coil spring 110, to the initial closed position shown by the two-dot-chain line in FIG. 41 in the direction shown by arrow f, to close the magazine insertion port 19. As shown in FIG. 73, the opening and closing of the movable cover 20 are detected by the optical shutter plate 122 formed on the movable cover 20. The optical sensor 123 serves as a photointerrupter which is turned on and off by the optical shutter plate 122.

[Locked State of the Movable Cover at the Closed Position]

As described above, after the magazine 2 is automatically loaded in the auto-loader 11, when the slide guide plate 91 is slid to the standby position $P_{21}$ from the initial position $P_{20}$ shown in FIGS. 36 through 38 in the direction shown by arrow a to create the standby state, the cam slope 131*a* of the rail-formed cam 131 is separated from the driven cam roller 128 of the movable cover locking lever 124 in the direction shown by arrow a, as shown in FIGS. 39, 40, 43 and 45.

The movable cover locking lever 124 is thus rotated around the fulcrum shaft 125 by the coil spring 127 in the direction shown by arrow n, and the movable cover locking pin 126 is inserted, at substantially right angles, between the engaged piece 112 of the movable cover 20 and the engaging recessed portion 118 of the movable cover driving lever 115 in the direction shown by arrow n. The rotation of the movable cover 20 in the direction shown by arrow e is restricted by the movable cover locking pin 126 to lock the movable cover 20 at the closed position.

Figure 42:
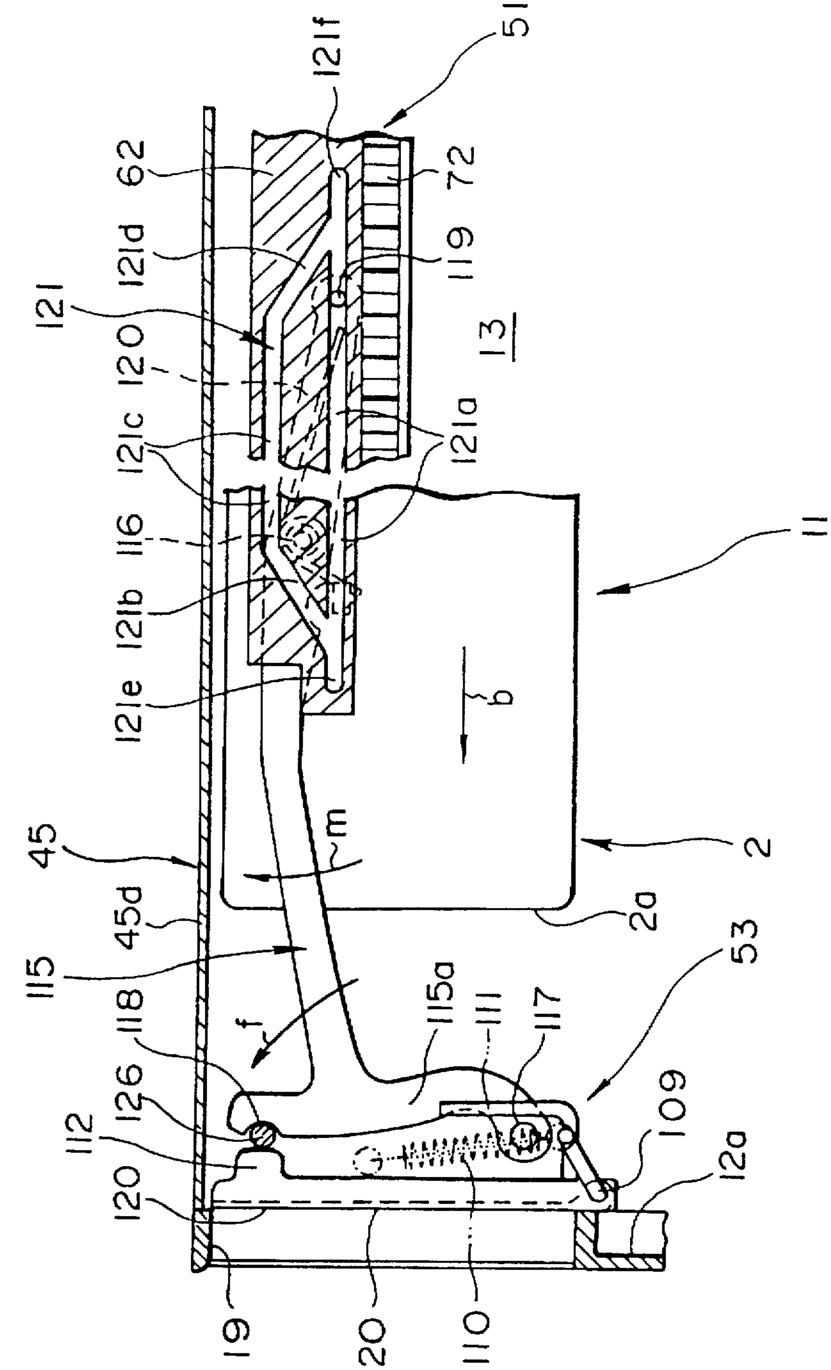
FIG. 42 is a sectional side view illustrating the state wherein opening of a movable cover is inhibited during the operation of automatically pushing a tape cartridge into a magazine.

In the locked state of the movable cover 20 at the closed position, the movable cover driving lever 115 is also locked at the closed position shown in FIGS. 40 and 42 by the movable cover locking pin 126 which is engaged with the engaging recessed portion 118.

[Description of the First Cartridge Ejecting Mechanism]

The first cartridge ejecting mechanism 54 is described with reference to FIGS. 21, 24, 47, 48 and 71.

The first cartridge ejecting mechanism 54 is disposed on the side chassis 45*c*. A guide shaft 134 horizontally is attached to the side chassis 45*c* in parallel with the magazine 2, and a slider 135 serving as a slide driving member which is slid in the directions shown by arrows a and b is provided along the guide shaft 134. A first ejection arm 136 is horizontally integrally formed at right angles at the rear end of the slider 135, i.e., at the end on the side of the point of arrow a, on the side thereof near the magazine insertion space 13. The first ejection arm 136 is horizontally projected into the magazine insertion space 13 at right angles with the lengthwise direction of the magazine 2, i.e. the directions shown by arrows a and b, through the elongated hole 137 horizontally formed in the side chassis 45*c*.

A plate-formed guided piece 138 for stopping the rotation of the slider 135 is integrally horizontally formed on the side of the slider 135 on the front-end side, i.e., on the side of the point of arrow b, opposite to the magazine insertion space 13. The guided piece 138 is inserted between a horizontal upper guide plate 139 formed on the side chassis 45*c*, and a lower guide plate 140 horizontally provided at a distance from the lower portion of the upper guide plate 139 to be guided in the directions shown by arrows a and b so that the first ejection arm 136 kept in a horizontal state can be horizontally moved in the directions shown by arrows a and b.

A driving mechanism for driving the slider 135 in the directions shown by arrows a and b comprises a rack and pinion mechanism 144 comprising a rack 141 which is horizontally integrally formed along the side of the slider 135 opposite to the magazine insertion space 13, and a pinion 143 which is rotated by a geared motor 142 provided on the lower portion of the lower guide plate 140 to drive the rack 141 in the directions shown by arrows a and b. A motor 73 for the magazine loading mechanism 51 is provided on the upper portion of the upper guide plate 139.

A pair of horizontal front and rear optical shutter plates 146 and 147 are integrally formed at the front and rear ends of the slider 135 on the side thereof opposite to the magazine insertion space 13. A pair of front and rear optical sensors 148 and 149 serve as photointerrupters which are turned on and off by the optical shutter plates 146 and 147, respectively, and are provided on the side chassis 45*c*. The optical sensor 148 serves as a sensor for setting the first ejection arm 136 at the ejection start position. The other optical sensor 149 serves as a sensor for preventing over-running of the first ejection arm 136 in the direction shown by arrow b.

[Setting of the First Ejection Arm at the Ejection Start Position]

When the power supply for the auto-loader 11 is turned on, the pinion 143 is driven in the reverse direction by the geared motor 142 of the rack and pinion mechanism 144 to drive the rack 141 in the direction shown by arrow a. The slider 135 is thus slid along the guide shaft 134 in the direction shown by arrow a. The first ejection arm 136 is moved to the standby position $P_{41}$ shown by the solid line in FIGS. 47 and 48(A) in the direction shown by arrow a. The optical sensor 148 is operated (ON→OFF) by the optical shutter plate 146 to stop the geared motor 142 and set the first ejection arm 136 at the standby position $P_{41}$.

[Operation of Automatically Setting the First Arm Ejection in the Magazine]

Figure 47:
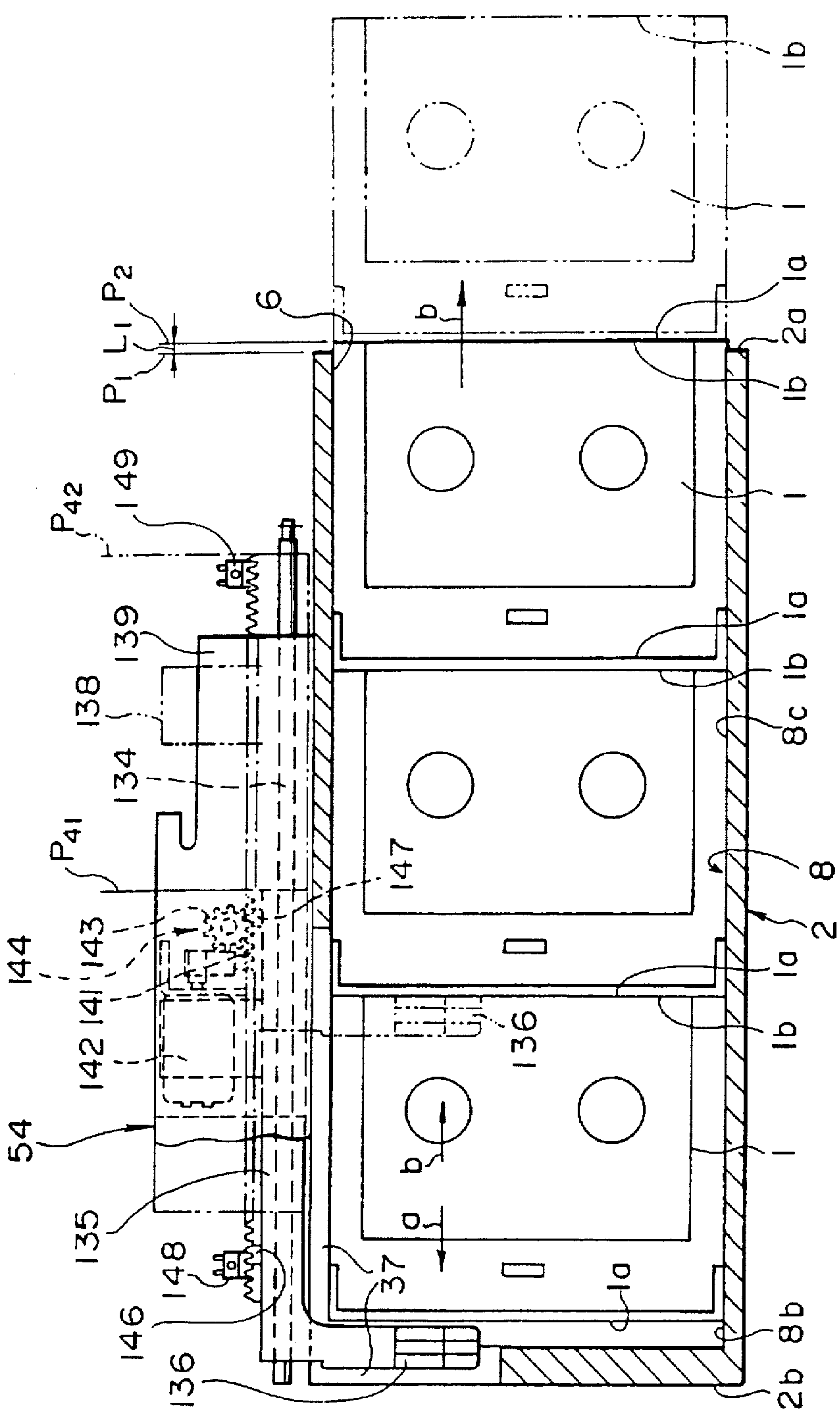
FIG. 47 is a partly broken-away plan view illustrating a first cartridge ejecting mechanism.

When the magazine 2 is automatically horizontally loaded in the auto-loader 11 from the magazine insertion port 19 in the direction shown by arrow a and set at the position shown in FIG. 47, as described above, the first ejection arm 136 is relatively horizontally inserted, from the direction shown by arrow b, to the end of the first opening 37 of the magazine 2 on the side of the point of arrow a, and automatically set.

[Operation of Ejecting the Tape Cartridge by the First Ejection Arm]

When the pinion 143 is normally rotated by the geared motor 142 of the rack and pinion mechanism 144 on the basis of a command signal from the computer to eject the tape cartridge 1, the rack 141 is driven in the direction shown by arrow b. The slider 135 is then slid along the guide shaft 134 in the direction shown by arrow b to horizontally move the first ejection arm 136 along the first opening 37 of the magazine 2 from the standby position $P_{41}$ shown by the solid line in FIGS. 47 and 48 to the position $P_{42}$ shown by the one-dot-chain line in the direction shown by arrow b.

As a result, the front end 1*a* of the tape cartridge 1 in the lower stage of the vertical path 8*b* of the cartridge rotation path 8 in the magazine 2 is horizontally pushed out, in the direction shown by arrow b, by the first ejection arm 136 horizontally moved in the direction shown by arrow b, as described above with reference to FIG. 13. This operation of ejecting the cartridge causes the three tape cartridges 1 in the lower stage of the vertical path and the lower horizontal path 8*c* to be simultaneously pushed out by a stroke corresponding to one tape cartridge in the direction shown by arrow b, to push one of the tape cartridges 1, in the direction shown by arrow b, into the cartridge tray 16 of the elevator 17 from the cartridge ejection port 6 of the magazine 2, as described above with reference to FIGS. 2(A) and 10.

At this time, when the front end 1*a* of the tape cartridge 1 entering the cartridge tray 16 is pushed to a position at a distance $L_1$ from the reference position $P_1$ in the direction shown by arrow b and reaches the first ejection position $P_2$, as described above with reference to FIG. 10, the geared motor 142 of the rack and pinion mechanism 144 is stopped on the basis of the detection output from a cartridge ejection position detecting sensor in the cartridge tray 16, which will be described below, to stop the slider 135 and the first ejection arm 136 at the position $P_{42}$ shown by the one-dot-chain line.

When no detection output is obtained from the cartridge ejection position detecting sensor, the other optical sensor 149 is operated (OFF→ON) by the other optical shutter plate 147 to stop the geared motor 142, thereby preventing overrunning of the first ejection arm 136 in the direction shown by arrow b.

Figure 48A:
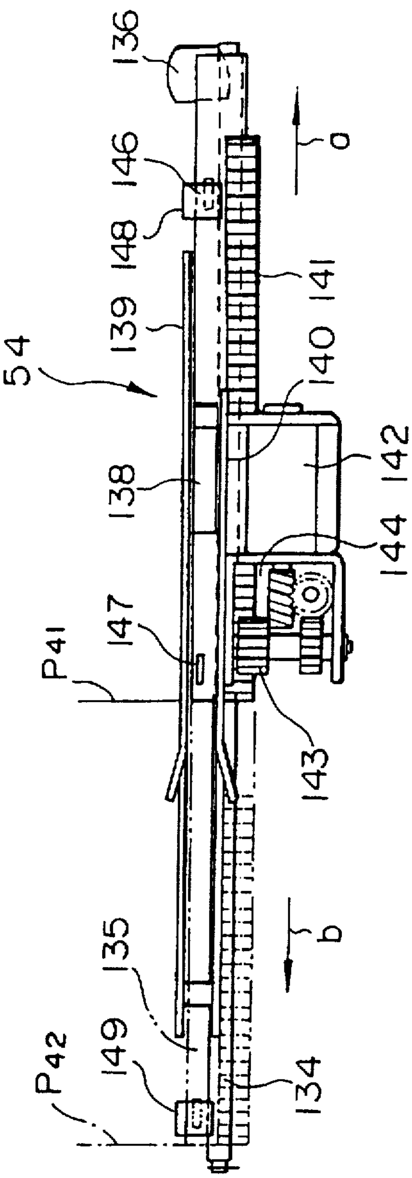
FIG. 48 is a side view of a first cartridge ejecting mechanism and a sectional side view of a principal portion thereof.
Figure 48B:
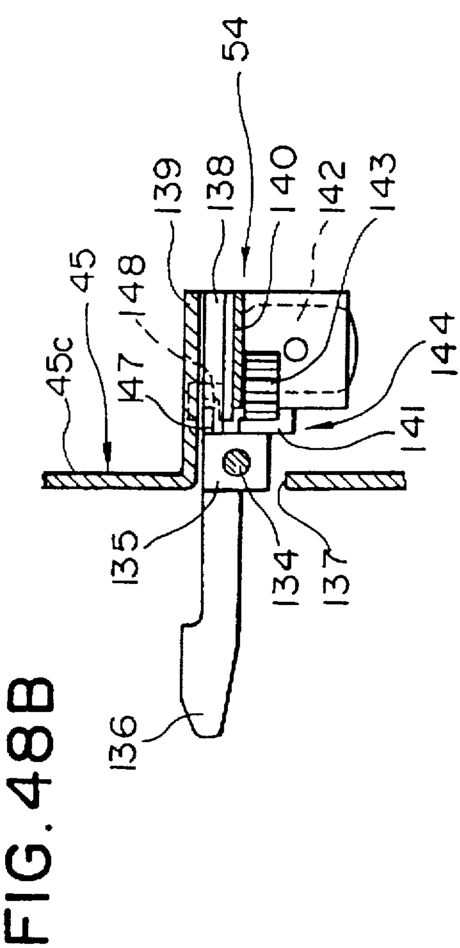

When the pinion 143 is then driven in the reverse direction by the geared motor 142 of the rack and pinion mechanism 144 to drive the rack 141 in the direction shown by arrow a, the first ejection arm 136 is returned integrally with the slider 135 to the initial standby position $P_{41}$ shown by the solid line in FIGS. 47 and 48 in the direction shown by arrow a.

When the first ejection arm 136 is returned in the direction shown by arrow a from the position $P_{42}$ shown by the one-dot-chain line in FIG. 47 to the standby position $P_{41}$ shown by the solid line, and the first ejection arm 136 is retracted rearward in the direction shown by arrow a, from the lower stage position in the vertical path 8*b* of the magazine 2, the two tape cartridges 1 in the vertical path 8*b* are horizontally dropped down by a step corresponding to one tape cartridge in the direction shown by arrow d to generate the space S for one tape cartridge 1 in the upper portion of the vertical path 8*b*, as described above with reference to FIGS. 2(*p*) and 13.

[Description of the Second Cartridge Ejecting Mechanism]

The second cartridge ejecting mechanism 55 is described below with reference to FIGS. 21, 22, 24, 31, 49 to 51, 71, 73 and 74.

The second cartridge extruding mechanism 55 is provided on the tray elevator 84 so as to be moved upward and downward together with the cartridge tray 16 in the directions shown by arrows c and d. A guide shaft 151 is horizontally provided on the inside of the side plate 84*a* of the tray elevator 84 in parallel with the magazine 2, and a second ejection arm 153 is horizontally provided, on the side of the point of arrow b, at right angles at the end of a slider 152 serving as a slide driving member, which is slid along the guide shaft 151 in the directions shown by arrows a and b. The second ejection arm 153 is inserted into the cartridge tray 16 through the elongated hole 16*e* horizontally formed in one of the sides of the cartridge tray 16, to be set at right angles with the direction shown by arrow a which is the direction of ejection of the tape cartridges 1.

The slider 152 is molded with a synthetic resin, and a rack 154 is horizontally integrally formed along the lower side of the slider 152. A drive mechanism for driving the slider 152 in the directions shown by arrows a and b comprises a rack and pinion mechanism 157 comprising the rack 154 and a pinion 156 rotated by a geared motor 155 provided on the tray elevator 48 to drive the rack 154.

Figure 51:
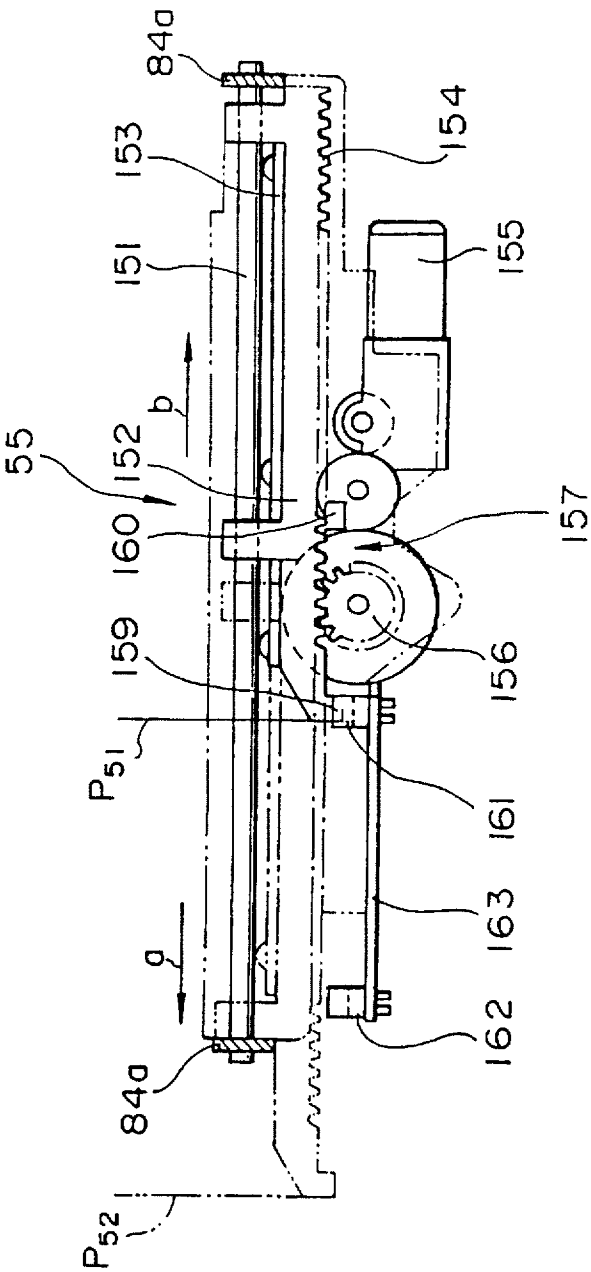
FIG. 51 is a sectional side view taken along line M—M of FIG. 49.

As shown in FIG. 51, a pair of horizontal front and rear optical shutter plates 159 and 160 are integrally formed on the slider 152 at a distance therebetween in the lengthwise direction, i.e., in the directions shown by arrows a and b, and a pair of front and rear optical sensors 161 and 162 serving as photointerrupters, which turned on and off by the optical shutter plates 159 and 160, are provided on the side of the tray elevator 84. The optical sensor 161 serves as a sensor for detecting the standby position of the second ejection arm 153, and the other optical sensor 162 serves as a sensor for detecting the ejection end position of the second ejection lever 153.

[Setting of the Second Ejection Arm at the Standby Position]

When the power supply for the auto-loader 11 is turned on, the pinion 156 is rotated in the reverse direction by the geared motor 155 of the rack and pinion mechanism 157 to drive the rack 154 in the direction shown by arrow b. Thus, the slider 152 is slid to the standby position $P_{51}$ shown by solid line in FIGS. 49 and 51 along the guide shaft 151 in the direction shown by arrow b. The second ejection arm 153 is moved to the standby position shown by the solid line in FIG. 49 in the direction shown by arrow b within the cartridge tray 16. The optical sensor 161 is operated (ON→OFF) by the optical shutter plate 159 to stop the geared motor 155 and set the second ejection arm 153 at the standby position.

[Operation of Ejecting Tape Cartridge from the Cartridge Tray by the Second Ejection Arm]

When a command signal to eject the tape cartridge 1 is output from the computer after the tape cartridge 1 is inserted into the cartridge tray 16 in the direction shown by arrow b, as described above, the pinion 156 is normally rotated by the geared motor 155 of the rack and pinion mechanism 157 to drive the rack 154 in the direction shown by arrow a. As a result, the slider 152 is slid along the guide shaft 151 in the direction shown by arrow a to the ejection end position $P_{52}$ shown by a one-dot chain line in FIGS. 49 and 51.

Figure 49:
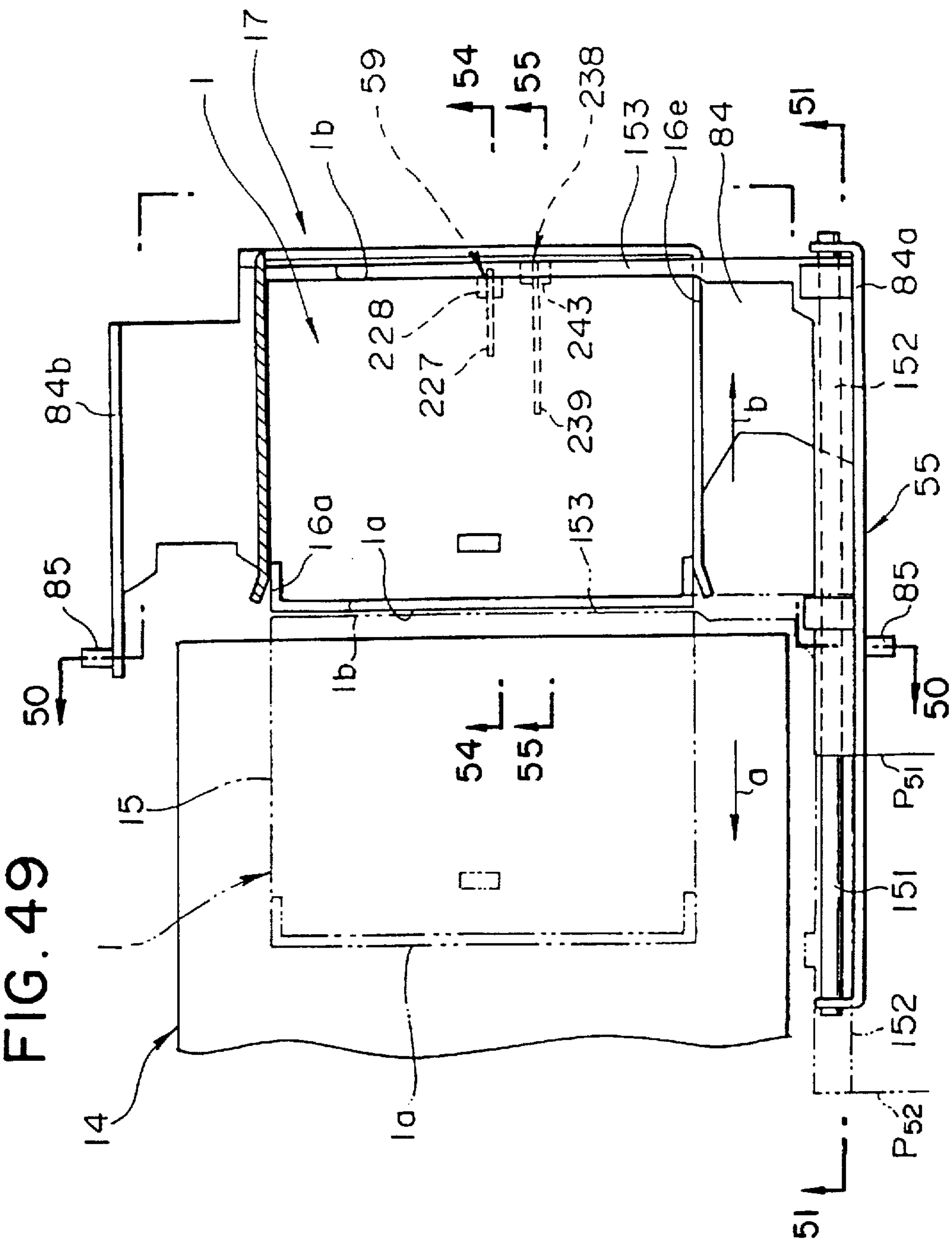
FIG. 49 is a partly broken-away plan view illustrating a second cartridge ejecting mechanism.
Figure 50:
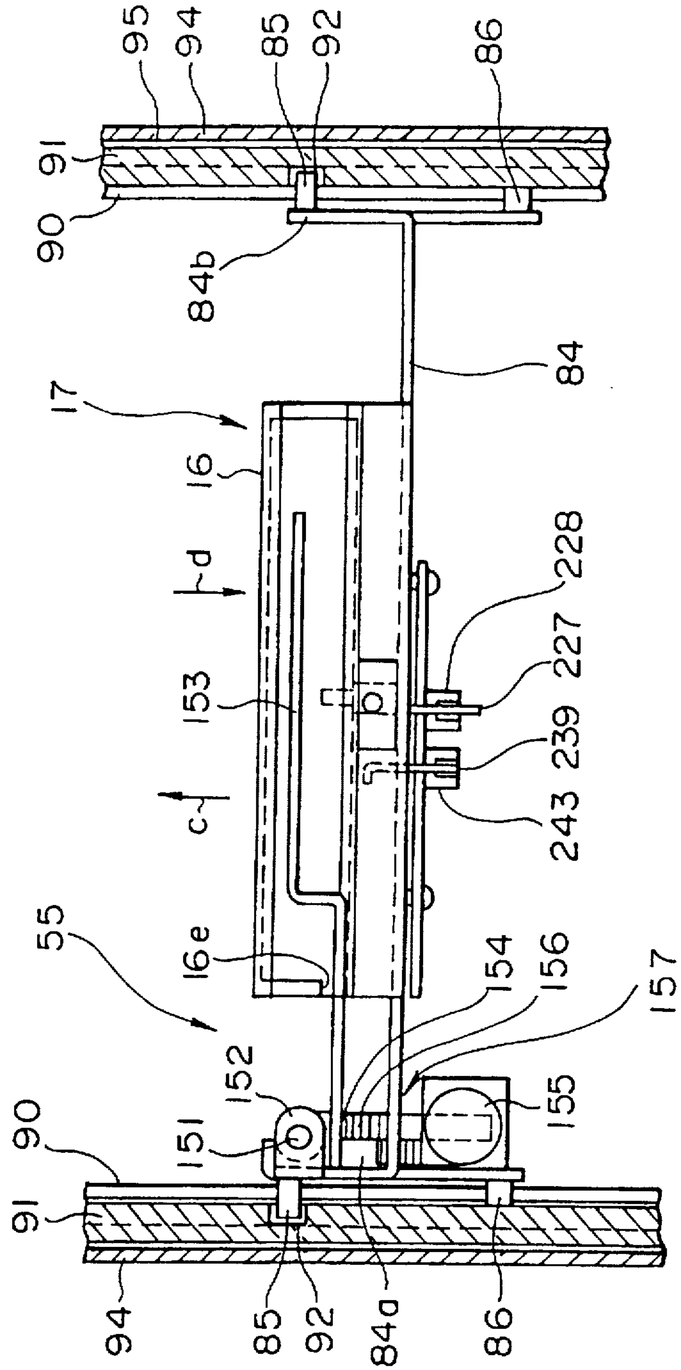
FIG. 50 is a sectional side view taken along line L—L of FIG. 49.

Thus, the second ejection arm 153 is moved in the direction shown by arrow a from the standby position shown by a solid line in FIG. 49 to the ejection end position shown by a one-dot-chain line within the cartridge tray 16. The second ejection arm 153 pushes the rear end 1*b* of the tape cartridge 1 in the cartridge tray 16 to push out the tape cartridge 1 from the opening 16*a* of the cartridge tray 16 in the direction shown by arrow a, as described above, thereby pushing the tape cartridge 1 into the drive 14 or the magazine 2 in the direction shown by arrow a.

When the second ejection arm 153 reaches the ejection end position shown by the one-dot-chain line in FIG. 49, the other optical sensor 162 is operated (ON→OFF) by the other optical shutter plate 160 to stop the geared motor 155 of the rack and pinion mechanism 157. When the pinion 156 is then rotated in the reverse direction by the geared motor 155, the rack 154 is driven in the direction shown by arrow b to return the second ejection arm 153 to the ejection start position shown by the solid line in FIG. 49 together with the slider 152 in the direction shown by arrow b.

[Description of the Third Cartridge Ejecting Mechanism]

The third cartridge ejecting mechanism 56 is described below with reference to FIGS. 21, 24, 52 through 56, 71 and 72.

The third cartridge ejecting mechanism 56 is disposed along the outer side of the other side chassis 45*b* of the chassis 45 relative to the magazine insertion space 13. A guide shaft 165 is horizontally provided on the side chassis 45*b* in parallel with the magazine 2, and a slider 166 serving as a slide driving member is provided along the guide shaft 165 so as to be slidable in the directions shown by arrows a and b. A horizontal third ejection arm 167 is provided below the slider 166 through a fulcrum vertical shaft 168 so as to be horizontally rotatable in the directions shown by arrows q and r.

The third ejection arm 167 is set at the same height as the guide groove 38 and the second opening 39 of the magazine 2 which is loaded in the magazine insertion space and horizontally set therein. The third ejection arm 167 can be rotated in the directions shown by arrows q and r within a range of 45° between a position shown by a solid line and a position shown by a one-dot-chain line in FIG. 54 so that it can be moved in and out of the magazine insertion space 13 through the elongated hole 169 which is horizontally formed in the side chassis 45*b*. In the state where the third ejection arm 167 is inserted into the magazine insertion space 13, the third ejection arm 167 can also be moved along the elongated hole 169 in the directions shown by arrows a and b within the range between the position shown by a one-dot-chain line and the position shown by a two-dot-chain line in FIG. 55.

Figure 55:
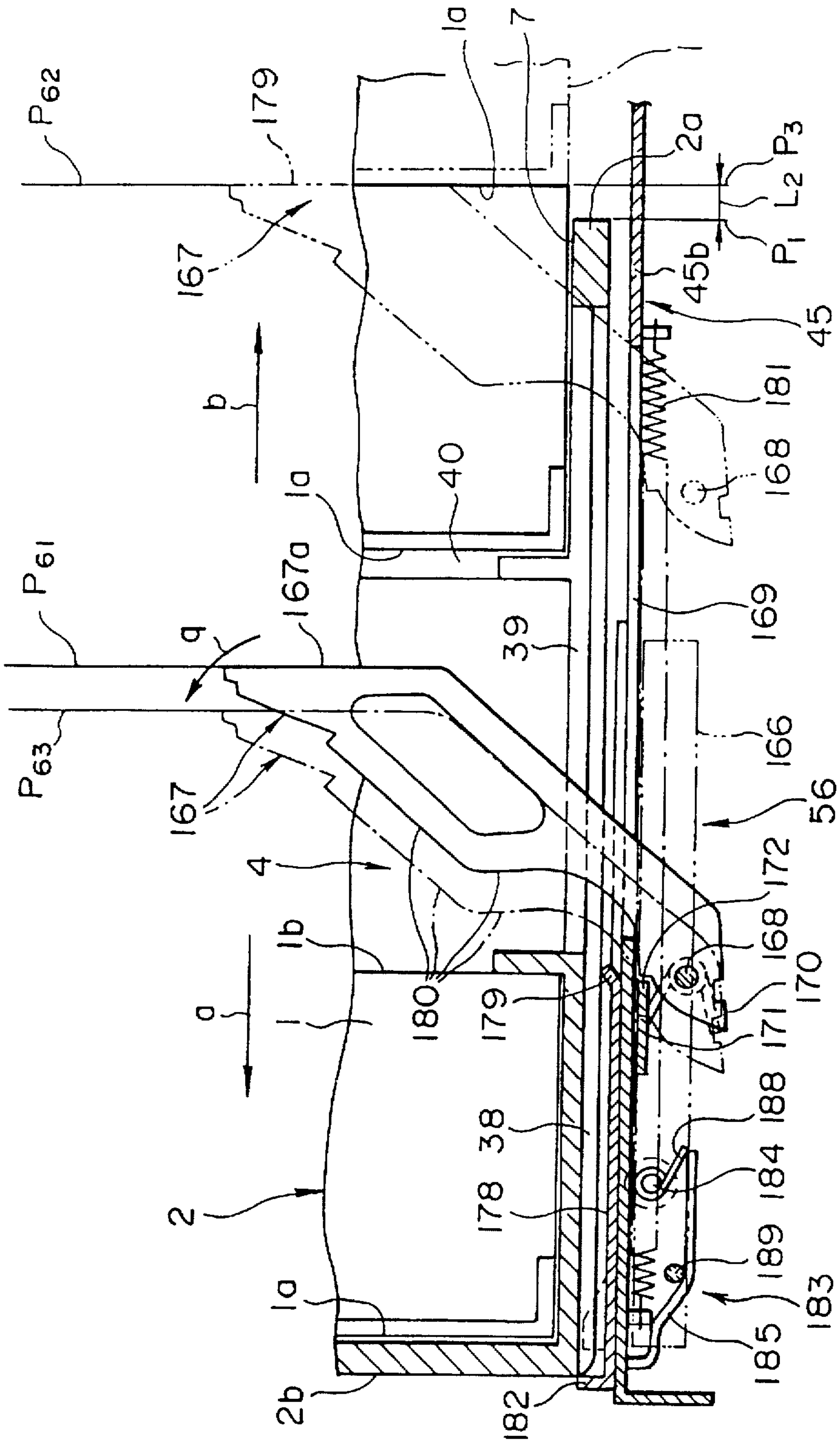
FIG. 55 is a partly broken-away plan view illustrating the operation of moving a third ejection arm of a third cartridge ejecting mechanism into a magazine insertion space, and the operation of ejecting a tape cartridge by the third ejection arm.

The third ejection arm 167 is urged to be rotated in the direction shown by arrow q by a coil spring 170, a stopper 171 being provided on the slider 166 so as to stop the rotation of the third ejection arm 167 at the ejection start position shown by the solid line in FIG. 55. A stepped portion 172 formed on the side of the third ejection arm 167 near the fulcrum shaft 168 is engaged with the stopper 171.

A driving mechanism for sliding the slider 166 in the directions shown by arrow a and b comprises a rack and pinion mechanism comprising a horizontal rack 173 integrally formed on the side of the slider 166, and a pinion 175 rotated by a geared motor 174 provided on the side chassis 45*b* so as to drive the rack 173.

A plate-formed slide cam 178 is provided on the side of the side chassis 45*b* near the magazine insertion space 13 opposite to the elongated hole 169 so as to be slidable in the directions shown by arrows a and b. A cam projection 179 for controlling rotation of the third ejection arm 167 in the directions shown by arrows q and r is formed on the slide cam 178, and a driven cam surface 180, which is formed in a substantially crank shape having a gentle curved surface along the side of the third ejection arm 167 on the side of the point of arrow q is brought into contact with the cam projection 179 in the direction shown by arrow q. The slide cam 178 is urged by a coil spring 181 to be slid in the direction shown by arrow b from the position shown in FIG. 55 to the position shown in FIG. 54. A magazine contact portion 182 which is projected at substantially right angles into the magazine insertion space 13 is formed at the end of the slide cam 178 on the side of the point of arrow a.

A magazine locking mechanism 183 controlled by the slider is provided on the outside of the side chassis 45*b* opposite to the magazine insertion space 13 in the lower portion of the third ejection mechanism 56 on the side of the point of arrow b. The magazine locking mechanism 183 has a horizontal magazine locking lever 185 provided on the side chassis 45*b* through a vertical fulcrum shaft 184 so as to be rotatable in the directions shown by arrows t and u. A locking claw 186 horizontally integrally formed on the side of the magazine locking lever 185 on the side of the point of arrow t is set at the same height as a second locked portion 42 of the magazine 2 which is horizontally loaded in the magazine insertion space 13 and set therein. The locking claw 186 can be moved in and out of the magazine insertion space 13 through the elongated hole 187 which is horizontally formed in the side chassis 45*b*. The magazine locking lever 185 is urged to be rotated in the directions shown by arrow t by a coil spring 188 to be brought into contact with the side chassis 45*b*.

A rib-formed cam 190 controlled by a vertical cam driving pin 189, which is provided on the lower side of the slider 166 on the side of the point of arrow a, is vertically integrally formed along the upper outer edge of the magazine locking lever 185. A substantially crank-formed cam surface 190*a* is formed on the inside of the rib-formed cam 190.

Horizontal optical shutter plates 192 and 193 are integrally formed in parallel two steps along the upper portion of the slider 166. A pair of upper and lower optical sensors 194 and 195 serve as photointerrupters which are turned on and off by the pair of upper and lower optical shutter plates 192 and 193, respectively, and are provided on the side chassis 45*b*. The optical sensor 195 serves as a sensor for detecting the standby position $P_{61}$ of the slider 166, and the other optical sensor 194 serves as a sensor for detecting the ejection end position $P_{62}$ of the slider 166 and the overstroke position $P_{63}$, where a lock of the magazine 2 is completely released, in the direction shown by arrow a.

[Standby State of the Third Ejection Arm]

When the power supply for the auto-loader 11 is turned on, the pinion 175 is normally or reversely rotated by the geared motor 174 of the rack and pinion mechanism 176, to slide the slider 166 in the direction shown by arrow a or b through the rack 173 to locate the slider 166. When the slider 166 is located at the standby position $P_{61}$ shown by the solid line in FIG. 52 and by the one-dot-chain line in FIGS. 54 and 55, the optical sensor 195 is turned on, and the other optical sensor 194 turned off. When the ejection start position is detected, the geared motor 174 is stopped.

Figure 54:
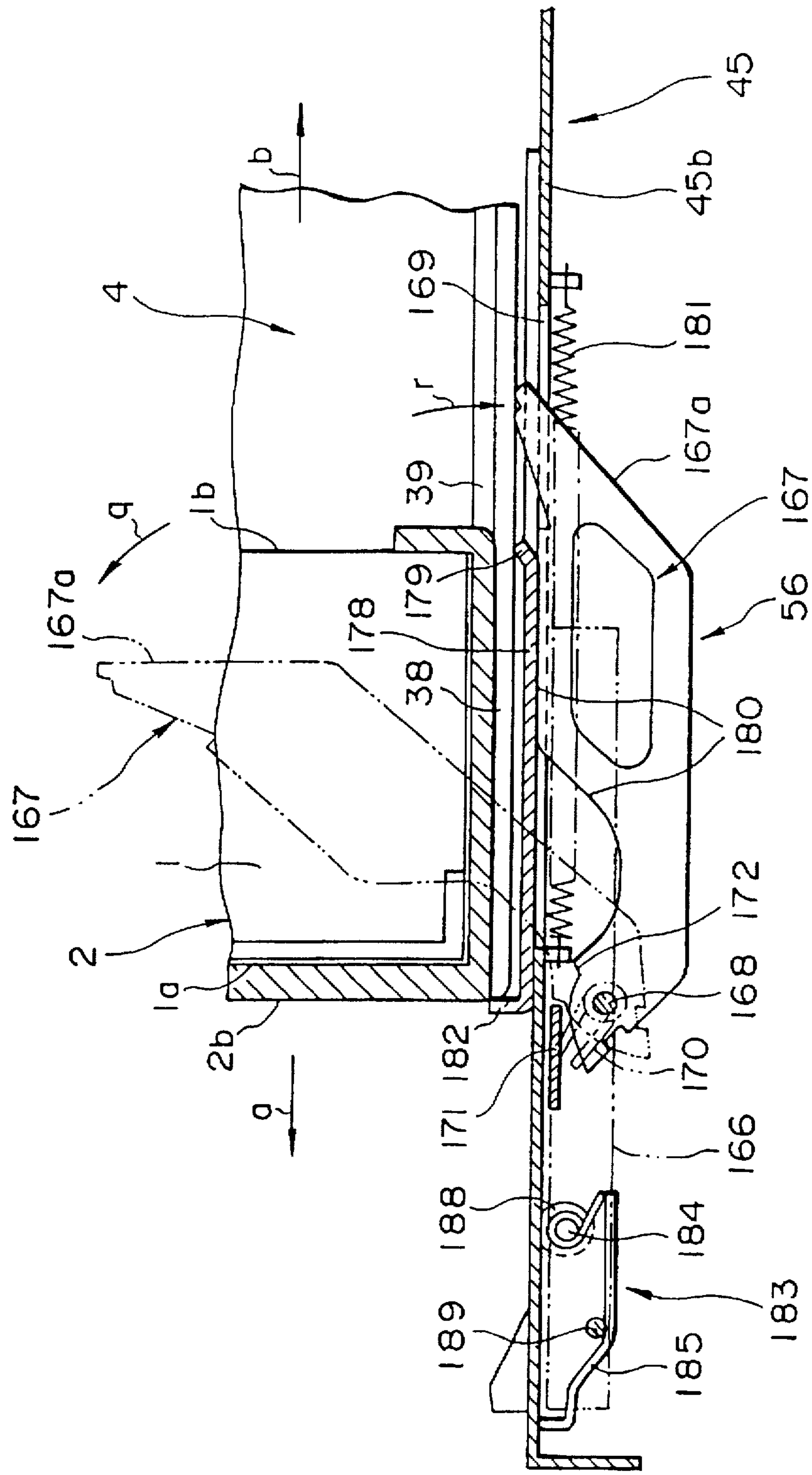
FIG. 54 is a partly broken-away plan view illustrating the operation of retracting a third ejection arm of a third cartridge ejecting mechanism from a magazine insertion space.

At this time, the slide cam 178 is slid by the coil spring 181 to the position shown by the solid line in FIG. 54 in the direction shown by arrow b. When the driven cam surface 180 of the third ejection arm 167 is pushed by the cam projection 179 in the direction shown by arrow r, the third ejection arm 167 is rotated around the fulcrum shaft 168 in the direction shown by arrow r, against the coil spring 170, and the third ejection arm 167 is ejected from the elongated hole 169 in the direction shown by arrow r which is the outward direction of the magazine insertion space 13, and is set in parallel with the magazine 2.

(Operation of Automatically Setting the Third Ejection Arm in the Magazine)

As described above, a portion of the side *2b* of the magazine 2 contacts the magazine contact portion 182 of the slide cam 178 from the direction shown by arrow a, as shown in FIG. 54. This occurs in the course of auto-loading the magazine 2 in the magazine insertion space 13 of the auto-loader 11 in the direction shown by arrow b. The slide cam 178 is pushed by the magazine 2 to be slid together with the magazine 2 in the direction shown by arrow a against the coil spring 181.

The third ejection arm 167 is rotated around the fulcrum shaft 168 in the direction shown by arrow q by the coil spring 170. The slide cam is slid in the direction shown by arrow a, and is moved into the magazine insertion space 13 in the direction shown by arrow q through the elongated hole 169 to enter the guide groove 38 of the magazine 2 which is being pulled in the direction shown by arrow a.

Immediately before the slide cam 178 is then slid together with the magazine 2 to the loading completion position shown in FIG. 55 in the direction shown by arrow a, the cam projection 179 of the slide cam 178 is separated from the driven cam surface 180 of the third ejection arm 167 in the direction shown by arrow a.

Therefore, substantially at the same time that the slide cam 178 reaches the loading completion position shown in FIG. 55 integrally with the magazine 2, the third ejection arm 167 is rotated about 45° by the coil spring 170 around the fulcrum shaft 168 in the direction shown by arrow q, as shown by the solid line in FIG. 55, automatically inserted into the hollow portion 4 of the magazine 2 from the second opening 39 of the magazine 2 in the direction shown by arrow q, and set therein. When the stepped portion 172 of the third ejection arm 167 is brought into contact with the stopper 171 of the slider 166 in the direction shown by arrow q to stop the third ejection arm 167. The cartridge ejection surface formed on the side of the third ejection arm 167 at the end thereof on the side of the point of arrow r is set at right angles with the direction of ejection of the magazine 2 and the cartridge, i.e., the direction shown by arrow b, to cause the state wherein the tape cartridge 1 can be ejected by the third ejection arm 167 in the direction shown by arrow b.

Figure 56:
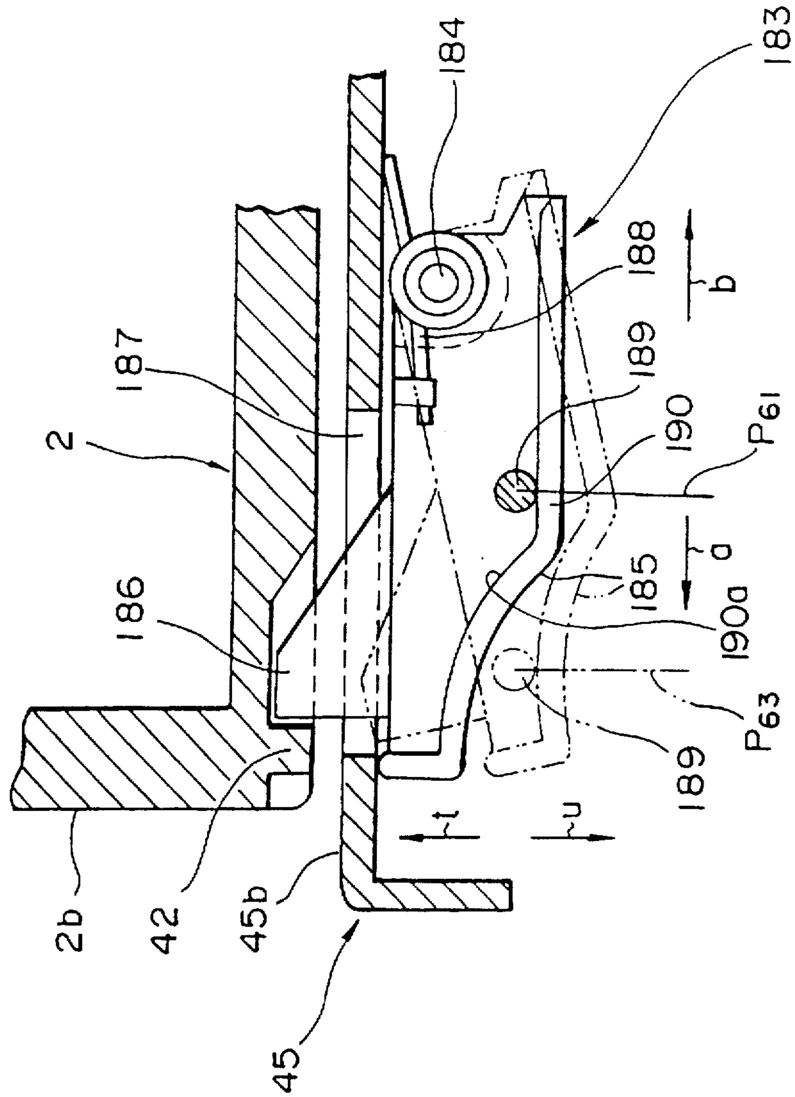
FIG. 56 is a sectional plan view illustrating a magazine locking mechanism of a third cartridge ejecting mechanism.

On the other hand, when the magazine 2 is drawn to the loading completion position in the direction shown by arrow a, as shown by the solid line in FIG. 56, the locking claw 186 of the magazine locking lever 185 passes by the second locked portion 42 of the magazine 2 against the coil spring 188 in the direction shown by arrow b, to be automatically engaged with the side of the second locked portion 42 on the side of the point of arrow b. Thus, the moment the magazine 2 is drawn to the loading completion position in the direction shown by arrow a, the magazine 2 is automatically locked at the loading completion position by the magazine locking lever 185 of the magazine locking mechanism 183.

[Operation of Ejecting the Tape Cartridge by the Third Ejection Arm]

On the basis of a command signal from the computer to eject the tape cartridge 1, the pinion 175 is normally rotated by the geared motor 174 of the rack and pinion mechanism 176 to drive the rack 173 in the direction shown by arrow b. The slider 166 is slid from the standby position $P_{61}$ shown by the solid line in FIG. 52 to the ejection end position $P_{62}$ shown by the two-dot-chain line along the guide shaft 165 in the direction shown by arrow b. As a result, the third ejection arm 167 is horizontally moved by parallel motion from the standby position $P_{61}$ shown by the solid line in FIG. 55 to the ejection end position $P_{62}$ shown by the two-dot-chain line in the direction shown by arrow b. The rotation of the third ejection arm 167 is inhibited by engagement between the stepped portion 172 thereof and the stopper 171 of the slider 166.

The third ejection arm 167 is thus moved into the cartridge containment port 7 from the hollow portion of the magazine 2 through the notch 40 in the direction shown by arrow b to push the front end 1*a* of the tape cartridge 1 contained in the cartridge containment port 7 by the cartridge ejection surface 167*a* in the direction shown by arrow b. The tape cartridge 1 is consequently horizontally pushed into the cartridge tray 16 of the elevator 17 in the direction shown by arrow b, as described above with reference to FIGS. 6(B) and 10.

At this time, when the front end 1*a* of the tape cartridge 1 in the cartridge tray 16 is pushed out to a position at distance $L_2$ from the reference position $P_1$ in the direction shown by arrow b and reaches the second ejection position $P_3$, the geared motor 174 of the rack and pinion mechanism 176 is stopped on the basis of the detection output from the cartridge ejection position detecting sensor in the cartridge tray 16, which will be described below.

At this time, when no detection signal is obtained from the cartridge eejection position detection, the other optical sensor 194 is operated (OFF→ON) by the end of the optical shutter plate 192 on the side of the point of arrow a to stop the geared motor 174 and prevent overrunning of the third extrusion arm 167 in the direction shown by arrow b.

After the tape cartridge 1 is pushed into the cartridge tray 16 from the cartridge containment port 7 in the direction shown by arrow b, the pinion 175 is reversely rotated by the geared motor 174 of the rack and pinion mechanism 176 to drive the rack 173 in the direction shown by arrow b, thereby returning the third ejection arm 167 integrally with the slider 166 to the initial standby position $P_{61}$ shown by the solid line in FIG. 55 in the direction shown by arrow a.

[Operation of Releasing the Locked State when Ejecting the Magazine]

Figure 52:
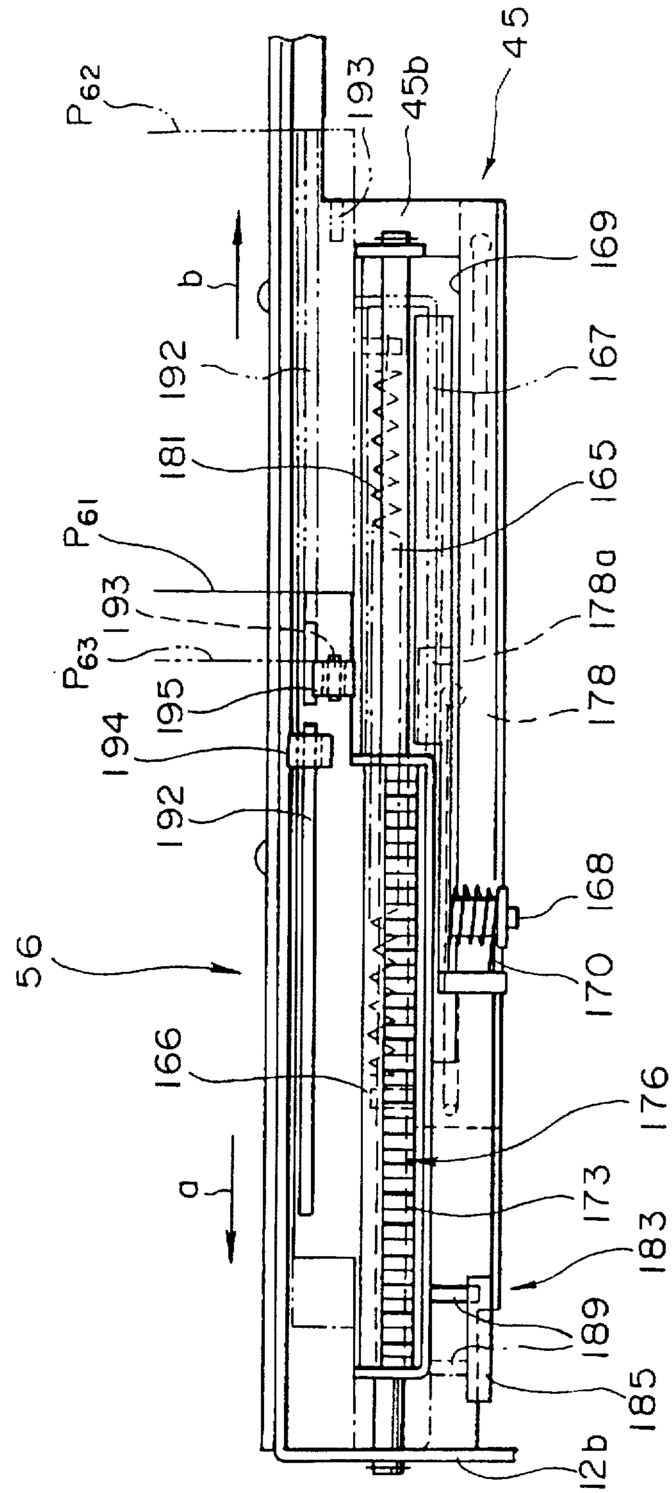
FIG. 52 is a side view illustrating a third cartridge ejecting mechanism.
Figure 53B:
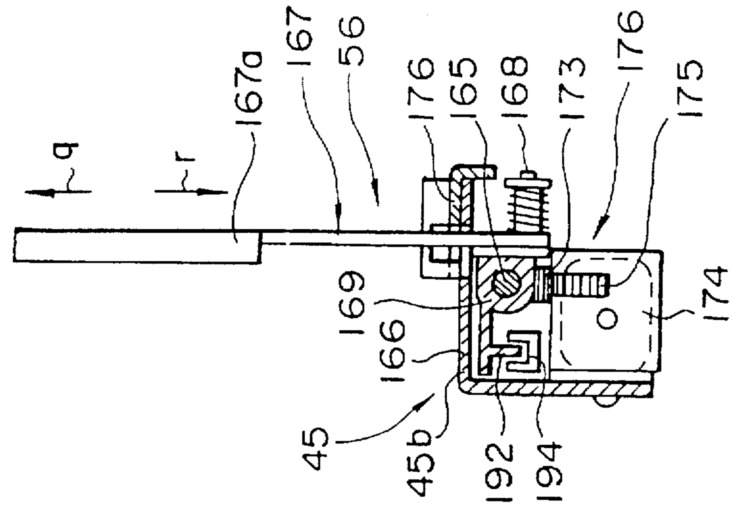
FIG. 53 is a partly broken-away plan view and a sectional side view of a third cartridge ejecting mechanism.
Figure 53A:
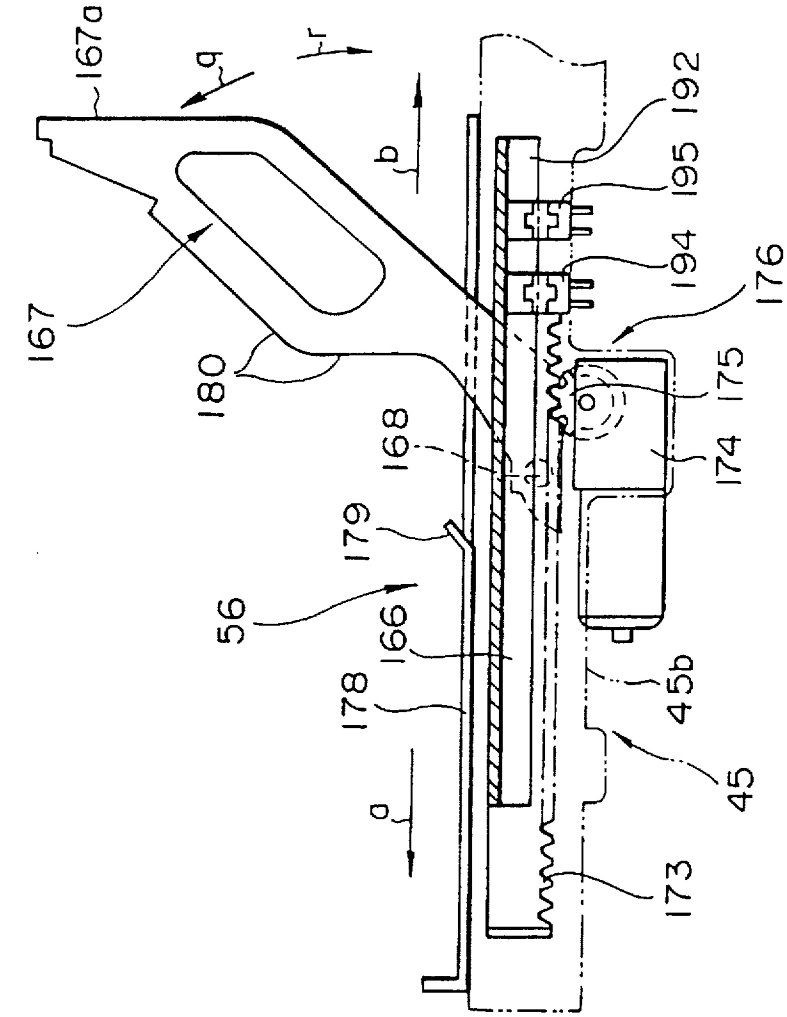

When the magazine 2 in the auto-loader 11 is automatically ejected from the magazine insertion port 19 in the direction shown by arrow b by the magazine loading mechanism 51, as described above, the pinion 175 is first reversely rotated by the geared motor 174 of the rack and pinion mechanism 176 to slide the slider 166 through the rack 173 from the standby position $P_{61}$ shown by the solid line in FIGS. 52 and 55 to the over-stroke position $P_{63}$ shown by the one-dot-chain line in the direction shown by arrow a. The other optical sensor 195 is operated (ON→OFF) by the other optical shutter plate 194 to stop the geared motor 174.

As a result, the cam drive pin 189 of the slider 166 is pressed by the cam surface 190*a* of the rib-shaped cam 190 of the magazine locking lever 185 in the direction shown by arrow a, as shown by the one-dot-chain line in FIGS. 52 and 56. The cam action of the cam surface 190 rotates the magazine locking lever 185 around the fulcrum shaft 184 in the direction shown by arrow u against the coil spring 188. The locking claw 186 is thus separated from the second locked portion 42 of the magazine 2 in the direction shown by arrow u to release the lock of the magazine at the loading completion position.

[Operation of Retracting the Third Ejection Arm to the Outside of the Magazine]

As described above, the magazine 2 contained in the magazine insertion space 13 is pushed out in the direction shown by arrow b by the operation of automatically ejecting the magazine to the outside of the magazine insertion port 19 by the magazine loading mechanism 51. At this time, the slide cam 178 is slid together with the magazine 2 from the loading completion position shown by the solid line in FIG. 55 to the position shown by the solid line in FIG. 54 by the coil spring 181 in the direction shown by arrow b.

When the driven cam surface 180 of the third ejection arm 167 is thus pushed by the cam projection 179 of the slide cam 178 in the direction shown by arrow b, the third ejection arm 167 is rotated around the fulcrum shaft 168 against the coil spring 170 in the direction shown by arrow r by the cam action of the driven cam surface 180. The third ejection arm 167 is separated from the magazine 2 in the direction shown by arrow r, and retracted to the retract position, which is shown by the solid line in FIG. 54, outside the magazine insertion space 13.

The pinion 175 is then normally rotated again by the geared motor 174 of the rack and pinion mechanism 176 to return the slider 166 to the standby position $P_{61}$ shown in FIG. 52 through the rack 173 in the direction shown by arrow b. The other optical sensor 195 is operated (ON→OFF) by the end of the other optical shutter plate 192 on the side of the point of arrow b to stop the geared motor 174. At the same time, the cam drive pin 189 is separated from the cam surface 190 of the magazine locking lever 185 in the direction shown by arrow b, and the locking claw 186 of the magazine locking lever 185 is again projected into the magazine insertion space 13 in the direction shown by arrow t by the coil spring 188.

[Description of the Cartridge Loading Mechanism of the Drive]

The cartridge loading mechanism 57 provided in the drive 14 is described below with reference to FIGS. 57 through 60.

Figure 57:
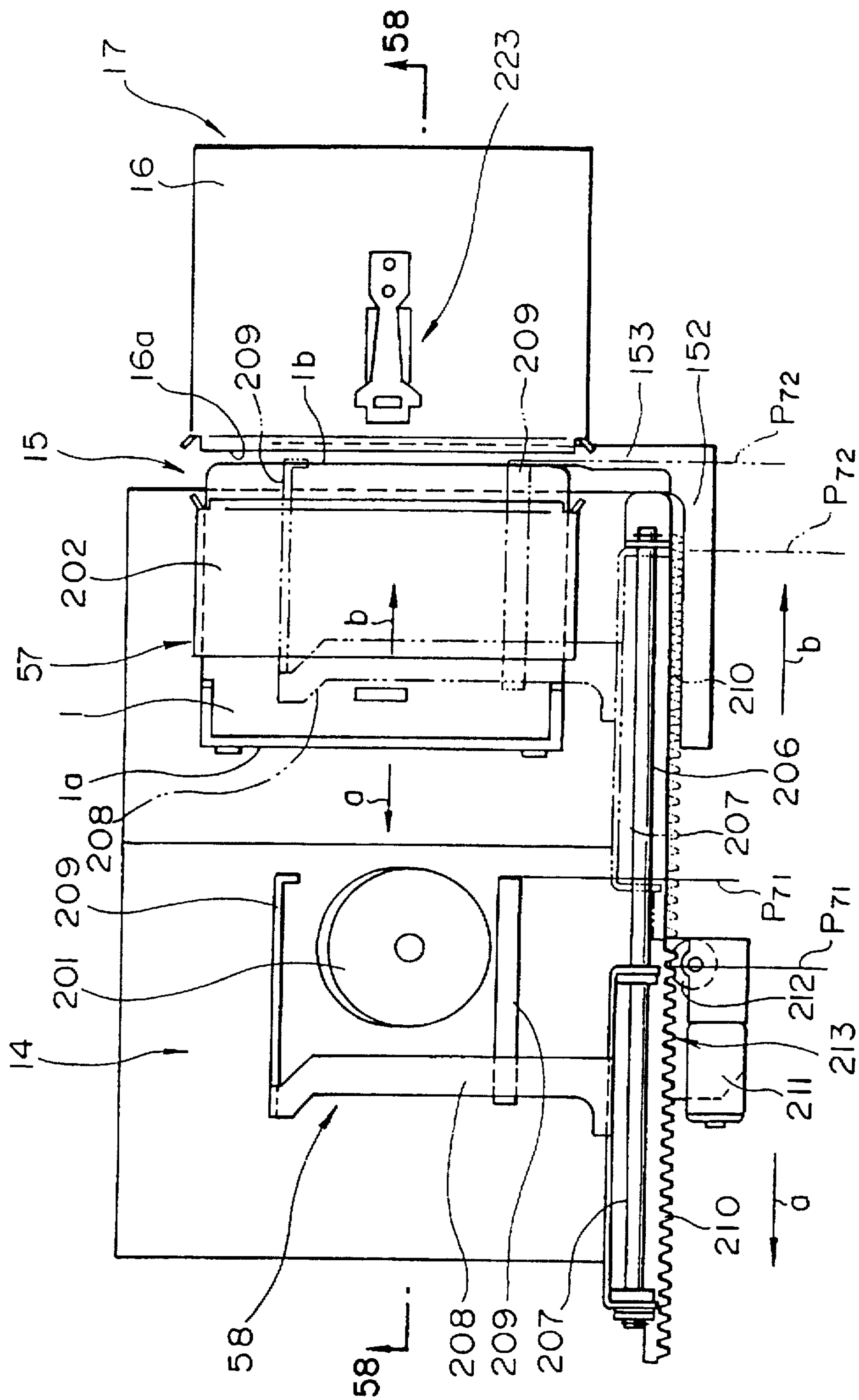
FIG. 57 is a schematic plan view illustrating a cartridge loading mechanism and a cartridge ejecting mechanism in a drive.
Figure 58:
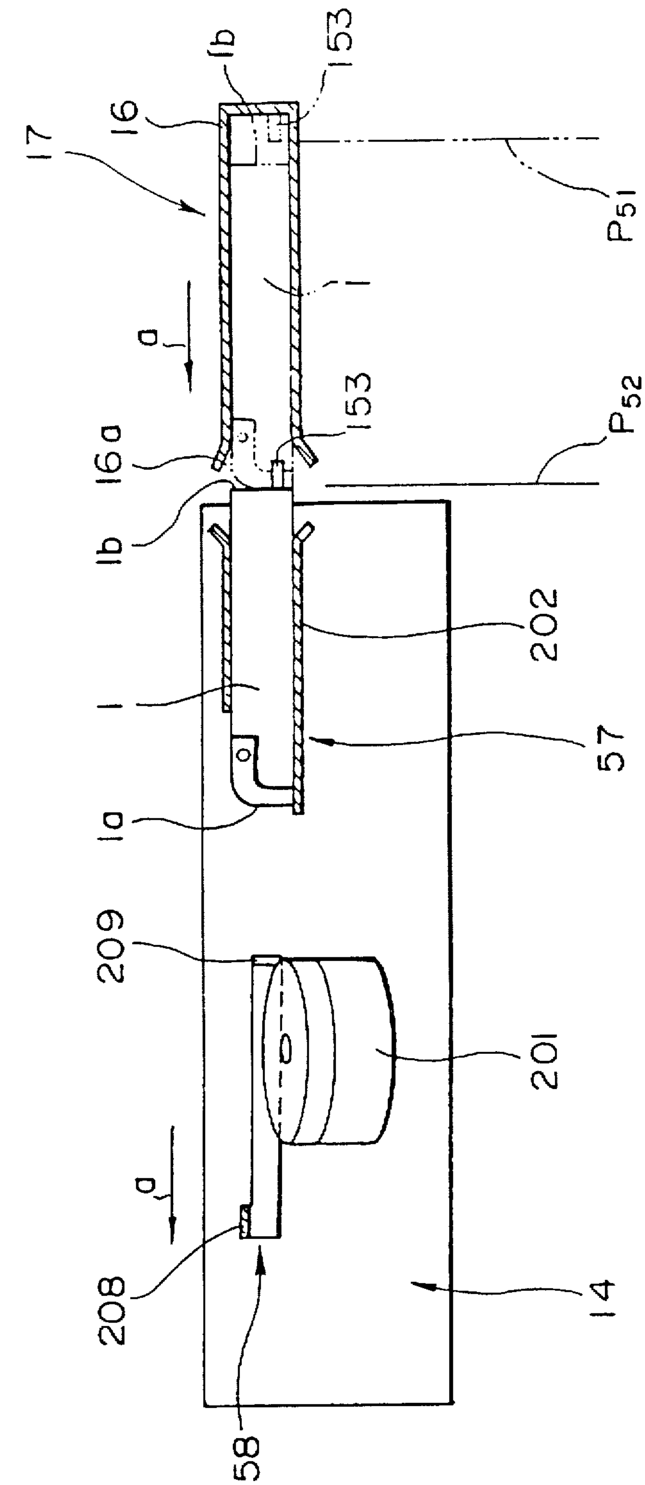
FIG. 58 is a schematic sectional side view taken along line N—N of FIG. 57.
Figure 59:
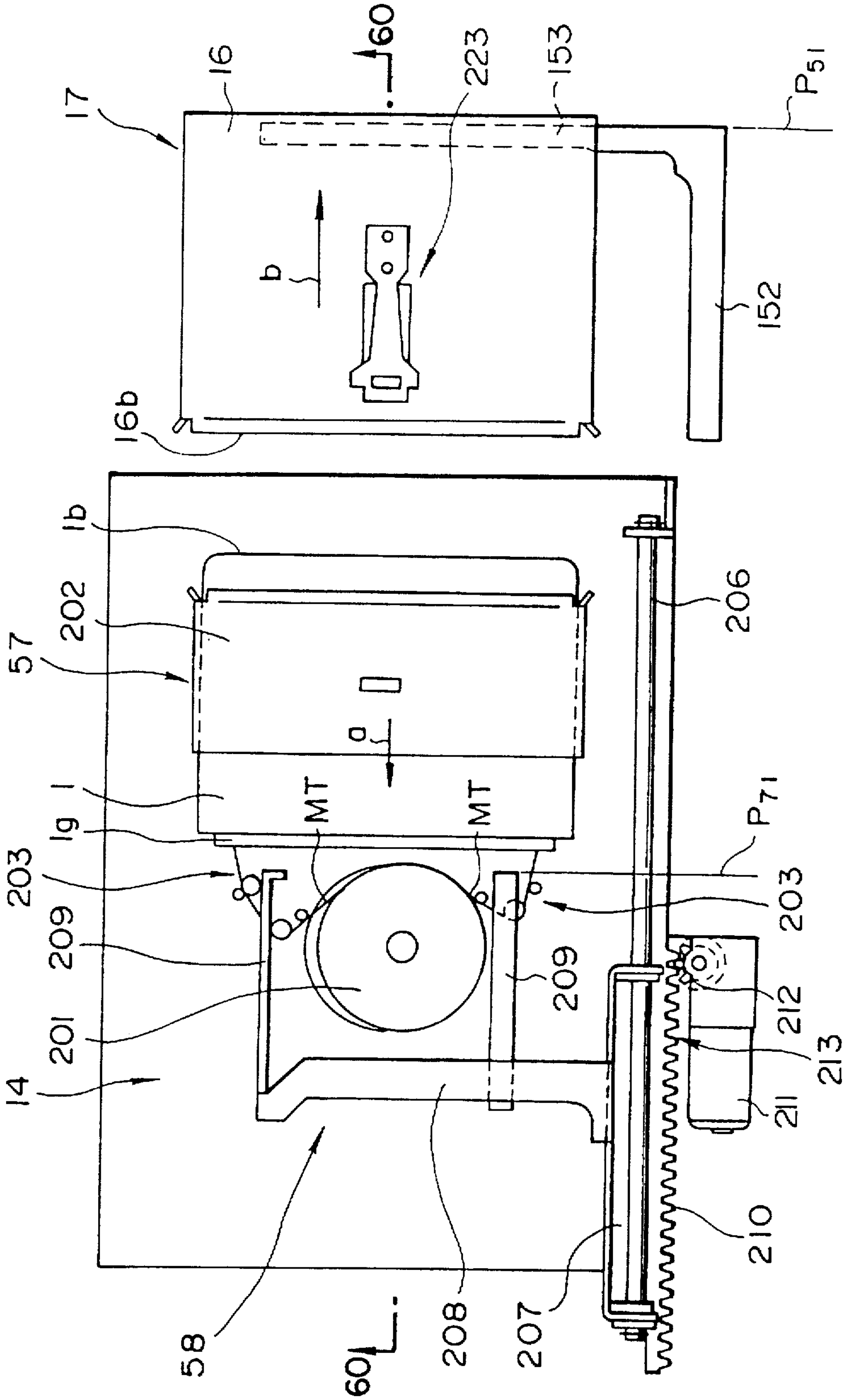
FIG. 59 is a schematic plan view illustrating the state wherein a tape cartridge is completely loaded in a drive, and a magnetic tape is completely loaded.
Figure 60:
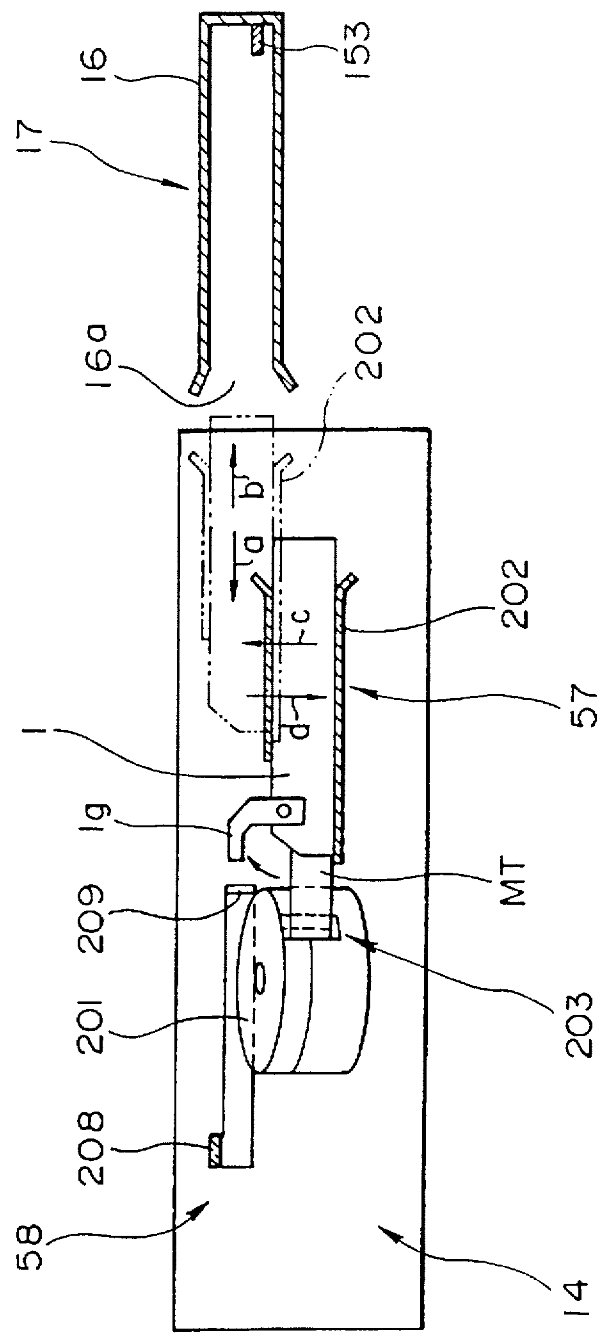
FIG. 60 is a schematic sectional side view taken along line O—O of FIG. 59.

The drive 14 comprises a magnetic recording/reproducing device in a helical scanning system, and is provided with a rotating drum head 201 for magnetically recording and reproducing data on and from magnetic tapes MT in the tape cartridges 1. As shown in FIGS. 57 and 58, the tape cartridge 1 which is horizontally ejected, by the second cartridge ejecting mechanism 55, from the cartridge tray 16 into the cartridge port 15 in the direction shown by arrow a, is horizontally inserted into the cartridge holder 202 of the cartridge loading mechanism 57 in the direction shown by arrow a.

The tape cartridge 1 is then horizontally drawn, by the cartridge holder 202, to a position in the drive 14 near the rotating head drum 201 in the direction shown by arrow a, and vertically moved downward in the direction shown by arrow d to be loaded.

When the tape cartridge 1 is loaded, the movable cover 1*g* of the tape cartridge 1 is opened, and the magnetic tape MT in the tape cartridge 1 is the pulled out by a tape loading mechanism 203, and helically wound on the outer periphery of the rotating head drum 201 to be loaded. The data is recorded or reproduced on or from the magnetic tape MT by the rotating head drum 201.

After recording or production, the magnetic tape MT is unloaded into the tape cartridge 1 by the tape loading mechanism 203, and the tape cartridge 1 is then moved, by the cartridge holder 202 of the cartridge loading mechanism 57, to the cartridge port 15 shown in FIGS. 57 and 58 in the directions shown by arrow c and b. At the same time, the movable cover 1*g* of the tape cartridge 1 is closed. The tape cartridge 1 is then ejected into the cartridge tray 16 by a cartridge ejecting mechanism, which will be described below, in the direction shown by arrow b.

[Description of the Cartridge Ejecting Mechanism in the Drive]

The cartridge ejecting mechanism 58 provided in the drive 14 is described below with reference to FIGS. 24, 57 through 63, 73 and 74.

The upper side of the drive 14 is open. The cartridge ejecting mechanism 58 is horizontally disposed along the upper portion of the drive 14 on the side of the other side chassis 45*b* of the chassis 45, and a guide shaft 206 is horizontally provided on the side chassis 45*b* in parallel with the magazine 2. A slider 207 serving as a slide driving member is provided along the guide shaft 206 so as to be slidable in the directions shown by arrows a and b.

A driving arm 208 which is set at right angles with the direction of sliding of the slider 207*b*, i.e., the directions shown by arrows a and b, is horizontally disposed at a height larger than the rotating head drum 201. An end of the driving arm 208 is fixed to the slider 207. A pair of left and right ejection arms 209, which are integrally formed on the lower portion of the driving arm 208 at a distance therebetween, are horizontally extended from the driving arm 208 in parallel with the slider 207 in the direction shown by arrows b. The pair of left and right ejection arms 109 are set at the same height as the cartridge port 15 on the both sides of the rotating head drum 201.

A driving mechanism for sliding the slider 207 in the directions shown by arrows a and b comprises a rack and pinion mechanism comprising a rack 210 which is horizontally formed along the side of the slider 207, and a pinion 212 which is rotated by a geared motor 211 to drive the rack 210. The geared motor 211 is provided on the side chassis 45*b* by a mounting plate 214. A guided plate 215 which is extended downward from the slider 207 is guided by a guide plate 216 provided on the side chassis 45*b* in the directions shown by arrows a and b.

Figure 61:
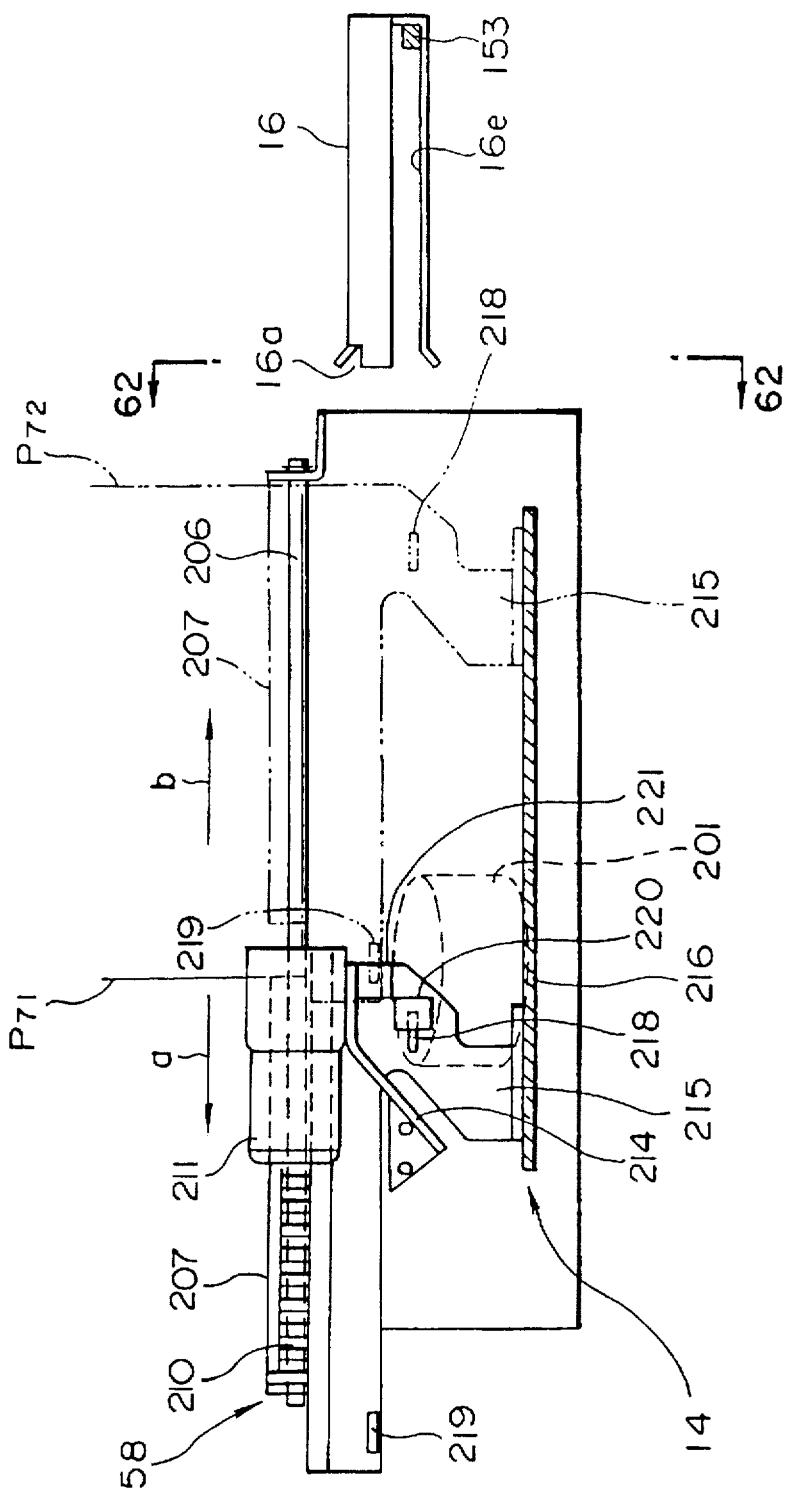
FIG. 61 is a side view illustrating the standby state of a cartridge ejecting mechanism.
Figure 62:
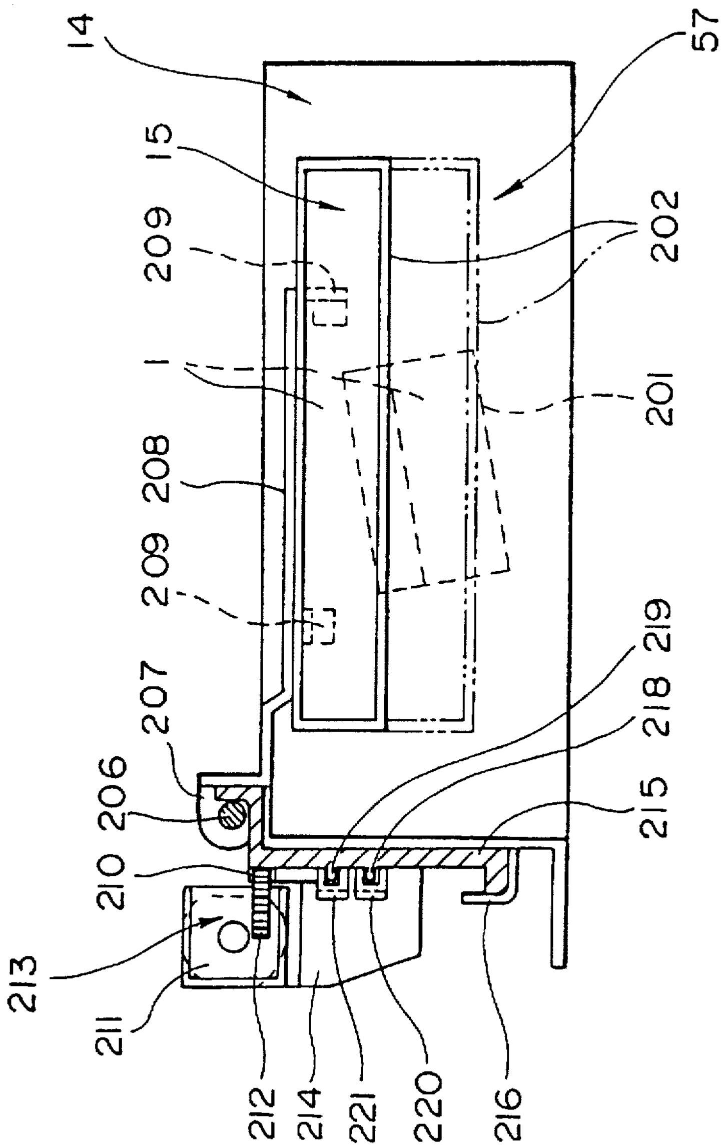
FIG. 62 is a partly broken-away side view taken along line P—P of FIG. 61.

As shown in FIGS. 61 and 62, a pair of upper and lower optical sensors 220 and 221 serving as photointerrupters are turned on and off by upper and lower horizontal optical shutter plates 218 and 219, respectively, are integrally formed on the side of the slider 207, and are provided on the side chassis 45*b*. The optical sensor 220 serves as a sensor for setting the pair of the left and right ejection arms 209 at the standby position. The other optical sensor 221 serves as a sensor for preventing overrunning of the pair of the left and right ejection arms 209 in the direction shown by arrow b.

[Setting the Ejection Arms at the Standby Position]

When the power supply for the auto-loader 11 is turned on, the pinion 212 is reversely rotated by the geared motor 211 of the rack and pinion mechanism 213 to drive the rack 210 in the direction shown by arrow a, and move, together with the slider 207, the driving arm 208 and the pair of the left and right ejection arms 209 to the standby position $P_{71}$ shown in FIGS. 57 through 61 in the direction shown by arrow b. The optical sensor 220 is operated (OFF→ON) by the optical shutter plate 218 to stop the geared motor 211.

In this standby state, since the pair of the left and right ejection arms 209 are sufficiently separated from the cartridge loading mechanism 57 and the tape loading mechanism 203 in the directions shown by arrows a and c, respectively, the pair of the left and right ejection arms 209 do not interfere with the operations of loading and ejecting the tape cartridge 1 and the operations of loading and unloading the magnetic tape MT.

[Operation of Ejecting the Tape Cartridge into the Cartridge Tray from the Drive]

After recording or reproducing, the tape cartridge 1 is the ejected into the cartridge port 15 by the tape cartridge loading mechanism 57. The pinion 212 is then normally rotated by the geared motor 211 of the rack and pinion mechanism 213 to drive the rack 210 on the basis of the command signal from the computer to eject the cartridge. The slider 207 is thus slid from the standby position $P_{71}$ shown by a solid line in FIGS. 57 and 61 to the eject position $P_{72}$ shown by a one-dot-chain line along the guide shaft 206 in the direction shown by arrows b.

Figure 63:
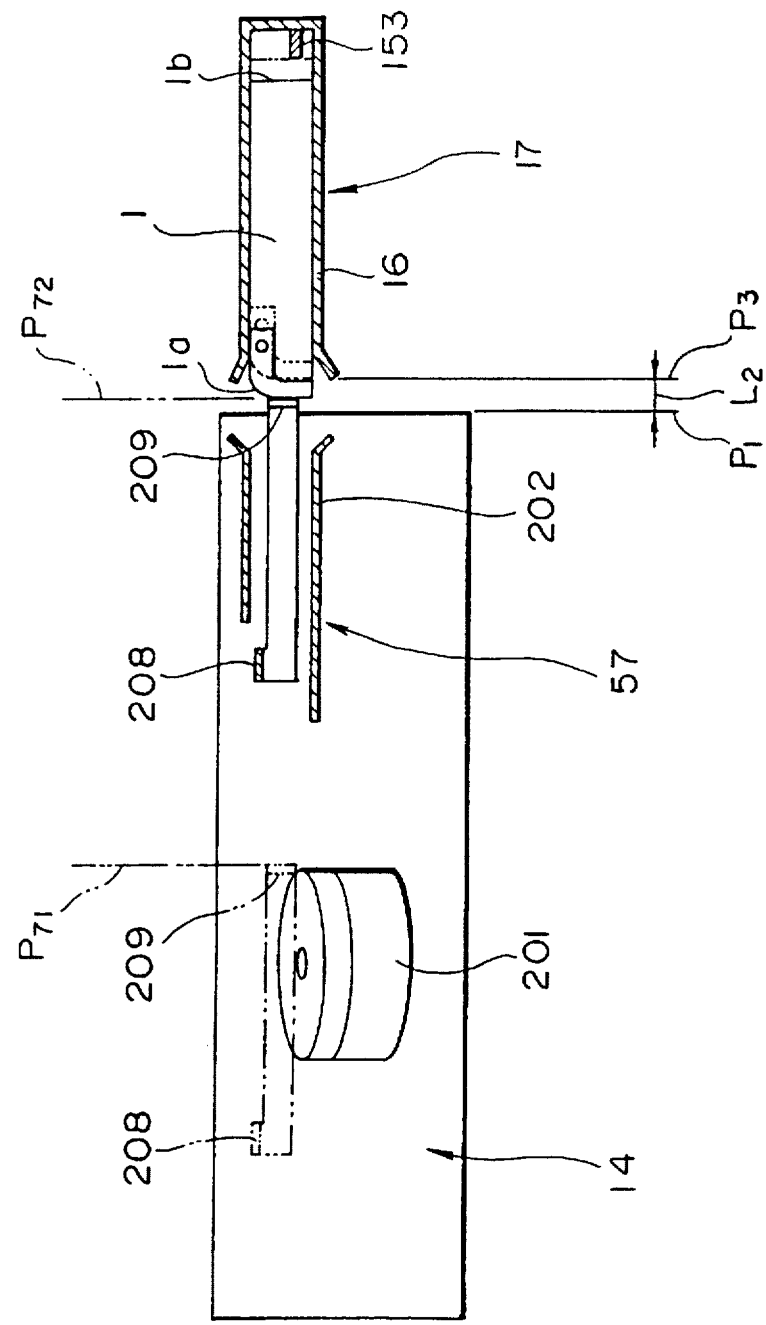
FIG. 63 is a schematic sectional side view illustrating the operation of ejecting a tape cartridge into a cartridge tray from a cartridge port by a cartridge ejection arm of a cartridge ejecting mechanism.

As a result, the pair of the left and right ejection arms 209 are horizontally moved together with the slider 207, by the driving arm 208, to the eject position in the direction shown by arrows b as shown by a one-dot-chain line in FIGS. 57 and FIG. 63. At this time, the driving arm 208 passes through the upper portion of the rotating head drum 201. The pair of the left and right ejection arms 209 pass by both sides of the rotating head drum 201.

The pair of the left and right ejection arms 209 are moved into the cartridge holder 202 in the direction shown by arrows b so that the ends of the ejection arms 209 horizontally push the front end 1*a* of the tape cartridge 1 in the cartridge holder 202 in the direction shown by arrows b. The tape cartridge 1 is thus horizontally pushed out from the cartridge port 15 into the cartridge tray 16 in the direction shown by arrows b.

At this time, when the front end 1*a* of the tape cartridge 1 which is pushed into the cartridge tray 16 is ejected to the position at a distance $L_2$ from the reference position $P^1$ in the direction shown by arrows b and reaches the second ejection position P3, as described above with reference to FIG. 10, the geared motor 211 of the rack and pinion mechanism 213 is stopped on the basis of detection output from the cartridge ejection position detecting sensor in the cartridge tray 16, which will be described below. The driving arm 208 and the pair of the left and right ejection arms 209 are stopped at the eject position.

When no detection output is obtained from the cartridge ejection position detecting sensor, the other optical sensor 221 is operated (ON→OFF) by the other optical shutter plate 219 to stop the geared motor 211, thereby preventing overrunning of the driving arm 208 and the pair of the left and right ejection arms 209 in the direction shown by arrow b.

The pinion 212 is then reversely rotated by the geared motor 211 of the rack and pinion mechanism 213 to drive the rack 210 in the direction shown by arrow a, and return the driving arm 208 and the pair of the left and right ejection arms 209 together with the slider 207 to the standby position $P_{71}$ shown in FIGS. 57 through 60 in the direction shown by arrow b.

[Cartridge Positioning Mechanism in the Cartridge Tray]

The cartridge positioning mechanism 59 for positioning the tape cartridge 1, which is ejected into the cartridge tray 16 from the magazine 2 and the drive 14, in two steps in the cartridge tray 16 is described below with reference to FIGS. 31, 34, 64 and 65.

A horizontal positioning roller 224 serving as a mechanism for positioning the tape cartridge 1 is disposed at the substantially central portion of the top plate 16*b* of the cartridge tray 16 near the opening 16*a*. The positioning roller 224 is rotatably provided at the front end of a plate spring 225 on the side of the point of arrow a, which has the rear end fixed to the top plate 16*b* on the side of the point of arrow b, so that the positioning roller 224 can vertically be moved in and out of the upper portion of the cartridge tray 16 through the opening 226 formed in the top plate 16*b*.

The cartridge ejection position detecting lever 227 and the cartridge ejection position detecting sensor 228, which comprise a mechanism for detecting the position of ejection of the tape cartridge 1 into the cartridge tray 16 in the direction shown by arrows b, are provided below the rear end side of the bottom plate 16*c* of the cartridge tray 16, i.e., on the side of the point of arrow b, at the substantially central portion thereof. The cartridge ejection position detecting lever 227 is mounted on the tray elevator 84 through the horizontal fulcrum shaft 229 so as to be vertically rotatable in the directions shown by arrows v and w. A detection portion 227*a* which is integrally formed at the upper end of the cartridge ejection position detecting lever 227 is inserted into the cartridge holder 16 through the opening 230 formed in the bottom plate 16*c*.

The cartridge ejection position detecting sensor 228 is provided on the lower side of a sensor base 231 which is horizontally mounted to the lower side of the tray elevator 84, and comprises an optical sensor serving as a photointerrupter. A pair of optical shutter plates 232 and 233 are integrally formed at an end of a circular arm 227*b* which is integrally formed in the lower portion of the cartridge ejection position detecting lever 227 at a distance therebetween in the direction of rotation of the circular arm 227, i.e., in the directions shown by arrows v and w. The circular arm 227 is inserted into a portion below the sensor base 231 through the opening 234 formed in the tray elevator 84 and the sensor base 231. The cartridge ejection position detecting lever 227 is urged to rotate in the direction shown by arrow v by a coil spring 235 so as to be stopped at the position shown by a one-dot-chain line in FIG. 64.

[Operation of Positioning the Tape Cartridge at the First Ejection Position in the Cartridge Tray]

In ejection of the tape cartridge 1 into the cartridge tray 16 from the cartridge ejection port 6 of the magazine 2 in the direction shown by arrow b by the first ejection arm 136 of the first cartridge extruding mechanism 54, as described above with reference to FIGS. 10 and 47, when the front end 1*a* of the tape cartridge 1 is displaced in one step to the position at a distance $L_1$ from the reference position $P_1$ and reaches the first ejection position $P_2$ the first ejection position of the tape cartridge 1 is detected by the cartridge ejection position detecting sensor 228.

Figure 64:
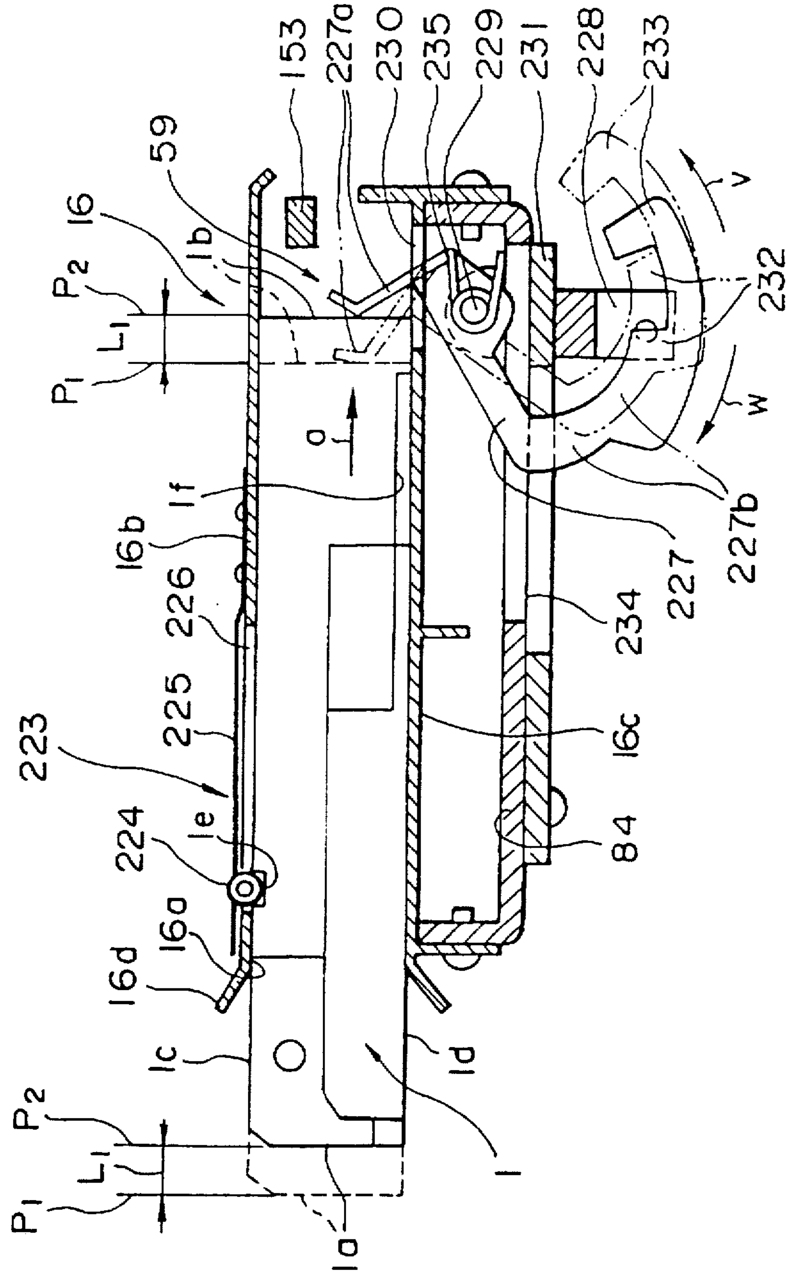
FIG. 64 is an enlarged sectional side view taken along line Q—Q of FIG. 49 and illustrating the operation of detecting a first ejection position of a tape cartridge in a cartridge tray.

At this time, the rear end 1*b* of the tape cartridge 1 contacts the detection portion 227*a* of the cartridge ejection position detecting lever 227, and pushes the detection portion 227*a* to the position shown by a solid line in FIG. 64 in the direction shown by arrow b. As a result, the cartridge ejection position detecting lever 227 is rotated around the fulcrum shaft 229 to the position shown by a solid line in FIG. 64 in the direction shown by arrow w. The cartridge ejection position detecting sensor 228 is operated (OFF→ON) by the optical shutter plate 232 to detect the first ejection position $P_2$ of the tape cartridge 1.

The geared motor 142 of the first cartridge ejecting mechanism 54 is thus stopped on the basis of the detection output from the cartridge ejection position detecting sensor 228, as described above, to stop the first ejection arm 136 at the ejection end position. The ejection stroke of the tape cartridge 1 by the first ejection arm 136 is automatically controlled.

[Operation of Positioning the Tape Cartridge at the Second Ejection Position in the Cartridge Tray]

In the ejection of the tape cartridge 1 into the cartridge tray 16 from the cartridge containment port 7 of the magazine 2 by the third ejection arm 167 of the third cartridge ejecting mechanism 56 in the direction shown by arrow b, as described above with reference to FIGS. 10, 55 and 63, and in the ejection of the tape cartridge 1 into the cartridge tray 16 from the cartridge port 15 of the drive 14 by the pair of the left and right ejection arms 209 of the cartridge ejection mechanism 58 in the direction shown by arrow b, when the front end 1*a* of the tape cartridge 1 is displaced in two steps by the position at a distance $L_2$ from the reference position $P_1$ in the direction shown by arrow b, the second ejection position $P_3$ of the tape cartridge 1 is detected by the cartridge ejection position detecting sensor 228.

Figure 65:
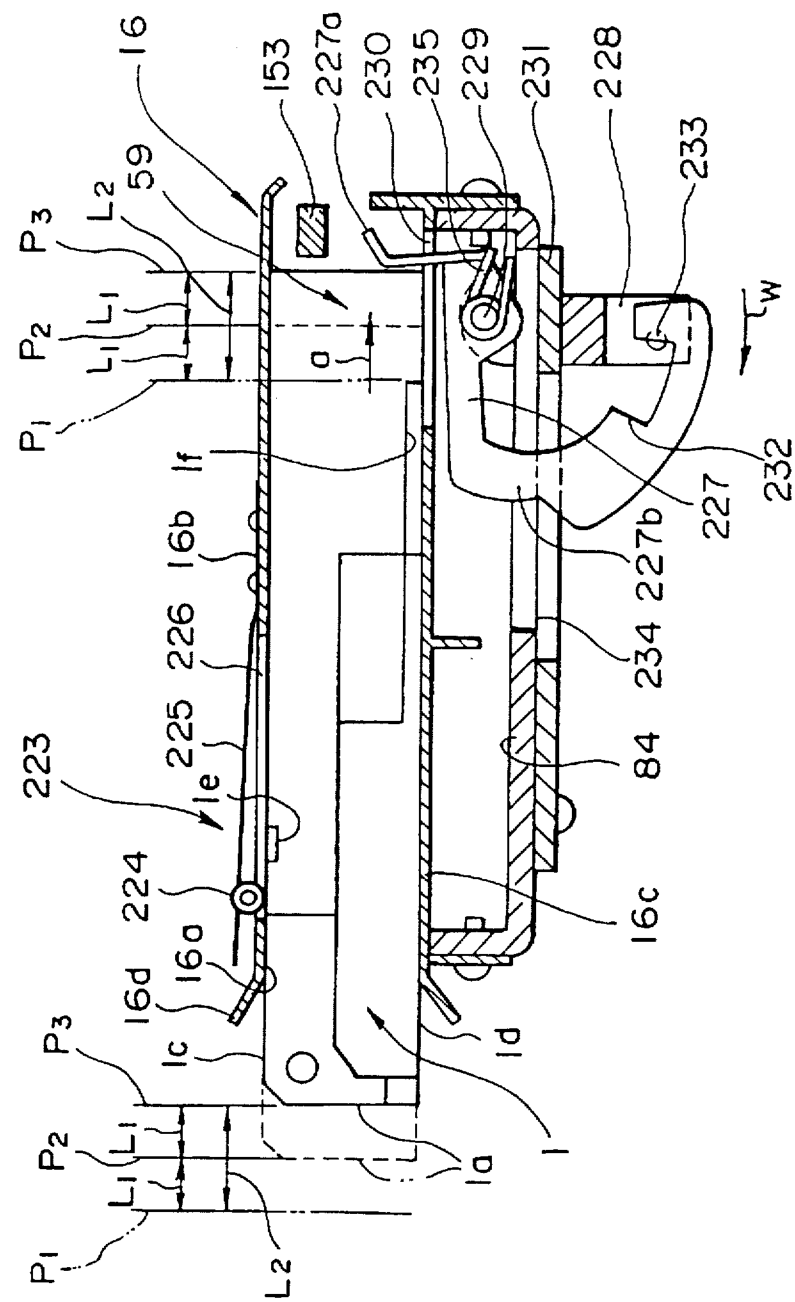
FIG. 65 is an enlarged sectional side view taken along line Q—Q of FIG. 49 and illustrating the operation of detecting a second ejection position of a tape cartridge in a cartridge tray.

Namely, at this time, the rear end 1*b* of the tape cartridge 1 contacts the detection portion 227*a* of the cartridge ejecting lever 227, as shown in FIG. 65, and pushes the detection portion 227*a* to the position shown in FIG. 65 in the direction shown by arrow 12. The cartridge ejection position detecting lever 227 is rotated around the fulcrum shaft 229 to the position shown in FIG. 65 in the direction shown by arrow w so that the cartridge ejection position detecting sensor 228 is operated (OFF→OFF) by the two optical shutter plates 232 and 233 to detect the second ejection position of the tape cartridge 1.

The geared motors 174 and 211 of the third cartridge ejecting mechanism 56 and the cartridge ejecting mechanism 58 are stopped on the basis of the detection output from the cartridge ejection position detecting sensor 228 to stop the third ejection arm 167 and the pair of the left and right cartridge ejection arms 209, respectively, at the ejection end positions. The ejection stroke of the tape cartridge 1 by the third ejection arm 167 and the cartridge ejection arms 209 is automatically controlled.

At this time, when the tape cartridge 1 is pushed out to the first ejection position $P_2$ in the cartridge tray 16 in the direction shown by arrow b, as shown in FIG. 64, the positioning roller 224 is elastically engaged with the recessed portion 1*e* on the upper surface 1*c* of the tape cartridge 1 by the plate spring 225 to mechanically position the tape cartridge 1 at the first ejection position $P_2$ in the cartridge tray 16.

Alternatively, at this time, when the tape cartridge 1 is pushed to the second ejection position $P_3$ in the cartridge tray 16 in the direction shown by arrow b, as shown in FIG. 65, the positioning roller 224 may elastically be engaged with the recessed portion 1*e* of the tape cartridge 1 to mechanically position the tape cartridge 1 at the second ejection position $P_3$ in the cartridge tray 16.

[Description of the Mechanism for Detecting Error in the Insertion of the Tape Cartridge]

The insertion error detecting mechanism 238 for the tape cartridge 1, which is provided on the cartridge tray 16, is described below with reference to FIG. 66.

The insertion error detecting lever 239 comprising a mechanism for detecting insertion error of the tape cartridge 1 is mounted below the rear end side of the bottom plate 16*c* of the cartridge tray 16 on the side of the point of arrow b at the central portion thereof. The insertion error detecting lever 239 is mounted on the upper side of the tray elevator 84 through a horizontal fulcrum shaft 240 so as to be rotatable in the directions shown by arrows x and y. A detection portion 239*a* is integrally formed at the upper end thereof being inserted into the cartridge tray 16 through the opening 241 formed in the bottom 16*c*.

An optical sensor 243 serving as a photointerrupter which is turned on and off by the optical shutter plate 242 extended rearward downward from the lower end of the insertion error detecting lever 239 and which comprises means for detecting error in the insertion of the tape cartridge 1 is provided on the lower side of the sensor base 231. A lower half of the insertion error detecting lever 239 is inserted into the opening 244 formed in the tray elevator 84 and the sensor base 231, and the insertion error detecting lever 239 is urged to rotate, by the coil spring 245, to a position shown by a solid line in FIG. 66 in the direction shown by arrow x.

[Operation of Detecting Error in the Insertion of the Tape Cartridge]

When the tape cartridge 1 is inserted into the cartridge insertion port 5, the cartridge ejection port 6 and the cartridge containment port 7 of the magazine 2 in the direction shown by arrow a and set therein, as described above with reference to FIG. 13, the tape cartridge 1 must be correctly inserted and set in both the longitudinal and lateral directions thereof.

At this time, when the tape cartridge 1 is inserted and set in the magazine 2 in error in one of the longitudinal and vertical directions, as described above, an error in the insertion of the tape cartridge 1 can be detected by the insertion error detecting mechanism 238 when the magazine 2 is set in the auto-loader 11, and when the tape cartridge 1 is pushed into the cartridge tray 16 from the cartridge ejection port 6 or the cartridge containment port 7 of the magazine 2 in the direction shown by arrow b.

Figure 66:
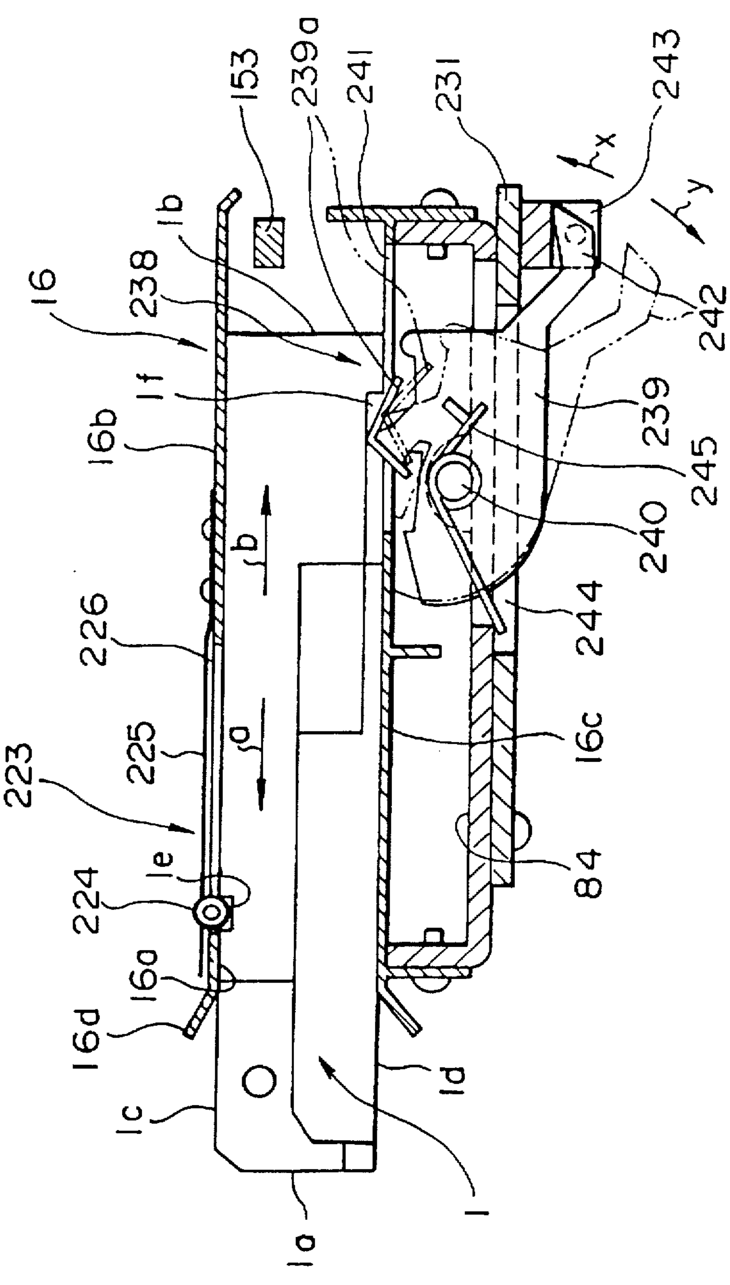
FIG. 66 is an enlarged sectional side view taken along line R—R of FIG. 49 and illustrating the operation of detecting an insertion error of a tape cartridge in a cartridge tray.

FIG. 66 shows the case where the tape cartridge 1 inserted into the magazine 2 in the correct direction is pushed into the cartridge tray 16 in the direction shown by arrow b. At this time, the detection portion 239*a* of the insertion error detecting lever 239 enters the recessed portion 1*f* formed in the bottom side 1*d* of the tape cartridge 1 in the direction shown by arrow x.

Therefore, at this time, the insertion error detecting lever 239 is rotated to the position shown by the solid line in FIG. 66 by the coil spring 245 in the direction shown by arrow x, and the optical sensor 243 is operated (OFF→ON→OFF) by the optical shutter plate 242 to detect that the tape cartridge 1 is correctly set in both the longitudinal and vertical directions.

On the other hand, when the tape cartridge 1 is reversed in the longitudinal direction, the front and rear ends 1*a* and 1*b* of the tape cartridge 1 which is inserted into the cartridge tray 16 in the direction shown by arrow b are reversed. The recessed portion 1*f* of the bottom side 1*d* is thus deviated from the detection portion 239*a* in the forward direction, i.e., in the direction shown by arrow a. When the tape cartridge 1 is reversed in the vertical direction, the upper and lower sides 1*c* and 1*d* of the tape cartridge 1 which is inserted into the cartridge tray 16 in the direction shown by arrow b are reversed. The recessed portions 1*f* and 1*c* of the bottom side 1*d* and the upper side 1*c* are thus reversed, thereby deviating the recessed portion 1*f* upward in the direction shown by arrow c from the detection portion 239*a*.

In any state in which the tape cartridge 1 inserted is in error in the longitudinal or vertical direction, the detection portion 239*a* cannot be inserted into the recessed portion 1*f*, and the detection portion 239*a* is pushed down in the direction shown by arrow d by the bottom side 1*d* or the upper side 1*c* of the tape cartridge 1, as shown by a one-dot-chain line in FIG. 66.

At this time, the insertion error detecting lever 239 is thus rotated to the position shown by a one-dot-chain line in FIG. 66 against the coil spring 245, in the direction shown by arrow y so that the optical sensor 243 is operated OFF - ON by the optical shutter plate 242. The insertion error of the tape cartridge 1 can thus be detected.

A sequence is included so that when the insertion error of the tape cartridge 1 is detected by the optical sensor 243, the tape cartridge 1 is immediately returned into the magazine 2 from the cartridge tray 16, and the magazine 2 is immediately ejected from the magazine insertion port 19.

[Description of a Mechanism for Automatically Pushing the Tape Cartridge in the Magazine]

The cartridge auto-pushing mechanism for automatically pushing the tape cartridge 1, which projects in error from the magazine 2 in the direction shown by arrow b, into the magazine 2 in the direction shown by arrow a is described below with reference to FIGS. 25 through 30, 36 through 45 and 67 through 70.

When the total of eight tape cartridges 1 are inserted into the magazine 2 in the normal direction and correctly set therein, as described above with reference to FIGS. 13 and 17, the tape cartridges 1 are positioned by the cartridge positioning mechanism 29 at the total of four positions including the positions in the cartridge insertion port 5, the cartridge ejection port 6, and the cartridge containment port 7 and the lower position of the hollow portion 4.

Figure 67:
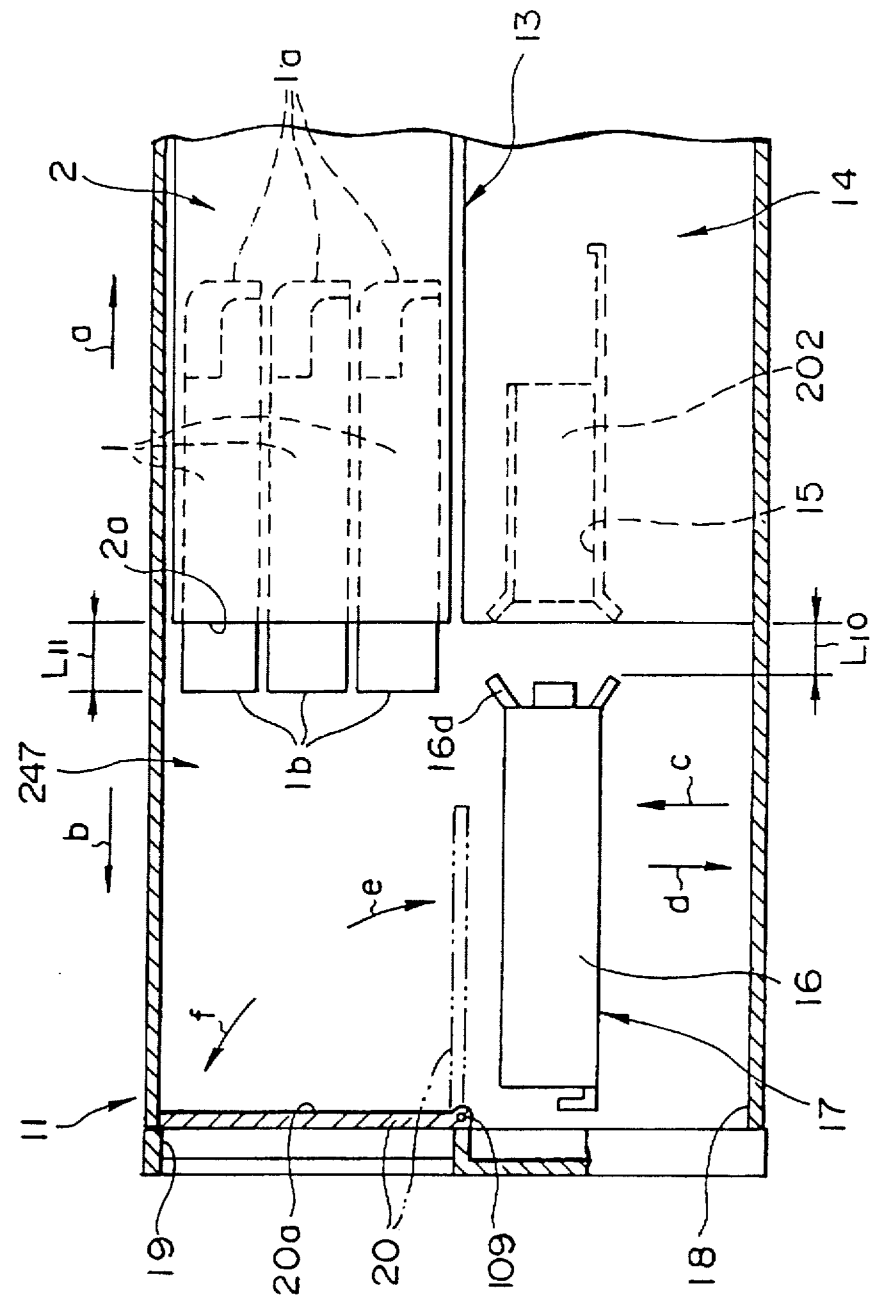
FIG. 67 is a partly broken-away side view illustrating projection of a tape cartridge from a magazine which is loaded in an auto-loader.

However, when the tape cartridges 1 are not inserted sufficiently or in error into the cartridge insertion port, the cartridge ejection port 6 and the cartridge containment port 7 of the magazine 2, and the lower position of the hollow portion 4, the tape cartridge 1 sometimes projects in error from the side 2*a* of the magazine 2 in the direction shown by arrow b opposite to the loading direction, as shown in FIG. 67, as a reaction of auto-loading of the magazine 2 into the auto-loader 11 from the magazine insertion port 15 in the direction shown by arrow a, as described above with reference to FIG. 1.

At this time, if the tape cartridge 1 projects from the side 2*a* of the magazine 2 in the direction shown by arrow a to a position at distance $L_{11}$ larger than the distance $L_{10}$ between the side 2*a* of the magazine 2 and the front edge 16*d* of the cartridge tray 16, when the cartridge tray 16 is moved upward from the drive position in the direction shown by arrow c, the lower side of the tape cartridge 1 projecting contacts the front edge 16*d* of the cartridge tray 16 and thus interferes with the upward movement of the cartridge tray 16, thereby causing an inoperable state.

The cartridge auto-pushing mechanism 247 is capable of automatically pushing the tape cartridge 1, which projects in error from the side 2*a* of the magazine 2, into the magazine 2.

Figure 69:
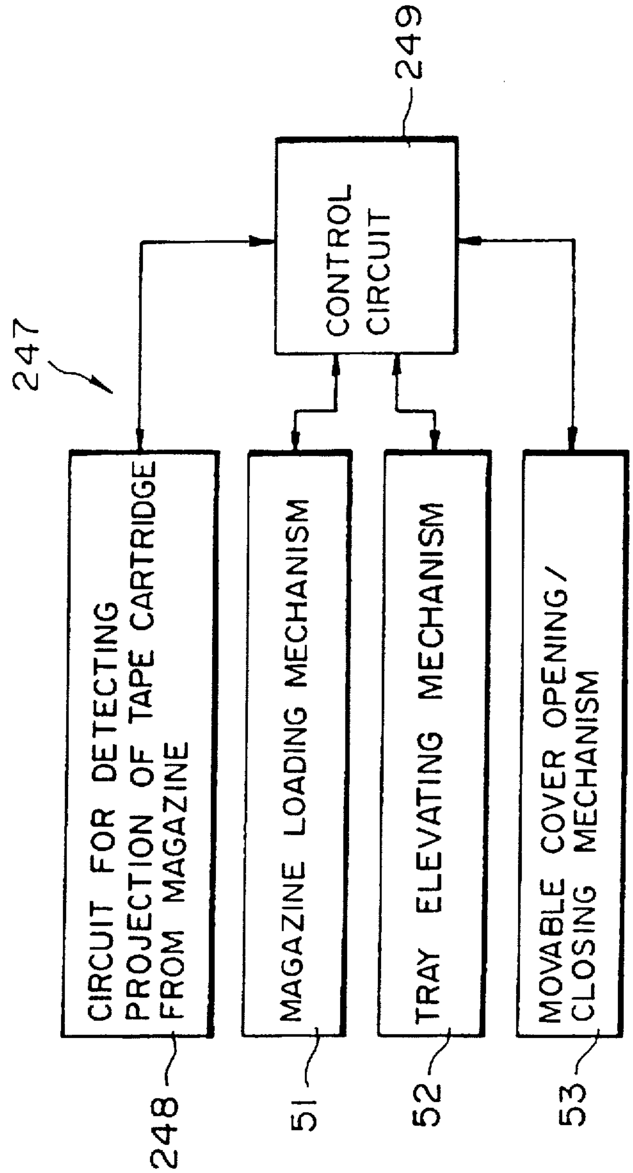
FIG. 69 is a block diagram illustrating a control circuit for automatically pushing a tape cartridge, which projects from a magazine, into the magazine.

The cartridge auto-pushing mechanism 247 comprises a cartridge projection detecting circuit 248 for detecting projection of the tape cartridge 1 from the magazine 2, and a control circuit 249, as shown in FIG. 69, so that the magazine loading mechanism 51, the tray elevating mechanism 52 and the movable cover driving mechanism 53 are controlled on the basis of the detection output from the projection detecting circuit 248.

Examples of various methods which can be employed as the cartridge projection detecting circuit 248. Such examples include a method of detecting the tape cartridge 1 projecting from the side 2*a* of the magazine 2 by using an optical sensor or the like, as shown in FIG. 67, and a method of electrically detecting a load which is applied to the geared motor 101 when the cartridge tray 16 moved upward in the direction shown by arrow c by driving the geared motor 101 of the tray elevating mechanism 52 contacts the lower side of the tape cartridge 1 projecting from the side 2*a* of the magazine 2 and is stopped thereby.

[Operation of Automatically Pushing the Tape Cartridge into the Magazine]

Figure 70:
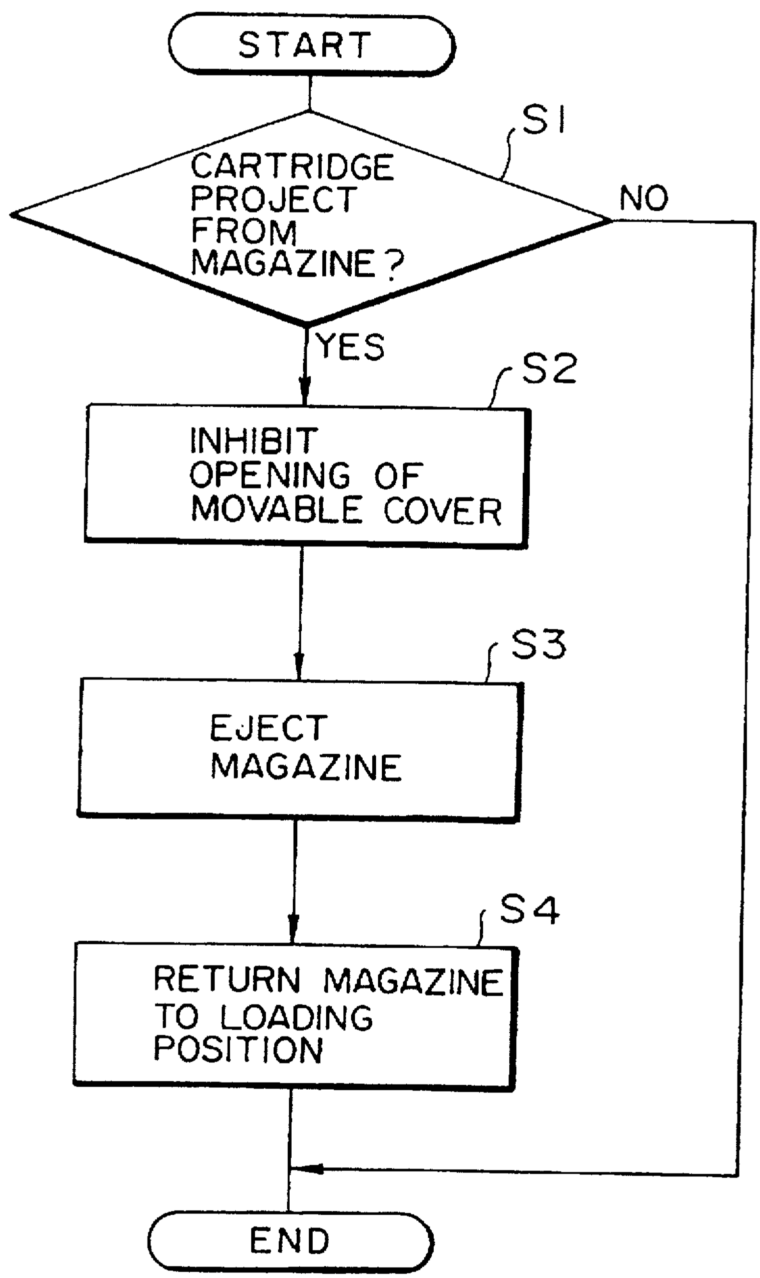
FIG. 70 is a flowchart illustrating the operation of automatically pushing a tape cartridge into a magazine by the control circuit shown in FIG. 69.
Figure 71:
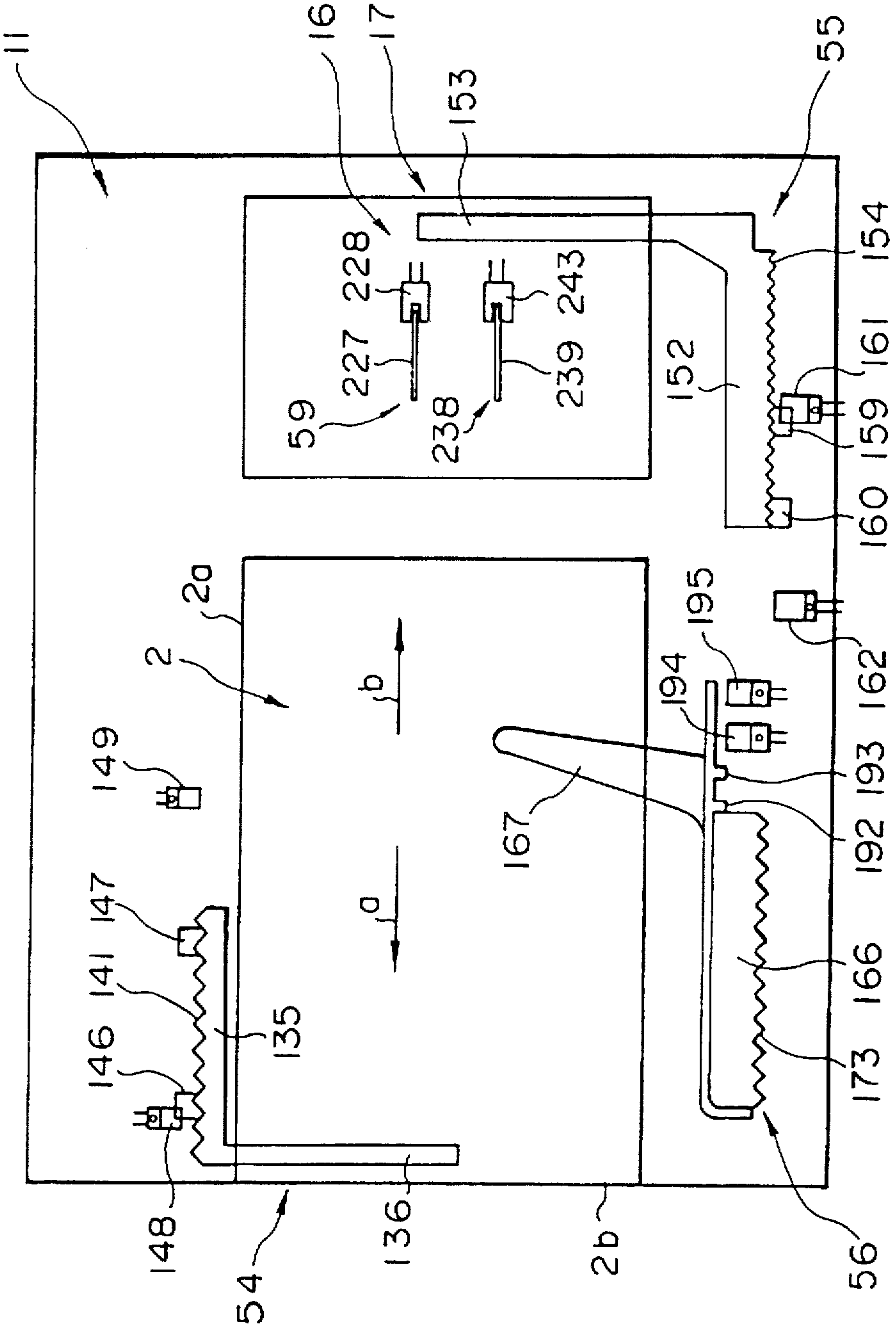
FIG. 71 is a schematic plan view illustrating a plurality of optical sensors in an auto-loader.

The operation of automatically pushing the tape cartridge 1 into the magazine 2 is described below with reference to a flowchart of FIG. 70.

When the cartridge projection detecting circuit 248 detects in Step S1 that the tape cartridge 1 projects from the side 2*a* of the magazine 2 which is automatically loaded in the auto-loader 11, as shown in FIG. 67, the control circuit 249 moves the slide guide plate 91 of the tray elevating mechanism 52 shown in FIGS. 36 through 38 from the initial position $P_{20}$ to the standby position $P_{21}$. The movable cover opening/closing mechanism 53 shown in FIGS. 39 through 45 is inhibited from opening the movable cover 20 in Step S2. The magazine 2 is ejected in the direction shown by arrow b by the magazine loading mechanism 51 shown in FIGS. 25 to 30 in Step S3. After the magazine 2 is brought into contact with the back side 20*a* of the movable cover 20 in Step S4, the magazine 20 is loaded at the loading completion position in the direction shown by arrow a.

Figure 43:
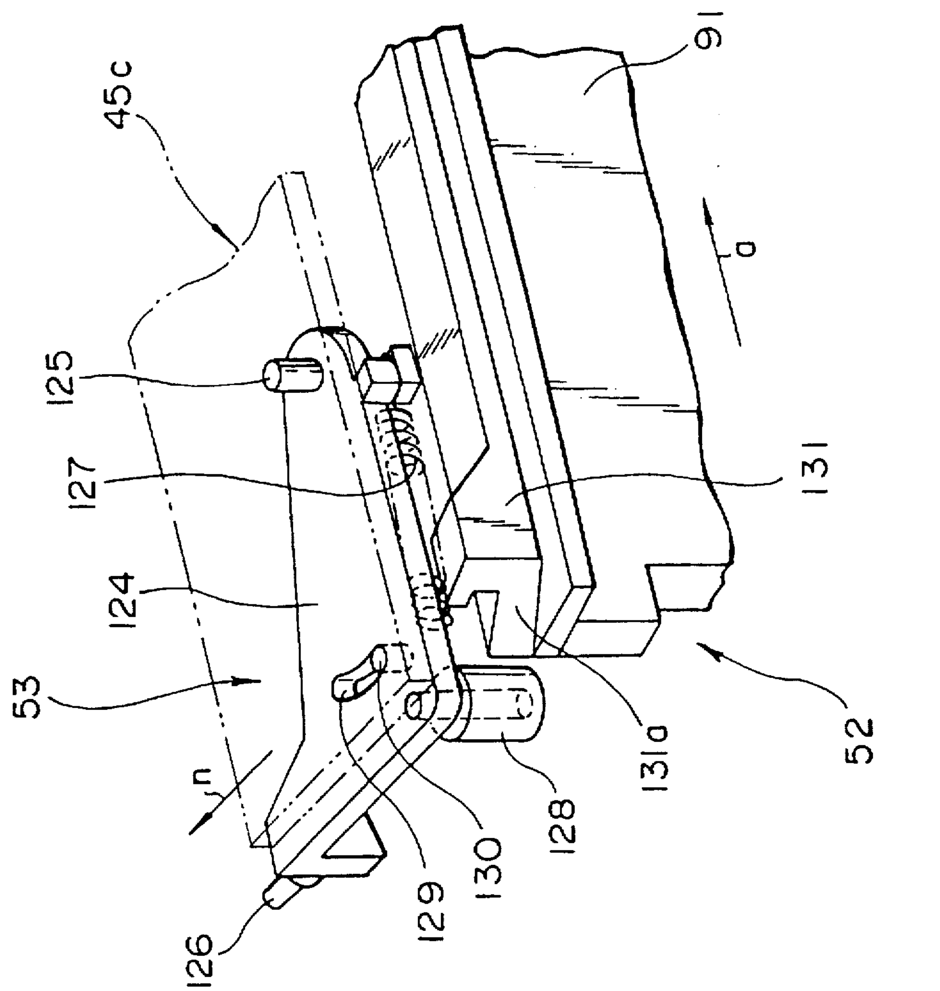
FIG. 43 is a perspective view illustrating a locked state of a movable cover locking lever in a movable cover opening/closing mechanism.

During the operation of inhibiting opening of the movable cover 20, when the slide guide plate 91 is moved from the initial position $P_{20}$ to the standby position $P_{21}$ in the direction shown by arrow a, as described above with reference to FIGS. 36 through 38, with the movable cover driving lever 115 returned to the closed position in the direction shown by arrow m, as shown in FIG. 42, the driven cam roller 128 is separated from the cam inclined surface 131*a* of the roll-formed cam 131, and the movable cover locking lever is rotated in the direction shown by arrow n, as shown in FIG. 43. As a result, the movable cover locking pin 126 is inserted between the engaged piece 112 of the movable cover 20 and the engaging recessed portion 118 of the movable cover driving lever 115 in the direction shown by arrow 11, as shown in FIGS. 39 and 42. The movable cover locking pin 126 thus inhibits the opening of the movable cover 20 in the direction shown by arrow e.

At this time, when the movable cover locking pin 126 is engaged with the engaging recessed portion 118, the movable cover driving lever 115 is locked at the open position shown in FIG. 42 by the movable cover locking pin 126, and the driven cam pin 119 of the movable cover driving lever 115 is held in the lower horizontal path 121*a* of the cam groove 121 of the slider 62 of the magazine loading mechanism 51.

Figure 45:
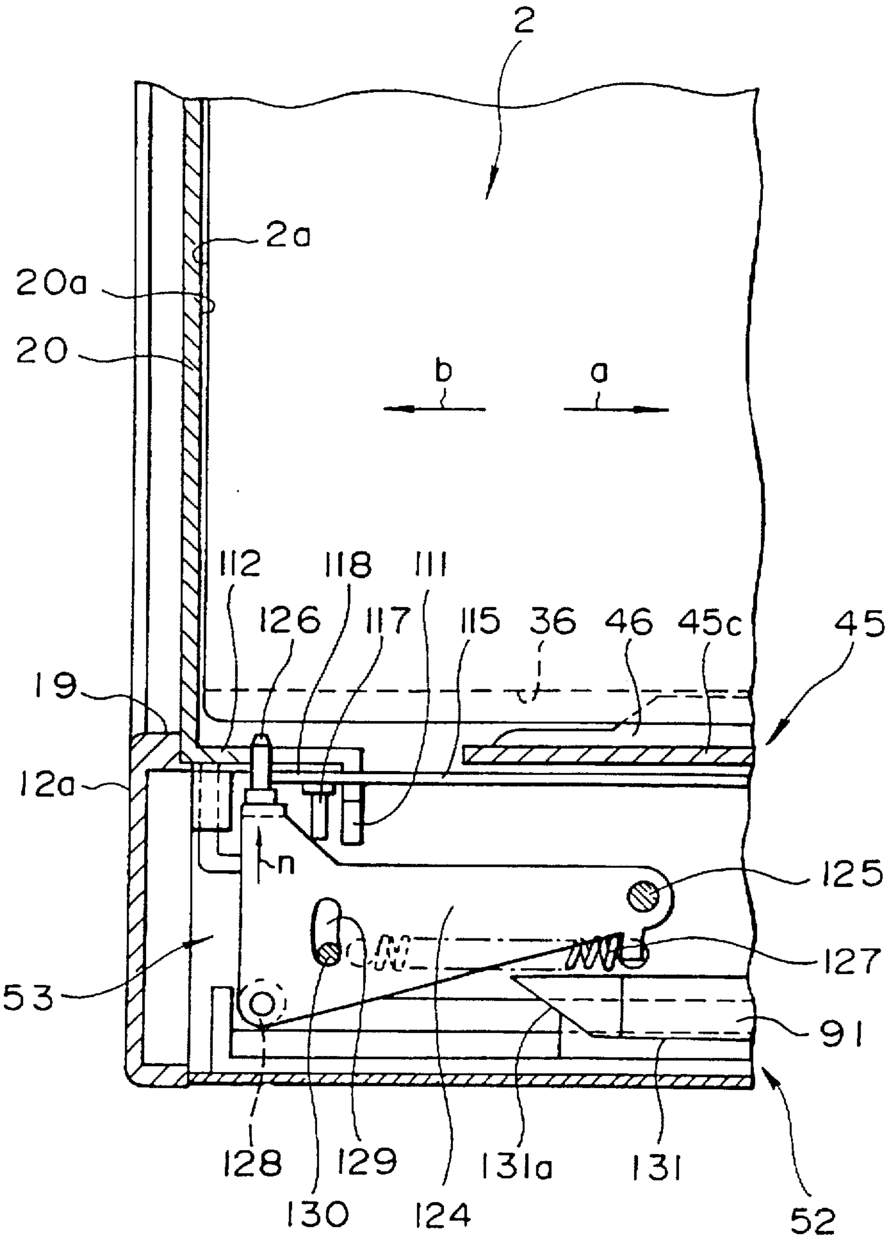
FIG. 45 is a sectional side view illustrating the state wherein a movable cover in a closed state is locked by a movable cover locking mechanism.

The magazine 2 is then ejected in the direction shown by arrow b by the magazine loading mechanism 51, as shown in FIGS. 42 and 45. At this time, unlike normal ejection of the magazine, the driven cam pin 119 is relatively linearly moved in the lower horizontal path 121*a* from the end 121*e* of the lower horizontal path 121*a* to the other end 121*f* thereof in the direction shown by arrow b, without entering the upper horizontal path 121*c* through the inclined path 121*b* of the cam groove 121.

At this time, therefore, the movable cover driving lever 115 is not driven to open the cover in the direction shown by arrow k, and the magazine is ejected in the direction shown by arrow b with the movable cover 20 locked in the close position in the state where opening is inhibited.

Figure 68:
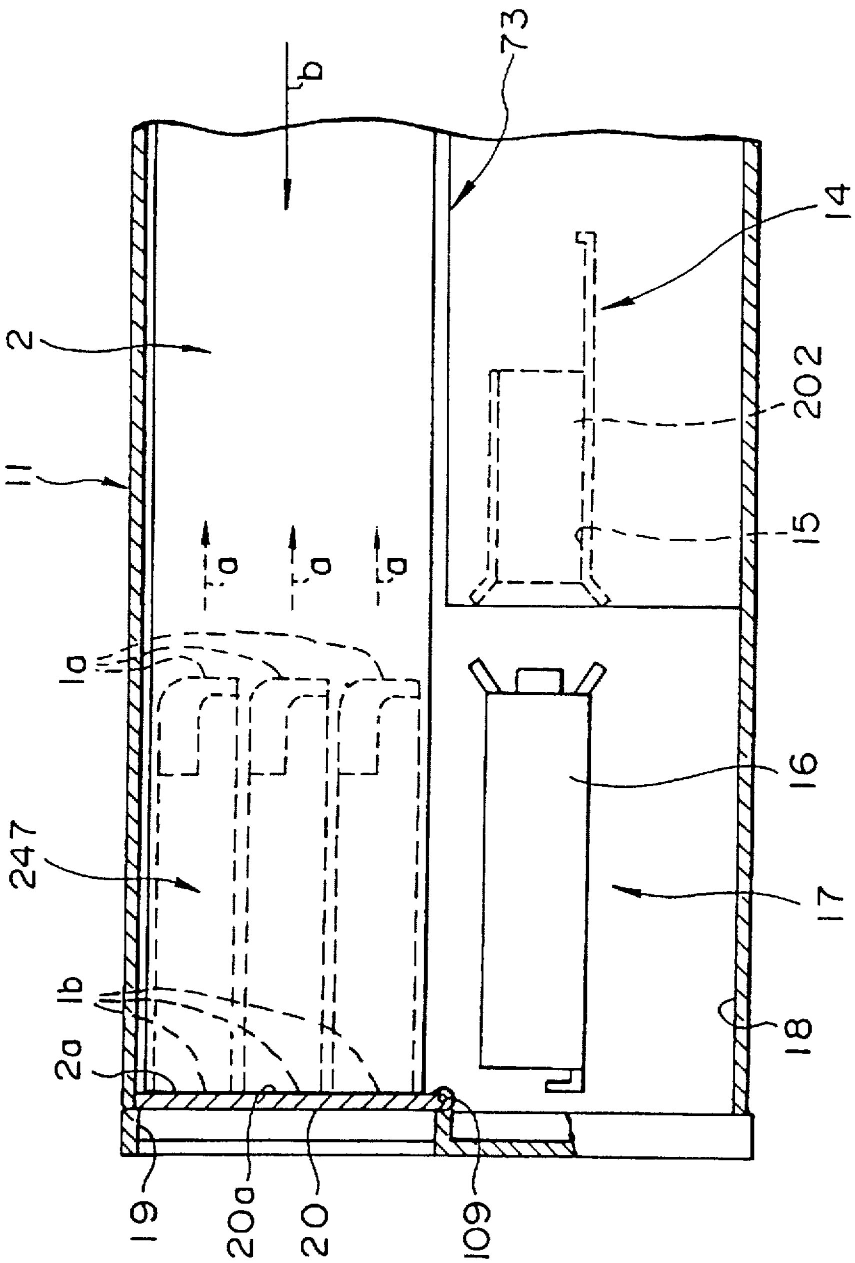
FIG. 68 is a partly broken-away side view illustrating the operation of automatically pushing a tape cartridge, which projects from a magazine, into the magazine.

As a result, the side 2*a* of the magazine 2 is brought into contact with the back side 20*a* of the movable cover 20 in the direction shown by arrow 12, as shown in FIG. 68 so that the tape cartridge 1 projecting from the side 2*a* of the magazine 2 in the direction shown by arrow 12 is automatically pushed to the normal position in the magazine 2 in the direction shown by arrow a by the back side 20*a* of the movable cover 20.

At the same time, the position of contact of the magazine 2 with the movable cover 20 in the direction shown by arrow b is detected by an optical sensor or the like, or the contact is detected by the method of electrically detecting the load which is applied to the motor 73 of the magazine loading mechanism 51 when the magazine 2 contacts the movable cover 20 in the direction shown by arrow b and is stopped thereby.

The magazine loading mechanism 51 is then reversely rotated to return the magazine 2 to the normal loading completion position in the auto-loader 11 in the direction shown by arrow a and load the magazine 2 therein. In this way, a series of operations is completed.

Although the embodiment of the present invention is described above, the present invention is not limited to the embodiment, and various modifications can be made on the basis of the technical idea of the present invention.

In the above-described embodiment, the rotation mechanism for rotating the tape cartridges 1 while transferring the tape cartridges 1 one by one between the cartridge insertion port 5, the cartridge ejection port 6 and the cartridge containment port 7 of the magazine 2 and the cartridge port 15 of the drive 14 comprises the cartridge tray 16 of the elevator 17, the first to third cartridge ejecting mechanisms 54 to 56, and the cartridge ejecting mechanism 58. The cartridge transfer mechanism for transferring the tape cartridges 1 between the cartridge insertion port 5, the cartridge ejection port 6, the cartridge containment port 7 and the cartridge port 15 and the cartridge tray 16 in the directions shown by arrows a and b comprises the first to third cartridge ejecting mechanisms 54 to 56, and the cartridge ejecting mechanism 58.

The auto-loader for the tape cartridges of the present invention constructed as described above exhibits the following advantages.

At least the cartridge insertion port and the cartridge ejection port are formed in the upper and lower portions of a side of the magazine in the lengthwise direction thereof so that a plurality of tape cartridges are successively inserted into the cartridge insertion port, successively contained in the magazine along the lengthwise direction thereof, and successively ejected to the cartridge ejection port. When the magazine is inserted from the magazine insertion port formed in the front panel of the auto-loader body along the lengthwise direction thereof, the magazine is automatically drawn into the body of the auto-loader, and automatically loaded so that the cartridge insertion port and the cartridge ejection port are set on substantially the same plane as the cartridge port of the drive in the body of the autoloader. The elevator is moved in the body of the autoloader in the direction perpendicular to the direction of insertion of the magazine between the cartridge port of the drive and the cartridge insertion port and the cartridge ejection port of the magazine. At the same time, the plurality of tape cartridges are rotated between the magazine and the drive by the operation of ejecting the tape cartridge into the elevator from the cartridge ejection port of the magazine by the first cartridge ejecting mechanism, and the operation of ejecting the tape cartridge to the cartridge port of the drive or the cartridge insertion port of the magazine from the elevator by the second cartridge ejecting mechanism. The magazine can thus automatically be loaded in the body of the auto-loader by the magazine loading mechanism, and can be set in the body of the auto-loader by a simple operation. In addition, the plurality of tape cartridges can simply and securely be rotated within the magazine, thereby simplifying the inside structure of the magazine and decreasing the cost thereof.

When the plurality of tape cartridges are successively rotated between the magazine and the drive within the body of the auto-loader, the tape cartridges can securely and stably be transferred between the magazine and the elevator and between the elevator and the drive by the simple and reliable operation of simply ejecting the tape cartridges by the first and second cartridge ejecting mechanisms, thereby increasing reliability.

The first and second cartridge ejecting mechanisms have a simple structure and high reliability of operation, and can easily be produced.

At least one cartridge containment port for containing only one tape cartridge which can freely be moved in and out of the cartridge containment port is provided between the cartridge insertion port and the cartridge ejection port on the lengthwise side of the magazine. The third cartridge ejecting mechanism for ejecting the tape cartridge contained in the cartridge containment port into the elevator is provided in the body of the auto-loader. Therefore, if a special tape cartridge for index or cleaning is contained in the cartridge containment port, if required, the special tape cartridge can rapidly be ejected without being rotated within the magazine, thereby enabling high-speed processing. Further, since an additional tape cartridge 1 can further be contained in the cartridge containment port, the number of the tape cartridges 1 contained in the magazine can be increased, and the storage capacity of the auto-loader can thus be increased.

Each of the first, second and third cartridge ejecting mechanisms comprises an ejection arm, and a rack and pinion mechanism for linearly moving the ejection arm, and has a simple structure and reliability of operation.

The magazine loading mechanism comprises the magazine latch mechanism and the slide driving member for linearly moving the latch mechanism in the directions of insertion and ejection of the magazine, and has a simple structure and reliability of operation.

The second cartridge ejecting mechanism is provided on the tray elevator for moving the cartridge tray of the elevator upward and downward, and can thus be moved upward and downward together with the cartridge tray, and has a simple structure and reliability of operation.

During rotation of the tape cartridges between the cartridge insertion port, the cartridge ejection port and the cartridge containment port of the magazine and the cartridge port of the drive, the position of ejection of the tape cartridge into the elevator from the cartridge ejection port is displaced by one step in the direction of ejection of the tape cartridge, and the position of ejection of the tape cartridge into the elevator from the cartridge containment port and the cartridge port is displaced by two steps in the direction of ejection of the tape cartridge, on the basis of the position of insertion of the tape cartridge into the cartridge insertion port and the cartridge containment port of the magazine. Therefore, when the tape cartridge, which is pushed into the elevator from the cartridge port of the drive or the cartridge ejection port of the magazine, is passed over the cartridge containment port of the magazine and carried to the cartridge insertion port, it is possible to prevent mutual interference between the tape cartridge carried by the elevator and the tape cartridge contained in the cartridge containment port and the cartridge insertion port of the magazine. This permits the smooth rotation of the tape cartridges. The auto-loader is capable of performing the operation of rotating the tape cartridges with high safety and reliability.

Since the three cartridge ejecting mechanisms for respectively ejecting the tape cartridges into the elevator from the cartridge ejection port, the cartridge containment port and the cartridge port, and the cartridge ejection position detecting mechanism for detecting the position of ejection of the tape cartridge into the elevator and controlling the ejection stroke of each of the three cartridge ejecting mechanisms are provided, the operation of setting the two-step positions of ejection of the tape cartridge into the elevator can simply and securely be performed.

Since one cartridge ejection position detecting lever and one cartridge ejection position detecting sensor are provided for detecting the two positions, i.e., the position displaced by one step and the position displaced by two steps, of the tape cartridge 1 which is ejected into the elevator, an attempt can be made to simplify the structure and decrease the cost.

Because the tape cartridge insertion error detecting mechanism is provided in the elevator, it is possible to easily detect error in the insertion of the tape cartridge into the magazine, and thus prevent an error in the insertion of the tape cartridge into the drive.

Because the first cartridge ejecting mechanism can be contained in an area in the lengthwise direction of the magazine so that the first cartridge ejecting mechanism can be inserted into the opening of the magazine, which is automatically loaded in the auto-loader body, and set therein, the length of the auto-loader in the lengthwise direction of the magazine can be decreased, thereby decreasing the size of the auto-loader body.

Because the third cartridge ejecting mechanism is set at an inner position of the cartridge containment port of the magazine, and then slid to push out the tape cartridge contained in the cartridge containment port of the magazine into the elevator, in synchronism with the operation of drawing the magazine into the auto-loader, the cartridge ejecting mechanism can automatically be set at the inner position of the cartridge containment port of the magazine at the same time that the magazine is automatically loaded into the auto-loader body. Thus, after the magazine is automatically loaded in the autoloader body, the tape cartridge can rapidly be pushed into the elevator from the cartridge containment port of the magazine by the cartridge ejecting mechanism, thereby permitting the operation of rapidly transferring the tape cartridges between the magazine and the drive.

Since the rotation angle of the third ejection arm is set to about 45° so that the third ejection arm is parallel with the magazine when the third ejection arm is discharged to the outside of the magazine insertion space, and the cartridge ejection surface of the third ejection arm is at right angles with the magazine when the third ejection arm is inserted into the magazine insertion space, the rotational space of the third ejection arm can be decreased. Since the third ejection arm is parallel with the magazine when the third ejection arm is discharged to the outside of the magazine insertion space, the width of the auto-loader body in the direction perpendicular to the lengthwise direction thereof can be decreased. In addition, since the cartridge ejecting surface of the third ejection arm is at right angles with the magazine when the third ejection arm is inserted into the magazine insertion space, the tape cartridge can stably be ejected from the cartridge containment port by the cartridge ejecting surface.

Because the magazine locking mechanism is provided for locking the magazine when the third ejection arm is driven in the direction of ejection by the slide driving member to push the tape cartridge contained in the cartridge containment port into the elevator, and releasing the locking by overstroke of the slide driving member in the direction of drawing, when the tape cartridge is pushed into the elevator from the cartridge ejection port and the cartridge containment port of the magazine by the third ejection arm, the magazine is not pushed in error, thereby permitting the safe and reliable operation of ejecting the tape cartridge into the elevator from the magazine.

Because the lock by the locking mechanism is released by the overstroke of the slide driving member in the direction of drawing of the magazine, there is no need for providing a mechanism for releasing the locking by the locking mechanism, thereby simplifying the structure and facilitating the production.

Because the elevator comprises the cartridge tray having the opening corresponding to the cartridge insertion port, the cartridge ejection port and the cartridge port, and the tray elevating mechanism for moving the cartridge tray upward and downward in the direction perpendicular to the lengthwise direction of the magazine, the magazine has a simple structure and is low cost.

The tray elevating mechanism comprises a pair of vertical guides which are disposed at both sides of the cartridge tray so as to guide the cartridge tray upward and downward in the direction perpendicular to the lengthwise direction of the magazine. A pair of inclined guides are disposed at both sides of the cartridge tray so as to be slid in the lengthwise direction of the magazine to drive the cartridge tray upward and downward. The pair of the inclined guides are provided with a pair of slide guide plates which are slid along the lengthwise direction of the magazine, and a pair of inclined guide grooves which are inclined with respect to the direction of sliding of the slide guide plates so as to guide the guide pins provided on both sides of the cartridge tray to vertically drive the cartridge tray. A plurality of horizontal steps are formed at a plurality of positions in the direction of inclination of the pair of inclined guide grooves so that the cartridge tray is stopped at a height corresponding to each of the cartridge insertion port, the cartridge ejection port and the cartridge ejection port and the cartridge port. It is thus possible to securely and smoothly move the cartridge tray upward and downward, and correctly stop the cartridge tray at each of the cartridge insertion port, the cartridge ejection port and the cartridge port, thereby permitting the reliable and smooth operation of horizontally transferring the tape cartridges between the cartridge insertion port, the cartridge ejection port and the cartridge port and the cartridge tray.

The movable cover opening/closing mechanism for closing the cartridge insertion port of the front panel with the movable cover in synchronism with the operation of drawing the magazine into the auto-loader, and closing the movable cover in synchronism with the start of the operation of pushing the magazine into the auto-loader, and the control circuit for permitting the injection mode of the magazine loading mechanism in the state wherein the opening of the movable cover is inhibited, are provided. Thus, when the tape cartridge in the magazine which is automatically loaded in the auto-loader body projects from the cartridge insertion port or the cartridge ejection port, the operation of pushing one side of the magazine on the movable cover is executed so as to automatically push the projecting tape cartridge into the magazine. There is thus no need for the troublesome operation of drawing the magazine from the auto-loader body and manually pushing the projecting tape cartridge into the magazine each time a tape cartridge projects from the magazine which is automatically loaded in the auto-loader. The projecting tape cartridge can automatically be returned into the auto-loader body, thereby increasing the ease of operation.

Because the slide driving member for drawing and ejecting the magazine into and out of the auto-loader is provided on the magazine loading mechanism, and the movable cover driving lever for opening and closing the movable cover is provided on the movable cover opening/closing mechanism so that the movable cover driving lever is driven by the endless cam groove provided on the slide driving member, the magazine loading operation can easily be performed synchronously with the operation of opening and closing the movable cover with high reliability.

Further, the elevator comprises the cartridge tray having the opening corresponding to the cartridge insertion port, the cartridge ejection port and the cartridge port, and the tray elevating mechanism for moving the cartridge tray upward and downward in the direction perpendicular to the direction of insertion of the magazine. The movable cover locking member is provided for permitting the movable cover to be opened and closed by moving the tray elevating mechanism to the initial position, and locking the movable cover in the closed state by moving the tray elevating mechanism to the standby position from the initial position. The movable cover can thus simply be locked in the closed state by driving the movable cover locking member by the tray elevating mechanism when the tape cartridge projecting is pushed into the magazine by pushing the other side of the magazine on the movable cover. There is thus no need to further provide a special movable cover locking mechanism on the movable cover opening/closing mechanism, thereby simplifying the whole structure of the auto-loader and decreasing the cost thereof.

Further, at least seven tape cartridges which are successively inserted from the cartridge insertion port are successively contained, by the rotation method (one-way method), along the cartridge rotation path which is connected to the cartridge port through the path around the hollow portion in the magazine body, and are successively pushed to the cartridge port, thereby permitting the simple and reliable operation of rotating the tape cartridges within the magazine. Unlike a conventional magazine, there is thus no need for the complicated reciprocating motions of the tape cartridges within the magazine in the horizontal and vertical directions, thereby simplifying the internal structure of the magazine, decreasing the cost thereof and improving the reliability.

In addition, since the cartridge positioning mechanisms for positioning the tape cartridges are provided at at least three positions including the positions in the cartridge insertion port, the cartridge ejection port and the cartridge containment port, it is possible to securely control the positions of the tape cartridges, and easily prevent the tape cartridges from falling off from the cartridge insertion port, the cartridge ejection port and the cartridge containment port.

What is claimed is:

1. An auto-loading system for recording medium cartridges comprising:

a cartridge containing unit comprising:
  - a first space which is connected to a cartridge insertion port,
  - a second space which is horizontally connected to said first space,
  - a third space which is formed below and perpendicular to said second space and which is connected to said second space,
  - a fourth space which is horizontally connected to said third space, which is parted from said first space by a partition, and which is connected to a cartridge ejection port, and
  - a fifth space which permits only one recording medium cartridge to be horizontally contained between said first space and said fourth space;

driving means for accessing a recording medium contained in a recording medium cartridge, said driving means having a cartridge port through which a recording medium cartridge is loaded;

transfer means for transferring a recording medium cartridge between said cartridge insertion port, said cartridge ejection port and said cartridge port, and between said fifth space and said cartridge port; and first cartridge ejecting means for moving the recording medium cartridges positioned in said third and fourth spaces toward said cartridge ejection port by pushing the end surface of a recording medium cartridge positioned in said third space on the side opposite to said fourth space, to load the recording medium cartridge positioned in said fourth space in said transfer means through said cartridge ejection port.

2. An auto-loading system according to claim 1, further comprising second cartridge ejecting means for inserting the recording medium cartridge loaded in said transfer means into said drive means through said cartridge port or to said cartridge containing unit from said transfer means by pushing the side surface of the recording medium cartridge loaded in said transfer means on the side opposite to said driving means and said cartridge containing unit.

3. An auto-loading system according to claim 2, wherein each of said first and second cartridge ejecting means comprise an ejection arm, and a rack and pinion mechanism for linearly moving said ejection arm.

4. An auto-loading system according to claim 2, wherein said transfer means comprises elevating means for moving a recording medium cartridge upward and downward, said second cartridge ejecting means being provided on said elevating means.

5. An auto-loading system according to claim 1, further comprising third cartridge ejecting means for pushing a recording medium cartridge contained in said fifth space toward said transfer means to load said recording medium cartridge in said transfer means.

6. An auto-loading system according to claim 5, wherein each of said first and third cartridge ejecting means comprise an ejection arm and a rack and pinion mechanism for linearly moving said ejection arm.

7. An auto-loader system according to claim 5, further comprising setting means for setting said third cartridge ejecting means at the same height as said fifth space inwardly of said fifth space in the direction of loading of said cartridge containing unit in linkage with the operation of loading said cartridge containing unit in said body of said auto-loading system by said cartridge containing unit loading means.

8. An auto-loading system according to claim 1, wherein said cartridge containing unit is detachable from said auto-loading system.

9. An auto-loading system according to claim 8, further comprising cartridge containing unit loading means for automatically drawing said cartridge containing unit into said auto-loading system so that said cartridge insertion port and said cartridge ejection port of said cartridge containing unit are brought into communication with said transfer means.

10. An auto-loading system according to claim 9, wherein said cartridge containing unit loading means comprises;

latch means for latching said cartridge containing unit; and a slide driving member for linearly moving said latch means in the directions of loading and ejecting said cartridge containing unit.

11. An auto-loading system according to claim 9, wherein said cartridge containing unit comprises an opening at the same height as said cartridge ejection port on a front end side thereof in the direction of insertion into the body of said auto-loading system, and said first cartridge ejecting means is set in said cartridge containing unit in correspondence with loading of said cartridge containing unit in the body of said auto-loading system by said cartridge containing unit loading means.

12. An auto-loading system according to claim 9, further comprising locking means for locking said cartridge containing unit at a loading position in said auto-loading system.

13. An auto-loading system according to claim 9, further comprising:

a cartridge containing unit insertion port for inserting said cartridge containing unit in said system;

a cover for opening and closing said cartridge containing unit insertion port;

cover opening/closing means for closing said cover before the completion of the operation of loading said cartridge containing unit by said cartridge containing unit loading means, and opening in correspondence with a start of ejection of said cartridge containing unit by said cartridge containing unit loading means; and control means for, when a recording medium cartridge in said cartridge containing unit projects from said cartridge insertion port or said cartridge ejection port, closing said cover by said cover opening/closing means and ejecting said cartridge containing unit by said cartridge containing unit loading means to push back the projecting recording medium cartridge into said cartridge containing unit when the recording medium cartridge contacts an inner side of said cover.

14. An auto-loading system according to claim 1, wherein a recording medium cartridge containing index information is contained in said fifth space.

15. An auto-loading system according to claim 1, further comprising fourth cartridge ejecting means for pushing a recording medium cartridge to said transfer means from said driving means.

16. An auto-loading system according to claim 15, wherein said recording medium cartridge is a tape cartridge containing a magnetic tape, said driving means comprises a rotating head for reproducing a signal stored on said magnetic tape, and said fourth cartridge ejecting means are provided so as to be movable in a longitudinal direction of said driving means in a space above said rotating head within said driving means.

17. An auto-loading system according to claim 15, wherein the amount of the recording medium cartridge ejected to said transfer means from said driving means by said fourth cartridge ejecting means is set to be larger than the amount of the recording medium cartridge ejected to said transfer means from said cartridge containing unit by said first cartridge ejecting means.

18. An auto-loading system according to claim 1, wherein said transfer means comprises positioning means for positioning said recording medium cartridge at a height corresponding to any one of said cartridge insertion port, said cartridge ejection port or said cartridge port.

19. An auto-loading system according to claim 1, wherein said cartridge containing unit comprises cartridge positioning means for positioning recording medium cartridges in said first, fourth and fifth spaces.

20. An auto-loading system for recording medium cartridges comprising:

a removable cartridge magazine comprising a substantially U-shaped transport path for circulating recording medium cartridges, said magazine having an insertion port, and an ejection port;

wherein an upper portion of said transport path is connected to said insertion port and is inclined to facilitate the movement of recording medium cartridges along said transport path;

a recording/reproducing apparatus for accessing a recording medium contained in a recording medium cartridge, said driving means having a cartridge port through which a recording medium cartridge is loaded;

an elevator for transferring a recording medium cartridge between said cartridge insertion port, said cartridge ejection port and said cartridge port; and a space surrounded by said transport path having an opening between said insertion port and said ejection port, said space being sized to contain a recording medium cartridge, wherein said elevator also transfers a recording medium cartridge between said space and said cartridge port.

21. An auto-loading system for recording medium cartridges according to claim 20 wherein a recording medium cartridge in said space contains index information.

22. An auto-loading system for recording medium cartridges according to claim 20 wherein a recording medium cartridge in said space contains a head cleaner for cleaning a head of said recording/reproducing apparatus.

23. An auto-loading system for recording medium cartridges according to claim 20, further comprising a second space surrounded by said transport path having an opening between said insertion port and said ejection port, said space being sized to contain a recording medium cartridge, wherein said elevator also transfers a recording medium cartridge between said second space and said cartridge port.

24. An auto-loading system for recording medium cartridges comprising:

a removable cartridge magazine comprising a substantially U-shaped transport path for circulating recording medium cartridges, said magazine having an insertion port, and an ejection port;

a recording/reproducing apparatus for accessing a recording medium contained in a recording medium cartridge, said driving means having a cartridge port through which a recording medium cartridge is loaded;

an elevator for transferring a recording medium cartridge between said cartridge insertion port, said cartridge ejection port and said cartridge port;

a magazine port for receiving said magazine into said auto-loading system;

an magazine loading system for loading said magazine to bring said insertion and ejections ports into communication with said elevator, said magazine loading system also serving to eject said magazine through said magazine port;

a cover for opening and closing said magazine port;

cover opening/closing means for operating said cover; and control means for detecting when a recording medium cartridge in said magazine projects from said insertion port or said ejection port, closing said cover by said cover opening/closing means and causing said magazine loading system to press said magazine against an inner surface of said closed cover to push said projecting recording medium cartridge into said magazine.

* * * * *